United States Patent
Butryn

(10) Patent No.: US 12,515,967 B2
(45) Date of Patent: Jan. 6, 2026

(54) METHODS AND APPARATUSES FOR DISTILLING SEAWATER AND BRINE AND REMOVING SALT

(71) Applicant: Desert Water LLC, Columbiana, OH (US)

(72) Inventor: Thomas F. Butryn, Columbiana, OH (US)

(73) Assignee: Desert Water LLC, Columbiana, OH (US)

( * ) Notice: Subject to any disclaimer, the term of this patent is extended or adjusted under 35 U.S.C. 154(b) by 199 days.

(21) Appl. No.: 18/459,861

(22) Filed: Sep. 1, 2023

(65) Prior Publication Data

US 2023/0406725 A1    Dec. 21, 2023

Related U.S. Application Data

(62) Division of application No. 17/879,463, filed on Aug. 2, 2022, now Pat. No. 11,780,744.

(Continued)

(51) Int. Cl.
*C02F 1/04* (2023.01)
*B01D 1/00* (2006.01)
(Continued)

(52) U.S. Cl.
CPC ............ *C02F 1/043* (2013.01); *B01D 1/0041* (2013.01); *B01D 1/305* (2013.01); *B01D 5/006* (2013.01);
(Continued)

(58) Field of Classification Search
CPC .......... C02F 1/043; C02F 1/14; B01D 1/0035; B01D 1/0041; B01D 1/305; B01D 5/006; B01D 21/0012; B01D 21/2455
See application file for complete search history.

(56) References Cited

U.S. PATENT DOCUMENTS

| 3,163,587 A | 12/1964 | Champe |
| 3,430,932 A | 3/1969 | Kuechler |

(Continued)

FOREIGN PATENT DOCUMENTS

| CN | 101941742 | 8/2012 |
| CN | 110171900 | 8/2019 |

(Continued)

*Primary Examiner* — Jonathan Miller
(74) *Attorney, Agent, or Firm* — Sand, Sebolt & Wernow Co., LPA

(57) ABSTRACT

A method for separating a volume of salt from a volume of seawater and producing a volume of fresh water. The method includes steps of: providing a support structure and at least one set of colanders of a separation assembly inside of the vessel of an apparatus, heating the volume of seawater, via at least one heating tube assembly of the apparatus, inside of the vessel; evaporating the volume of seawater to a volume of steam inside of the vessel; separating a volume of salt from the volume of seawater, via at least one set of colanders of a separation assembly of the apparatus, inside of the vessel; eliminating water droplets and the salt from the volume of steam, via at least one mist evaporator, inside of the vessel; and converting the volume of steam into a volume of fresh water, via at least one condenser, remote from the apparatus.

20 Claims, 22 Drawing Sheets

Related U.S. Application Data

(60) Provisional application No. 63/303,541, filed on Jan. 27, 2022, provisional application No. 63/251,891, filed on Oct. 4, 2021.

(51) Int. Cl.
| | | |
|---|---|---|
| *B01D 1/30* | (2006.01) | |
| *B01D 5/00* | (2006.01) | |
| *B01D 21/00* | (2006.01) | |
| *B01D 21/24* | (2006.01) | |
| *C02F 1/14* | (2023.01) | |
| *C02F 103/08* | (2006.01) | |

(52) U.S. Cl.
CPC ..... *B01D 21/0012* (2013.01); *B01D 21/2455* (2013.01); *B01D 1/0035* (2013.01); *C02F 1/14* (2013.01); *C02F 2103/08* (2013.01); *C02F 2201/005* (2013.01)

(56) References Cited

U.S. PATENT DOCUMENTS

| | | |
|---|---|---|
| 4,287,026 A | 9/1981 | Wallace |
| 5,156,706 A | 10/1992 | Sephton |
| 8,496,787 B2 | 7/2013 | Lord |
| 9,102,545 B2 | 8/2015 | Riley et al. |
| 9,169,132 B2 | 10/2015 | Riley et al. |
| 9,428,403 B2 | 8/2016 | Haynes |
| 9,771,278 B2 | 9/2017 | Haynes |
| 10,150,052 B1 | 12/2018 | Goodley |
| 10,508,044 B2 | 12/2019 | Wilson |
| 11,780,744 B2 * | 10/2023 | Butryn ................. B01D 1/0041 203/10 |
| 2007/0289632 A1 | 12/2007 | Della Casa |
| 2009/0045150 A1 | 2/2009 | McCutchen |
| 2010/0015720 A1 | 1/2010 | McDaniel et al. |
| 2010/0264010 A1 | 10/2010 | Pallanca et al. |
| 2011/0017583 A1 | 1/2011 | Lord |
| 2012/0085635 A1 | 4/2012 | Haynes |
| 2013/0284582 A1 | 10/2013 | Booth |
| 2016/0046504 A1 | 2/2016 | Riley et al. |
| 2016/0368784 A1 | 12/2016 | Haynes |
| 2020/0339440 A1 | 10/2020 | Riley et al. |

FOREIGN PATENT DOCUMENTS

| | | |
|---|---|---|
| CN | 111939676 | 11/2020 |
| JP | 2019025449 | 2/2019 |

* cited by examiner

METHODS AND APPARATUSES FOR DISTILLING SEAWATER AND BRINE AND REMOVING SALT

REFERENCE TO RELATED APPLICATIONS

This application is a divisional of U.S. patent application Ser. No. 17/879,463, filed on Aug. 2, 2022, which claims the benefit of U.S. Provisional Application Ser. No. 63/303,541, filed on Jan. 27, 2022, and U.S. Provisional Application Ser. No. 63/251,891, filed on Oct. 4, 2021; the disclosures of which are incorporated herein by reference.

TECHNICAL FIELD

The present disclosure is directed to seawater distillation systems for distilling seawater and brine while removing salt precipitate.

BACKGROUND ART

In current times, it is well known that the global population lacks a sufficient amount of fresh water. According to certain reports, nearly 1.8 billion people in seventeen countries, or a quarter of the world's population, appear to be veering towards a water crisis—with the potential of severe shortages in the next few years. The population of the world is constantly increasing which puts additional pressure on clean water supplies. Additionally, according to UNICEF, climate change is disrupting weather patterns, leading to extreme weather events, unpredictable water availability, exacerbating water scarcity, and contaminating water supplies. Such impacts can drastically affect the quantity and quality of water that children need to survive meaning large populations of children are at risk.

To combat this global crisis of sufficient water supply, the method of desalination systems is currently being used to produce clean water. Generally, seawater desalination systems are operational around the world and continue to be built to supply drinking water to people and industries. However, desalination has numerous disadvantages even though this method is able to produce clean water.

In one instance, these desalination systems require large amounts of energy. Desalination techniques have the potential to increase fossil fuel dependence, increase greenhouse gas emissions, and exacerbate climate change if renewable energy sources are not used for freshwater production.

In another instance, desalination techniques lack sufficiency. For example, for every two and a half gallons of seawater taken in, a desalination plant will produce one gallon of desalinated water and one and a half gallons of brine. Additionally, a desalination plant will also provide high salinity of brine that fresh water. This creation of brine devoid of dissolved oxygen as a result of the desalination process. This brine compound is returned to the sea and if it is released into calm water, it can sink to the bottom as a plume of salty water that can kill organisms on the sea bed from a lack of oxygen.

In yet another instance, the desalination creates unwanted waste products and/or by-products that must be taken care of during this process. The process of desalination requires pre-treatment and cleaning chemicals, which are added to water before desalination to make the treatment more efficient and successful. These chemicals include chlorine, hydrochloric acid, and hydrogen peroxide, which can be used for only a limited amount of time. Once these chemicals have lost their ability to clean the water, these are essentially dumped, which becomes a major environmental concern. These chemicals often find their way back into the ocean, which may poison plant and animal life. The organisms most commonly affected by brine and chemical discharge from desalination plants are plankton and phytoplankton, which form the base of all marine life by forming the base of the food chain. Desalination plants therefore have the ability to negatively affect the population of animals in the ocean In yet another instance, desalination processes include filters that have to be replaced periodically. Such replacement creates ongoing cost and labor to purchase, remove, and install filters. Moreover, the used filters must then be disposed of causing more waste from these desalination processes.

SUMMARY OF THE INVENTION

In one aspect, an exemplary embodiment of the present disclosure may provide an apparatus. The apparatus may include a vessel that is adapted to hold a volume of seawater comprising of salt. The vessel may be externally heated to evaporate the seawater to steam. The apparatus may also include a separation assembly operably engaged with the vessel where the separation assembly is configured to separate a volume of salt from the volume of seawater inside of the vessel. The apparatus may also include a mist eliminator operably engaged with the vessel where the mist eliminator is configured to eliminate water droplets and salt from the steam.

In another aspect, an exemplary embodiment of the present disclosure may provide a system. The system may include an apparatus configured to separate a volume of salt from a volume of seawater, and the apparatus is configured to evaporate the volume of seawater into steam without water droplets and without salt. The system may include a tower operably engaged with the apparatus, wherein the tower is configured to maintain the apparatus at a predetermined height from ground level. The system may also include a plurality of heliostats directed at the apparatus, wherein the plurality of heliostats is configured to heat the apparatus at a predetermined temperature to evaporate the seawater into steam. The system may also include a plurality of photovoltaic cells operably engaged with the apparatus, wherein the plurality of photovoltaic cells is adapted to provide power to the apparatus. The system may also include at least one condensing assembly operably engaged with the apparatus, wherein the at least one condensing assembly is configured to condense the steam into fresh water.

In another aspect, an exemplary embodiment of the present disclosure may provide a method of converting seawater into fresh water. The method comprises the step of introducing a volume of seawater into a vessel of a machine; separating the volume of seawater, via a separation assembly of the machine, inside of the vessel; conveying a volume of salt, via a conveyor of the separation assembly, outside of the vessel; evaporating the volume of seawater to steam, via an external device, inside of the vessel; eliminating water droplets and salt from the steam, via a mist eliminator, inside of the vessel; converting steam into fresh water, via at least one condenser, remote from the machine.

In another aspect, an exemplary embodiment of the present disclosure may provide an apparatus. The apparatus may include a vessel adapted to hold a volume of seawater comprising of salt, wherein vessel is externally heated to evaporate the seawater to steam. The apparatus may also include a separation assembly operably engaged with the vessel. The separation assembly has at least one set of collecting members configured to separate a volume of salt from the volume of seawater inside of the vessel. The apparatus may also include a first mist eliminator operably engaged with the vessel, where the first mist eliminator is configured to eliminate water droplets and salt from the steam. The apparatus may also include a second mist eliminator operably engaged with the vessel, where the second mist eliminator is configured to eliminate water droplets and salt from the steam.

In another aspect, an exemplary embodiment of the present disclosure may provide an apparatus. The apparatus may include a vessel adapted to hold a volume of seawater comprising of salt, where vessel is externally heated to evaporate the seawater to steam. The apparatus may also include a separation assembly operably engaged with the vessel. The separation assembly having at least one set of collecting members configured to separate a volume of salt from the volume of seawater inside of the vessel. The apparatus may also include a first mist eliminator operably engaged with the vessel, where the first mist eliminator is configured to eliminate water droplets and salt from the steam. The apparatus may also include a second mist eliminator operably engaged with the vessel, where the second mist eliminator is configured to eliminate water droplets and salt from the steam. The apparatus may also include a third mist eliminator operably engaged with the vessel, where the third mist eliminator is configured to eliminate water droplets and salt from the steam.

In another aspect, an exemplary embodiment of the present disclosure may provide a system. The system may include a machine configured to separate a volume of salt from a volume of seawater, where the machine is configured to evaporate the volume of seawater into steam without droplets and without salt. The system may also include at least one heater operably engaged with the machine, where the at least one heater is configured to provide external heat to the machine at a predetermined temperature to evaporate the seawater into steam. The system may also include a plurality of photovoltaic cells operably engaged with the machine, where the plurality of photovoltaic cells is adapted to provide power to the machine. The system may also include at least one condensing assembly operably engaged with the machine, where the at least one condensing assembly is configured to condense the steam into fresh water.

In another aspect, an exemplary embodiment of the present disclosure may provide a method of converting seawater into fresh water. The method comprises the step of introducing a volume of seawater into a vessel of a machine; heating the volume of seawater via at least one heater; separating a volume of salt from the volume of seawater, via a separation assembly of the machine, inside of the vessel; conveying a volume of salt, via a conveyor of the separation assembly, outside of the vessel; evaporating the volume of seawater to steam, via an external device, inside of the vessel; eliminating water droplets and salt from the steam, via a mist evaporator, inside of the vessel; and converting steam into fresh water, via at least one condenser, remote from the machine.

In another aspect, an exemplary embodiment of the present disclosure may provide an apparatus. The apparatus may include a vessel adapted to hold a volume of seawater comprising a volume of salt, wherein vessel is one of externally heated and internally heated to evaporate the volume of seawater to a volume of steam and to precipitate the volume of salt. The apparatus may also include a separation assembly operably engaged with the vessel, wherein the separation assembly is configured to separate the volume of salt from the volume of seawater inside of the vessel. The apparatus may also include at least one mist eliminator operably engaged with the vessel and positioned vertically above the separation assembly, wherein the at least one mist eliminator is configured to eliminate water droplets and salt from the volume of steam.

This exemplary embodiment or another exemplary embodiment may further include that the separation assembly comprises: a support structure having a first lateral wall and a second lateral wall opposite to the first lateral wall; and at least one set of collecting members operably engaged with the support structure and positioned intermediate of the first lateral wall and the second lateral wall; wherein the at least one set of collecting member is configured to separate the volume of salt from the volume of seawater. This exemplary embodiment or another exemplary embodiment may further include that each collecting member of the at least one set of collecting members comprises: a first support wall; a second support wall opposite to the first support wall; and a perforated wall operably engaged with the first support wall and the second support wall and positioned intermediate of the first support wall and the second support wall; wherein the perforated wall is configured to drain the volume of seawater while retaining the volume of salt. This exemplary embodiment or another exemplary embodiment may further include that the separation assembly further comprises a first intermediate wall of the support structure positioned between the first lateral wall and the second lateral wall; and a second intermediate wall of the support structure positioned between the first intermediate wall and the second lateral wall; and a set of support tubes operably engaging the first lateral wall, the second lateral, the first intermediate wall, and the second intermediate wall with one another. This exemplary embodiment or another exemplary embodiment may further include that the at least one set of collecting members comprises: a first set of collecting members operably engaged with the first lateral wall and the first intermediate wall and positioned between the first lateral wall and the first intermediate wall; a second set of collecting members operably engaged with the first intermediate wall and the second intermediate wall and positioned between the first intermediate wall and the second intermediate wall; and a third set of collecting members operably engaged with the second intermediate wall and the second lateral wall and positioned between the second intermediate wall and the second lateral wall. This exemplary embodiment or another exemplary embodiment may further include a drive shaft operably engaged with the support structure; and a motor operably engaged with the drive shaft; wherein the motor is adapted to rotatably move the support structure and the at least one set of collecting members inside of the vessel via the drive shaft. This exemplary embodiment or another exemplary embodiment may further include a conveyor assembly operably engaged with the vessel and positioned inside of the separation assembly; wherein the conveyor assembly is configured to remove the volume of salt separated by the separation assembly from the vessel. This exemplary embodiment or another exemplary embodiment may further include that the conveyor assembly comprises: a support frame operably engaged with the vessel; a first pulley rotatably engaged with the support frame at a first position inside of the vessel; and a second pulley rotatably engaged with the support frame at a second position outside of the vessel and opposite to the first pulley; and a conveyor belt rotatably engaged with the first pulley and the second pulley; wherein the conveyor belt is configured to remove the volume of salt separated by the separation assembly from the vessel. This exemplary embodiment or another exemplary embodiment may further include a chamber defined by the vessel having an internal pressure different than an external pressure exterior to the chamber; and a discharge chute assembly operably engaged with the vessel and aligned with the conveyor assembly for transporting the volume of salt from the vessel; wherein the discharge chute assembly is in fluid communication with chamber and is configured to maintain the internal pressure inside of the chamber when transporting the volume of salt from the vessel. This exemplary embodiment or another exemplary embodiment may further include that the discharge chute assembly comprises: a discharge chute operably engaged with the vessel and aligned with the conveyor assembly; a first exit valve operably engaged with the discharge chute at a first position; and a second exit valve operably engaged with the discharge chute at a second position vertically below the first exit valve. This exemplary embodiment or another exemplary embodiment may further include that when the first exit valve is provided in an open position, the second exit valve is provided in a closed position to maintain the internal pressure inside of the chamber; and wherein when the second exit valve is provided in an open position, the first exit valve is provided in a closed position to maintain the internal pressure inside of the chamber. This exemplary embodiment or another exemplary embodiment may further include a bearing assembly operably engaged with the separation assembly; wherein the bearing assembly is configured to guide the separation assembly inside of the vessel. This exemplary embodiment or another exemplary embodiment may further include a heating tube assembly operably engaged with the vessel and positioned inside of the vessel; wherein the heating tube assembly is configured to heat the volume of seawater to a predetermined temperature to transition the volume of seawater to a volume of steam. This exemplary embodiment or another exemplary embodiment may further include a vessel jacket operably engaged with the vessel and positioned outside of the vessel; wherein the vessel jacket is configured to retain heat inside of the vessel. This exemplary embodiment or another exemplary embodiment may further include that the at least one mist eliminator further comprises: a first mist eliminator operably engaged with the vessel and positioned inside of the vessel vertically above the separation assembly; and a second mist eliminator operably engaged with the vessel and positioned inside of the vessel vertically above the separation assembly and the first mist eliminator; wherein the first mist eliminator is configured to eliminate water droplets and salt from the volume of steam in a first stage; wherein the second mist eliminator is configured to eliminate water droplets and salt from the volume of steam in a second stage subsequent to the first stage.

In another aspect, an exemplary embodiment of the present disclosure may provide a method. The method comprises steps of introducing a volume of seawater into a vessel of an apparatus; heating the volume of seawater, via at least one heating tube assembly of the apparatus, inside of the vessel; evaporating the volume of seawater to a volume of steam inside of the vessel; separating a volume of salt from the volume of seawater, via a separation assembly of the apparatus, inside of the vessel; eliminating water droplets and salt from the volume of steam, via at least one mist evaporator, inside of the vessel; and converting the volume of steam into a volume of fresh water, via at least one condenser, remote from the apparatus.

This exemplary embodiment or another exemplary embodiment may further include steps of conveying the volume of salt, via a conveyor assembly of the apparatus, to a dispensing chute assembly of the apparatus; and transporting the volume of salt outside of the vessel via the dispensing chute assembly. This exemplary embodiment or another exemplary embodiment may further include steps of actuating a first exit valve of the dispensing chute assembly from a closed position to an open position; enabling the volume of salt to pass through the first exit valve; and retaining a second exit valve of the dispensing chute assembly at a closed position to maintain an internal pressure inside of the vessel. This exemplary embodiment or another exemplary embodiment may further include steps of actuating the first exit valve of the dispensing chute assembly from the open position to the closed position; actuating the second exit valve of the dispensing chute assembly from the closed position to the open position; and enabling the volume of salt to pass through the second exit valve while maintaining the internal pressure inside of the vessel. This exemplary embodiment or another exemplary embodiment may further include that the step of eliminating the water droplets and the salt from the volume of steam, via at least one mist evaporator, inside of the vessel further comprises: eliminating the water droplets and the salt from the volume of steam, via a first mist eliminator, inside of the vessel at a first stage; and eliminating the water droplets and the salt from the volume of steam, via a second mist eliminator, inside of the vessel at a second stage.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
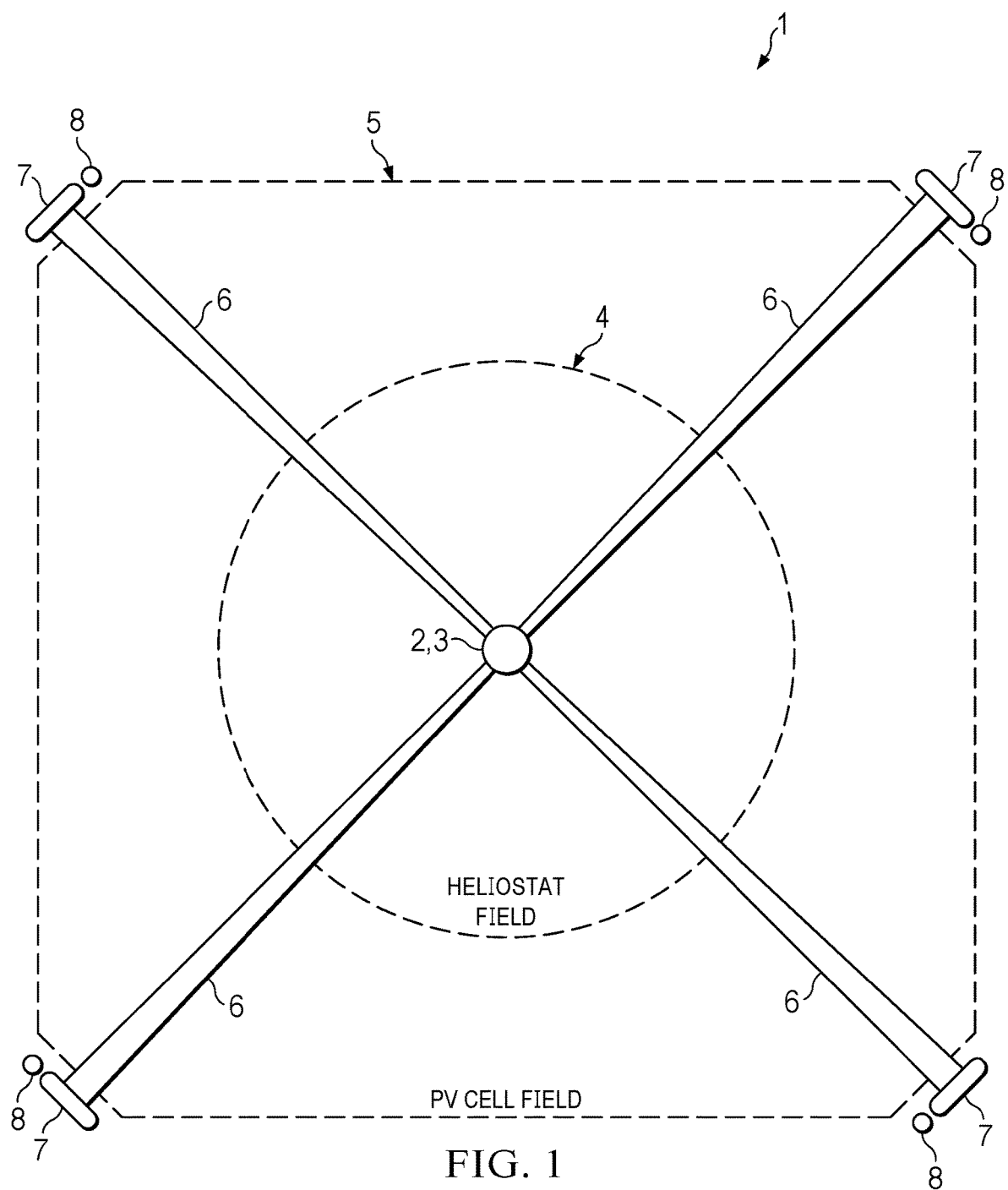
FIG. 1 is a top plan view of a seawater distillation system in accordance with an aspect of the present disclosure.

FIG. 1 illustrates a seawater distillation system (hereinafter "SDS"), generally referred to as 1. SDS 1 may include a solar tower 2 that is positioned at a central location in the SDS 1. SDS 1 may also include an apparatus or machine, generally referred to as 3, that is operably engaged with the solar tower 2 (see FIG. 2). The apparatus 3 may be operably engaged at a terminal end of the solar tower 2 at a predetermined height above ground level (see FIG. 2). In other exemplary embodiment, an apparatus of a SDS may be positioned at any suitable location on a tower or remote from the tower. As explained in more detail below, the apparatus 3 is configured to separate precipitated salt from volumes of seawater entering into the machine via a seawater pipeline operably engaged with the tower 2 and the apparatus 3. As explained in more detail below, the apparatus 3 is also configured to evaporate seawater into steam inside of the apparatus 3 during distillation operations. Such components and assemblies of the apparatus 3 are provided in more detail below.

Figure 2:
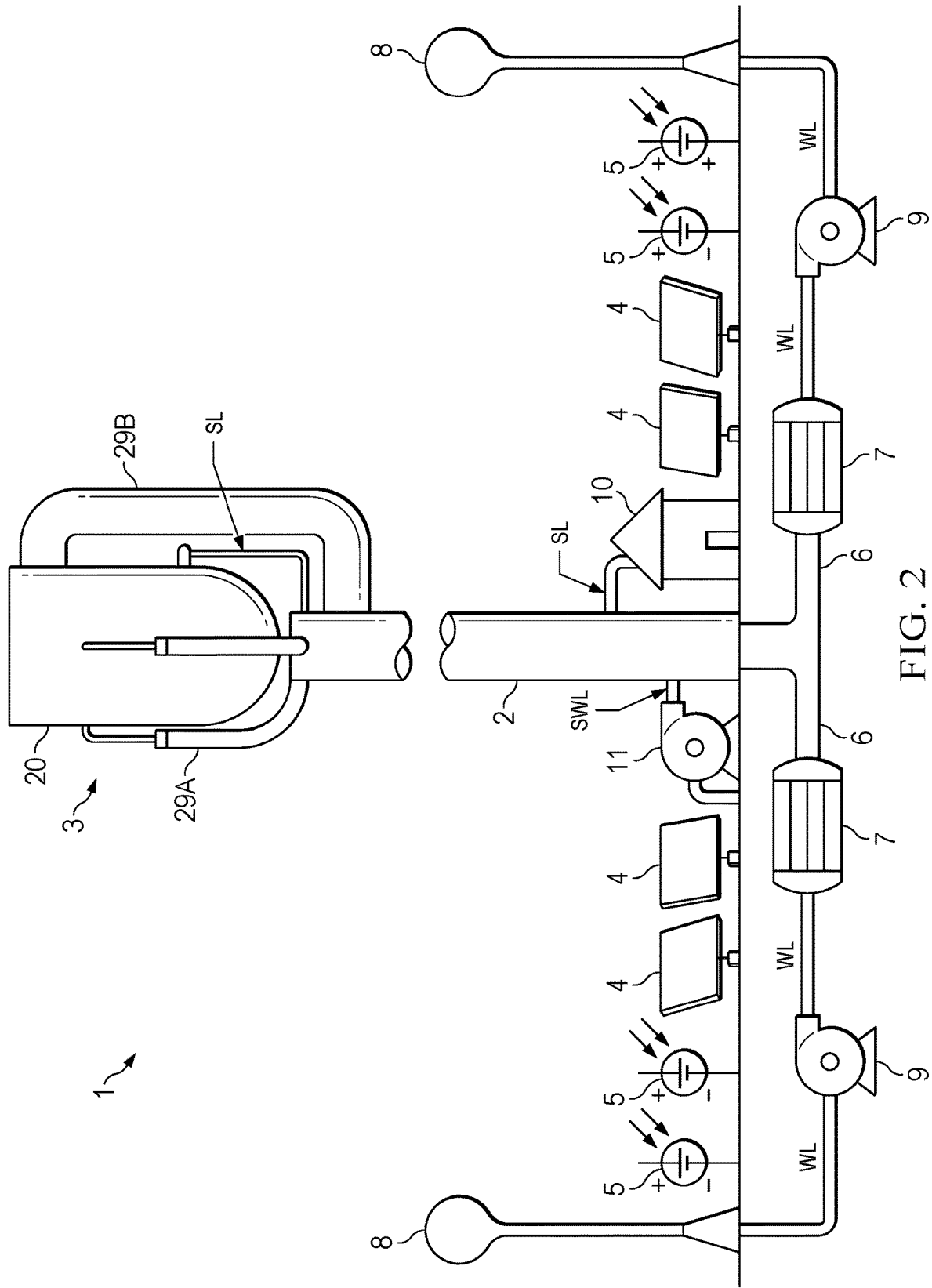
FIG. 2 is a diagrammatic view of the seawater distillation system in accordance with the aspect of the present disclosure shown in FIG. 1.

Referring to FIGS. 1 and 2, SDS 1 also includes a plurality of heliostats provided at ground surface, which is generally referred to as 4. The plurality of heliostats 4 are circumferentially arranged about the solar tower 2 and the apparatus 3 in the SDS 1 (see arrangement labeled "Heliostat Field" in FIG. 1). In other exemplary embodiments, any suitable arrangement may be used to arrange a plurality of heliostats about a solar tower and an apparatus. Each heliostat of the plurality of heliostats 4 is also configured to the reflect a beam of photons, received from the Sun, at the apparatus 3. Such reflection of photons on the apparatus 3 via the plurality of heliostats 4 provides an external heat source on the apparatus 3 that is independent of said apparatus 3. The heat source provided on the apparatus 3 from the plurality of heliostats 4 is equal to or greater than the boiling point of water. Such use of external heat created by the plurality of heliostats 4 on the apparatus 3 is described in more detail below. In other exemplary embodiments, any suitable source of power or energy may be used to heat the apparatus 3 to a desired temperature, preferably equal to or greater than the boiling point of water. Examples of suitable sources of power or energy used to heat an apparatus may include solar energy, geothermal energy, nuclear energy, fossil fuel energy, wood energy, hydrogen energy, or other types of energy suitable to heat an apparatus at a desired temperature, preferably equal to or greater than the boiling point of water In the illustrated embodiment, each heliostat of a plurality of heliostats 4 may provide flat mirror design to provide an external heat source on the apparatus 3. In other exemplary embodiments, any suitable plurality of heliostats may be used to provide an external heat source on an apparatus. In one exemplary embodiment, each heliostat of the plurality of heliostats may have a curved or parabolic mirror design to provide a more concentrated external heat source on an apparatus.

Still referring to FIGS. 1 and 2, SDS 1 also includes a plurality of photovoltaic cells (hereinafter "PV cells") provided at ground surface, which is generally referred to as 5. The plurality of PV cells 5 are circumferentially arranged about the plurality of heliostats 4 and about the tower 2 and apparatus 3 (see arrangement labeled "PV Cell Field" in FIG. 1). In other exemplary embodiments, any suitable arrangement may be used to arrange a plurality of PV cells about a plurality of heliostats, a solar tower, and an apparatus. In the illustrated embodiment, the plurality of PV cells 5 is electrically connected to the apparatus 3 for providing external power to the mechanical and electrical components of the apparatus 3, which are described in more detail below. Moreover, the plurality of PV cells 5 may be electrically connected to other devices or components provided in SDS 1.

While the plurality of PV cells 5 provided power to the electrical and mechanical devices of the apparatus 3, any suitable power source may be used to power electrical and mechanical devices of an apparatus. Examples of suitable power source to power electrical and mechanical devices of an apparatus include solar energy, geothermal energy, nuclear energy, fossil fuel energy, wood energy, hydrogen energy, or other types of energy for providing power to electrical and mechanical devices of an apparatus Still referring to FIGS. 1 and 2, SDS 1 may also include at least one steam line 6 operably engaged with the tower 2 and the apparatus 3. The at least one steam line 6 is configured to convey a volume of steam from the apparatus 3 to at least one condenser 7 of SDS 1, which is described in more detail below. In the illustrated embodiment, SDS 1 includes four steam lines 6 that operably engage with the tower 2 and the apparatus 3 and convey steam to four condensers 7. In other exemplary embodiments, any suitable number of steam lines and condenser may be used in a SDS based on various considerations, including the volume of seawater converted to steam, the overall size of the SDS, and other various considerations. Additionally, the at least one condenser 7 of SDS 1 is configured to convert and/or condense a volume of steam into fresh, distilled water. Such removal of salt from the seawater, via the apparatus 3, is described in more detail below. The at least one condenser 7 may be operably engaged with at least one PV cell of the plurality of PV cells 5 for powering the at least one condenser 7. In other exemplary embodiments, any suitable power source may power at least one condenser to convert steam into fresh water.

The fresh water condensed by the at least one condenser 7 is pumped into at least one fresh water tank 8 via at least one pump 9. The at least one pump 9 is operably engaged to the at least one condenser 7 and the at least one fresh water tank 8 via water line "WL" shown in FIG. 2. The at least one pump 9 may be operably engaged with at least one PV cell of the plurality of PV cells 5 for powering the at least one pump 9. In other exemplary embodiments, any suitable power source may power at least one pump to convey fresh water from at least one condenser to at least one fresh water tank.

Referring to FIG. 2, SDS 1 may include a salt tank or container 10 that is operably engaged with the apparatus 3 and the solar tower 2. The salt tank 10 may be configured to receive and house precipitated salt separated and collected by the apparatus 3 during a separation operation, which is described in more detail below. The apparatus 3 may convey the precipitated salt to the salt tank 10 via at least one salt line "SL" shown in FIG. 2. The precipitated salt collected by the apparatus and housed in the salt tank 10 may be used for other suitable purposes deemed fit.

Figure 3:
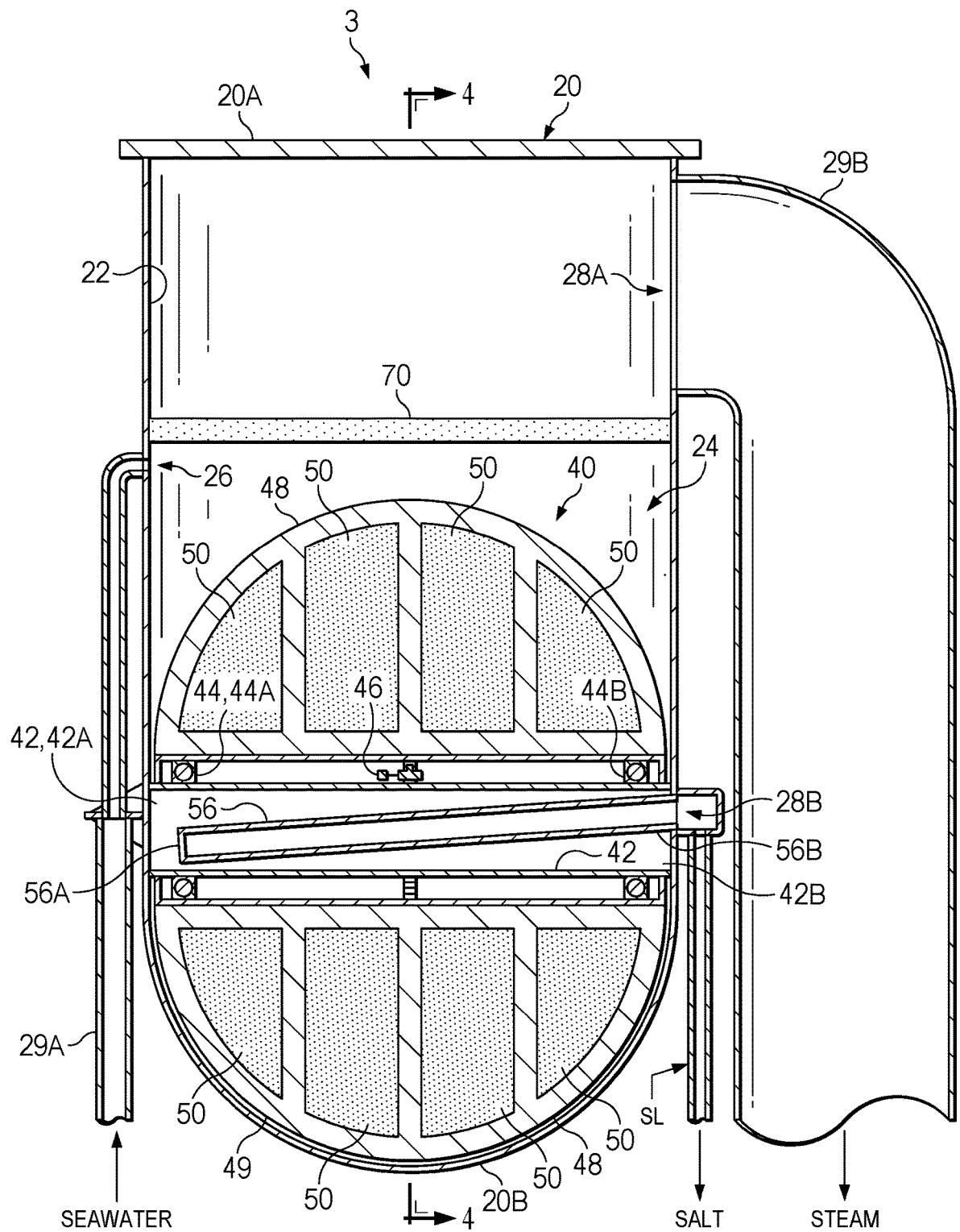
FIG. 3 is a partial longitudinal section view of an apparatus of the seawater distillation system taken in the direction of line 3-3 shown in FIG. 2.
Figure 4:
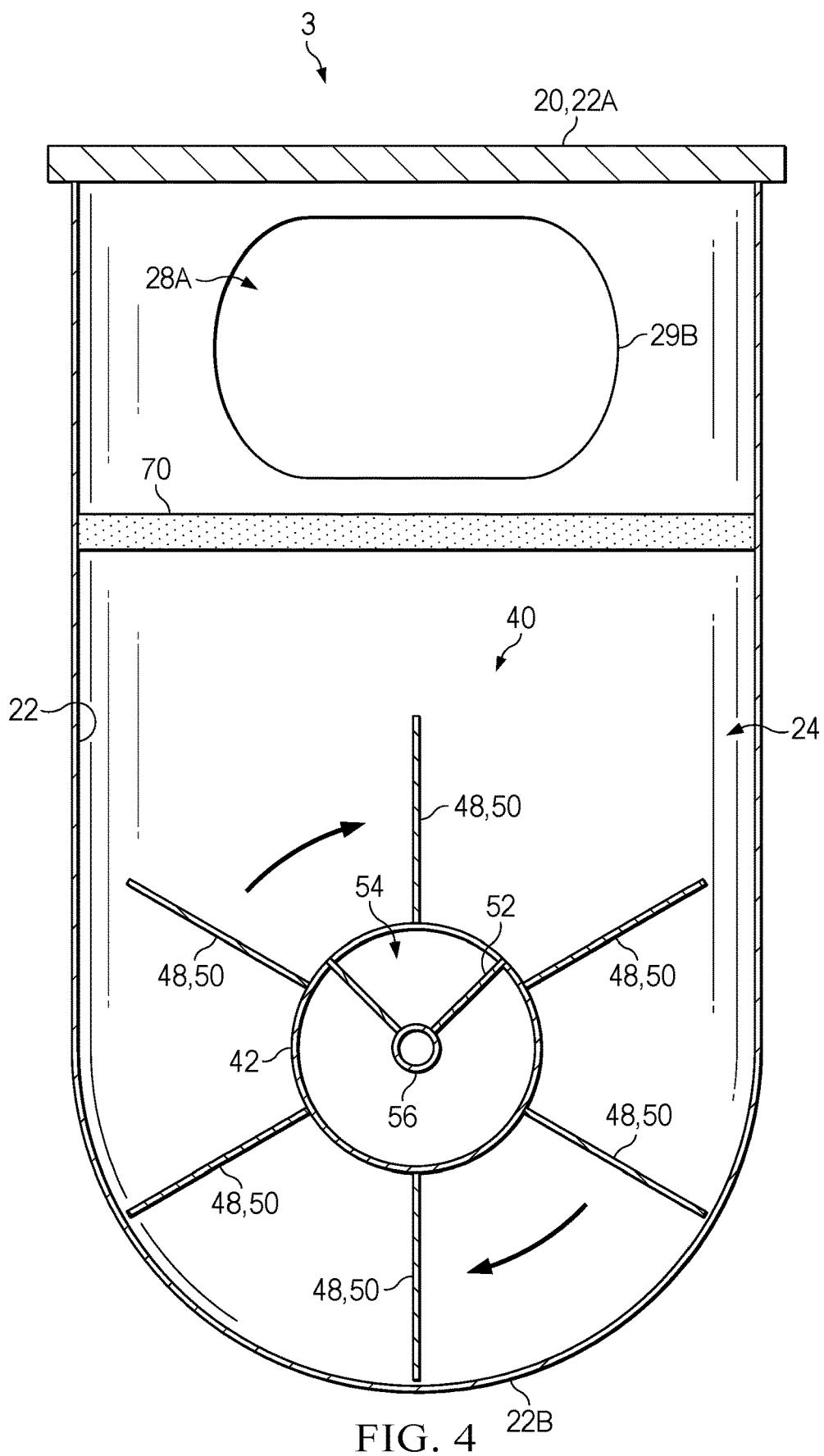
FIG. 4 is a partial longitudinal section view of the apparatus of the seawater distillation system taken in the direction of line 4-4 shown in FIG. 3.

Referring to FIGS. 3 and 4, the apparatus 3 may include a vessel 20. The vessel 20 may have a closed top end 20A, an opposing closed bottom end 20B, and a longitudinal axis defined therebetween. A portion of the vessel 20 proximate to the bottom end 20B may be rounded or curvilinear. Such use of the rounded or curvilinear shape is described in more detail below. In other exemplary embodiments, a portion of a vessel proximate to a bottom end may define any suitable shape or configuration. The vessel 20 also includes a circumferential wall 22 that extends between the top end 20A and the bottom end 20B. The vessel 20 also defines a chamber 24 that extends between the top end 20A and the bottom end 20B. With the closed ends 20A, 20B of the vessel 20, the vessel 20 is pressurized and sealed at a desired atmospheric pressure greater than the ambient pressure exterior to the chamber 24.

Referring to FIG. 3, the vessel 20 defines an inlet opening 26 in the circumferential wall 22 between the top end 20A and the bottom end 20B. The inlet opening 26 of the vessel 20 provides fluid communication between a seawater line 29A and the chamber 24 defined by the vessel 20 where the seawater line 29A is able to deliver seawater from a body of seawater into the vessel 20 via at least one pump connected to a main seawater line "SWL" (see FIG. 2). The vessel 20 also defines an output opening 28A in the circumferential wall 22 between the top end 20A and the bottom end 20B opposite to the inlet opening 26 relative to the longitudinal axis of the vessel 20. The output opening 28A of the vessel 20 provides fluid communication between a vessel steam line 29B and the chamber 24 defined by the vessel 20 where the vessel steam line 29B is able to deliver steam from the apparatus 3 to the at least one steam line 6 previously described above. The vessel 20 also defines a lower output opening 28B in the circumferential wall 22 between the top end 20A and the bottom end 20B. The lower output opening 28B is defined opposite to the inlet opening 26 and defined vertically below the output opening 28A relative to the longitudinal axis of the vessel 20. The lower output opening 28B of the vessel 20 provides fluid communication between the chamber 24 defined by the vessel 20 and the salt line "SL" where the salt line "SL" is able to deliver precipitated salt from the apparatus 3 to the at least one salt tank 10 previously described above. To maintain pressure inside of the vessel, at least one lock chamber (not illustrated) may be positioned within the salt line "SL" to transport precipitated salt from the apparatus 3 to the salt tank 10 without depressurizing the vessel 20. In other words, the lock chamber creates a two-stage seal mechanism that prevents depressurization of the vessel 20 during operation.

Referring to FIGS. 3 and 4, the apparatus 3 may include a separation or removal assembly 40 operably engaged with the vessel 20. The separation assembly 40 may also be configured to separate and/or remove a volume of salt from the volume of seawater inside of the vessel 20. The separation assembly 40 includes a structural support 42 that is operably engaged with the vessel 20. The structural support 42 includes a first end 42A, an opposing second end 42B, and a longitudinal axis defined therebetween. The first end 42A and the second end 42B of the structural support 42 is operably engaged with the circumferential wall 22 of the vessel 20 inside of the chamber 24. The structural support 42 is also structurally configured with the vessel 20A that the structural support 42 is able to rotate about its longitudinal axis when engaged with the vessel 20. Such rotation of the structural support 42 is described in more detail below.

Referring to FIGS. 3 and 4, the separation assembly 40 may include a bearing set 44 operably engaged with the structural support 42. The bearing set 44 is adapted to provide stability and support to the structural support 42 when the structural support 42 is rotating during a separation operation. As illustrated in FIGS. 3 and 4, the bearing set 44 includes a first bearing 44A and an opposing second bearing 44B. The first bearing 44A is operably engaged with the structural support 42 at the first end 42A of the structural support 42. The second bearing 44B is also operably engaged with the structural support 42 but at the second end 42B of the structural support 42. In the illustrated embodiment, the first and second bearings 44A, 44B may be ball bearings that provide stability and support to the structural support 42 when the structural support 42 is rotating during a separation operation. In other exemplary embodiments, any suitable bearing or rotational support member may be used to provide stability and support to a structural support when the structural support is rotating during a separation operation.

Figure 5:
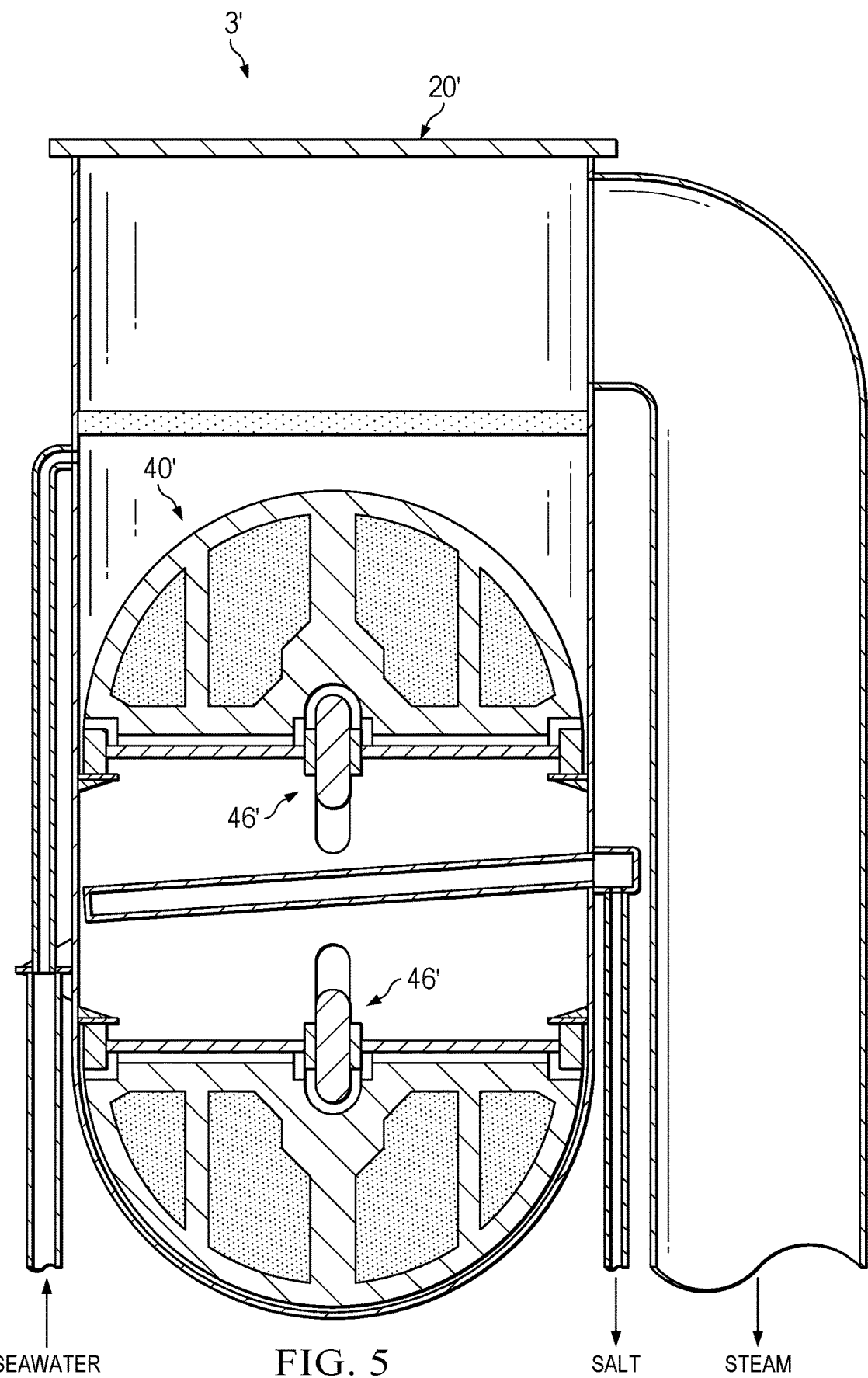
FIG. 5 is a partial longitudinal section view of an alternative apparatus of the seawater distillation system.
Figure 6:
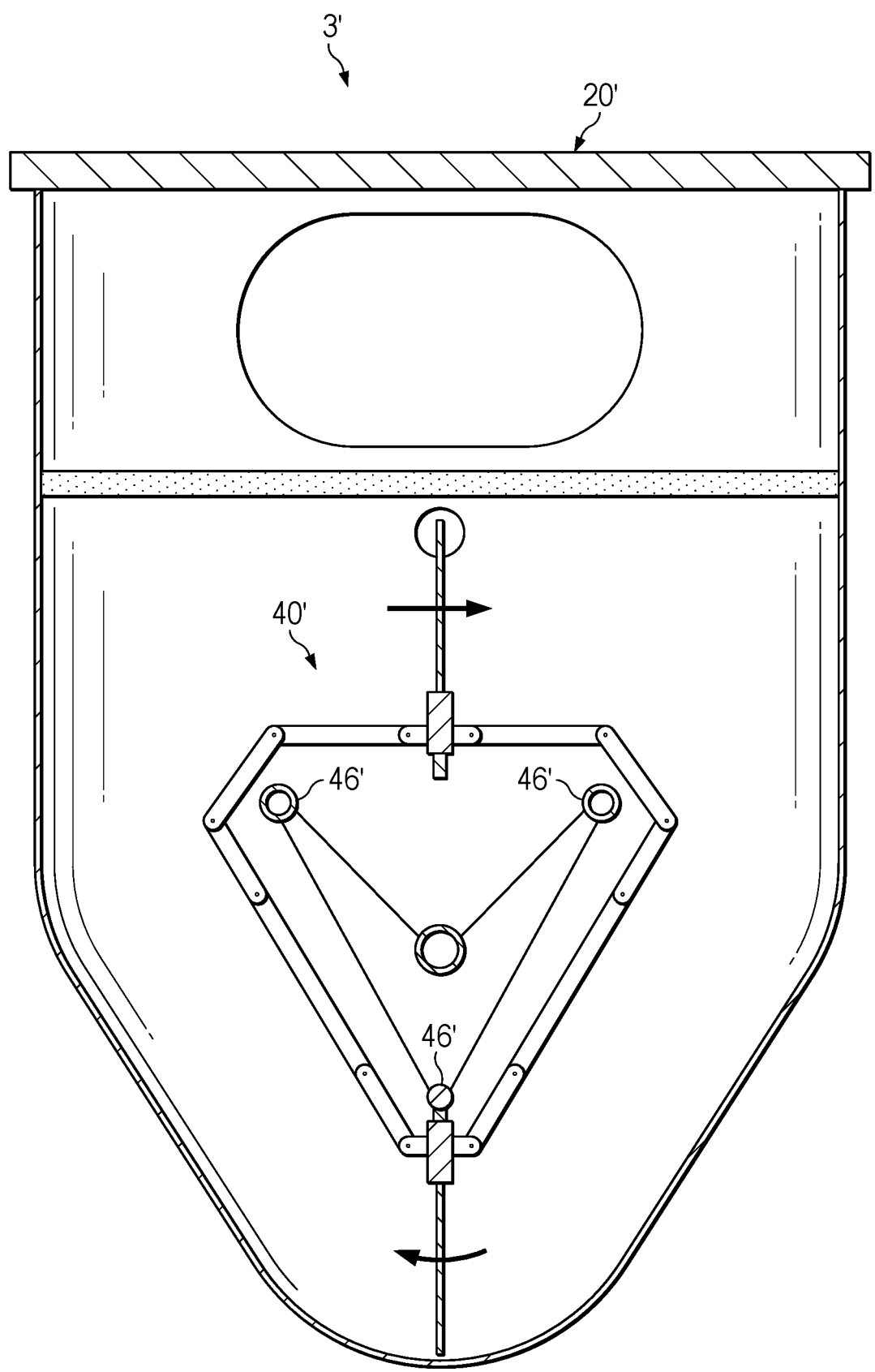
FIG. 6 is a partial longitudinal section view of the alternative apparatus of the seawater distillation system shown in FIG. 6.

Still referring to FIGS. 3 and 4, the separation assembly 40 may include a drive assembly 46 that is operably engaged with the structural support 42 and the vessel 20. The drive assembly 46 may be configured to provide movement and rotation to the structural support 42 to perform a separation operation, which is described in more detail below. The drive assembly 46 may include any suitable components, devices, apparatus, or machines to suitable rotate the structural support during a separation operation. As illustrated in FIGS. 3 and 4, the drive assembly 46 is a rotary-style drive assembly that rotates the structural support 42 and other components operably engaged with the structural support 42 (explained in detail below) about the longitudinal axis of said structural support 42. As illustrated in FIGS. 5 and 6, an alternative separation assembly 40' of an alternative apparatus 3' may include a drive assembly 46' that is a chain and sprocket-style drive assembly that rotates the structural support 42' and other components operably engaged with the structural support 42' (explained in detail below) about the longitudinal axis of said structural support 42'.

Still referring to FIGS. 3 and 4, the separation assembly 40 may include at least one rotating frame 48 operably engaged with the structural support 42 and radially extends away from the structural support 42. The at least one rotating frame 48 include a terminal end 49 that is complementary in shape with the bottom end 20B of the vessel 20. In the illustrated embodiment, the terminal end 49 of the at least one rotating frame 48 is curvilinear and/or rounded to complementary match the curvilinear and/or rounded bottom end 20B of the vessel 20. Such complementary shape between the at least one rotating frame 48 and the bottom end 20B of the vessel 20 is considered advantageous at least because the at least one rotating frame 48 may be able to efficiently collect a volume of salt from the seawater bath that settle at the bottom end 20B of the vessel 20. As illustrated in FIGS. 4, the separation assembly 40 includes six equally distanced rotating frames 48 that are operably engaged with the structural support 42 and radially extend away from the structural support 42.

Still referring to FIGS. 3 and 4, the separation assembly 40 may include a set of screens or colanders 50 operably engaged with the at least one rotating frame 48. The set of screens 50 are configured to the collect and gather precipitate salt from the externally heat seawater while allowing the water to permeate through each collecting member of the set of screens 50. As such, the set of screens 50 are adapted to hold a predetermined volume of salt when rotating with the at least one rotating frame 48 and structural support 42 during a separation operation. In the illustrated embodiment, the set of screens 50 provided on the at least one rotating frame 48 includes four screens 50. In other exemplary embodiments, any suitable number of screens or colander may be operably engaged with a single rotating frame including but not limited to one screen, at least one screen, two screens, a plurality of screens, three screens, and any other suitable numbers of screens or colanders operably engaged with a single rotating frame. In the illustrated embodiment, the set of screens 50 are relatively flat and parallel with the at least one rotating frame (see FIG. 4). In other exemplary embodiments, each screen of a set of screens may defined any suitable size, shape, or configuration based on various considerations, including the configuration of a vessel, the amount of seawater injected into the vessel, and other various considerations.

Still referring to FIGS. 3 and 4, the separation assembly 40 may include a housing member 52. The housing member 52 may be operably engaged with the structural support 42. In one exemplary embodiment, a housing member may be operably engaged with a vessel and remote from the structural support in which the housing member is independent of the structural support. The housing member 52 may define a cavity 54 that is configured to collect precipitated salt from the set of screens 50 once the set of screens 50 of at least one rotating frame 48 is substantially vertical above the housing member 52 and the precipitated salt falls off of the screens 50. In other exemplary embodiments, a housing member may be omitted and a cavity may be defined in a structural support for collecting precipitated salt from a set of screens.

Still referring to FIGS. 3 and 4, the separation assembly 40 may include a salt conveyor 56. The salt conveyor 56 includes a first end 56A, an opposing second end 56B, and a longitudinal axis defined therebetween. The salt conveyor 56 may be operably engaged with the vessel 20 and extend through the lower output opening 28B of the vessel 20. The salt conveyor 56 may be powered by the drive assembly 46 or be powered by an independent drive assembly separate from the drive assembly 46. The salt conveyor 56 is also configured to receive a continuous volume of precipitate salt from the cavity 54 and transport the volume of precipitate salt to the at least one salt tank 10 via the salt line "SL." In the illustrated embodiment, the salt conveyor 56 may be sloped upwardly from the first end 56A to the second end 56B relative to a longitudinal axis of the structural support 42. The upward slope or angle of the salt conveyor 56 allows for water to drip off of the precipitated salt when being transported along the longitudinal axis of the salt conveyor 56 from the first end 56A to the second end 56B in other exemplary embodiments, a salt conveyor may be configured at any suitable angle relative to the structural support.

Referring to FIG. 3, the apparatus 3 may include at least one mist eliminator 70. In the illustrated embodiment, the apparatus 3 includes a single mist eliminator 70. In other exemplary embodiments, any suitable number of mist eliminators may be used in an apparatus based on various considerations, including the size, shape, and configuration of the vessel, the volume of seawater injected into the vessel, and other various considerations of the like. The mist eliminator 70 may be operably engaged with the circumferential wall 22 inside of the chamber 24 vertically above the separation assembly 40 and vertically above the seawater bath that is held inside of the vessel 20. In the illustrated embodiment, the mist eliminator 70 is configured to remove water droplets and precipitated salt from the steam when converted from the seawater. As the steam passes through the mist eliminator 70 into the vessel steam line 29B, the steam fails to contain or comprise of any water droplets or salt. In other words, the mist eliminator 70 purifies the steam converted from seawater prior to be transported to the at least one condenser 7.

Having now described the components and assemblies of the apparatus 3, methods of using the apparatus 3 may be described below.

As illustrated in FIG. 3, a continuous volume of seawater is pumped into the vessel 20, via the seawater line 29A, from the main seawater pipeline "SWL" of the SDS 1. Once the seawater enters into the vessel 20, via the inlet opening 26, a seawater bath is formed inside of the vessel 20. Once inside of the vessel 20, the seawater bath begins to increase in temperature due to the external heat created on the vessel 20 via the plurality of heliostats 4 directed at the apparatus 3.

Upon entrance of the seawater, the separation assembly 40 may begin separating and/or removing precipitated salt from the seawater bath once the salt from the seawater begins to precipitate or crystallize out of the seawater (via the external heat source). During this operation, the drive assembly 46 may begin rotating the structural support 42 about the longitudinal axis of the structural support 42. Once the structural support 42 begins to rotate, the at least one rotating frame 48 with the set of screens 50 rotates with the structural support 42 inside of the vessel 20. During the separation operation, the at least one rotating frame 48 rotates towards the bottom end 20B of the vessel 20 where the set of screens 50 collects and traps a volume of precipitated salt from seawater bath while allowing seawater to permeate through. The set of screens 50 are able to collect the volume of precipitate salt due to the configuration of the screens 50 entrapping salt. Moreover, the external heat created by the plurality of heliostats on the vessel 20 may be provide ease of gathering and collecting precipitate salt from the seawater bath.

Once a volume of precipitate salt is collected, the at least one rotating frame 48, along with the set of screens 50, rotates away from the bottom end 20B of the vessel 20 towards the mist eliminator 70 and the top end 20A of the vessel 20 (see FIG. 4). Once the at least one rotating frame 48 is substantially vertically over the cavity 54, the precipitated salt on the set of screens 50 falls from the screens 50 and into the cavity 54 towards the salt conveyor 56. Once on the salt conveyor 56, the precipitated salt is transported from the first end 56A towards the second end 56B and into the salt line "SL." During transportation, any excess water provided on the precipitated salt may be drained from the precipitated salt due to the angle of the salt conveyor 56 inside of the vessel 20.

Once inside of the salt line "SL" and away from the vessel, the precipitated salt may be housed inside of the lock chamber downstream on the salt line "SL" and away from the vessel 20. The lock chamber may be configured to transport a volume of precipitated salt from the vessel 20 to the at least one salt tank 10 while maintaining the pressure and heat inside of the vessel 20. In other exemplary embodiments, any suitable number of lock chambers may be used with an apparatus for transporting volumes of precipitated salt from a vessel to at least one salt tank while maintaining the constant pressure and heat inside of the vessel.

Referring to FIG. 3, the bath of seawater housed inside of the vessel 20 may convert from the liquid to steam via the external heat created by the plurality of heliostats 4 on the vessel 20. As the steam rises from the seawater bath, the steam permeates through the mist eliminator 70. As described above, the mist eliminator 70 will purify the steam by eliminating and/or removing water droplets and/or precipitated salt from the steam. As the steam passes through the mist eliminator 70, the steam travels through the output opening 28A and into the vessel steam line 29B. Once inside of the vessel steam line 29B, the steam is transported into the at least one steam line 6 of SDS 1 and into the at least one condenser 7. Once inside of the at least one condenser 7, the at least one condenser 7 condenses and/or converts the purified steam into fresh, distilled water. The fresh water condensed by the at least one condenser is transported to at least one fresh water tank via water lines "WL" shown in FIG. 2.

The separation of salt and distillation of seawater may be repeated discretely or continuously based on the SDS. As illustrated above, the SDS 1 would be a continuous operation in which separation of salt and distillation of seawater would be continuously performed.

It should be understood that FIGS. 1-6 are diagrammatic only for the SDS 1 and do not illustrate exact and precise dimensions of any component, assembly, or apparatus provided herein. Such diagrammatic illustrations of the apparatus 3 and the remaining machines, components, and systems of the SDS 1 shown in FIGS. 1-6 should not limit the exact positioning, orientation, or location of the apparatus 3 and the remaining machines, components, and systems of the SDS 1 relative to one another.

Figure 7:
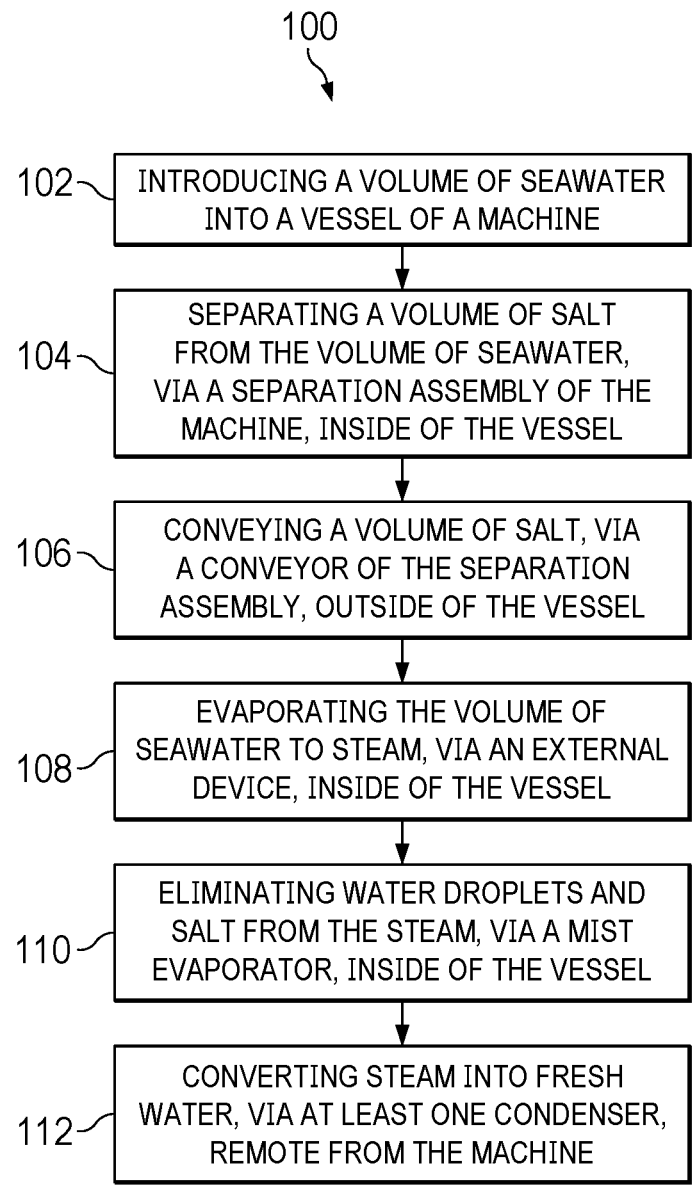
FIG. 7 is an exemplary method flowchart for evaporating seawater and removing salt.

FIG. 7 illustrates a method 100 of converting seawater into fresh water. An initial step 102 of method 100 includes introducing a volume of seawater into a vessel of a machine. Another step 104 includes separating a volume of salt from the volume of seawater, via a separation assembly of the machine, inside of the vessel. Another step 106 includes conveying a volume of salt, via a conveyor of the separation assembly, outside of the vessel. Another step 108 includes evaporating the volume of seawater to steam, via an external device, inside of the vessel. Another step 110 includes eliminating water droplets and salt from the steam, via a mist evaporator, inside of the vessel. Another step includes converting steam into fresh water, via at least one condenser, remote from the machine.

Figure 8:
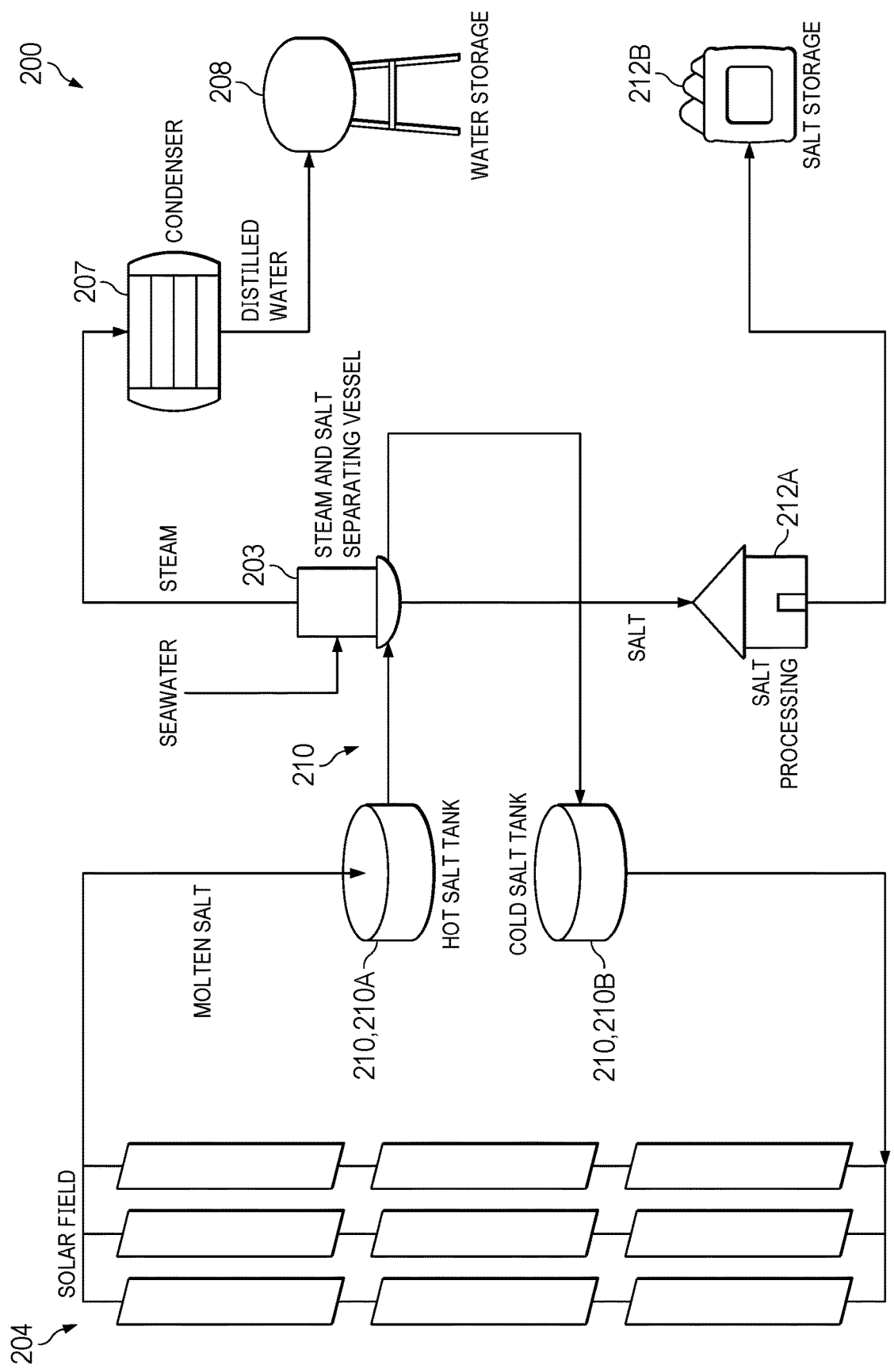
FIG. 8 is a diagrammatic view of another seawater distillation system in accordance with another aspect of the present disclosure.

FIG. 8 illustrates another system 200 similar to system 1 provided in FIGS. 1-6, except as detailed below. In the illustrated embodiment, the system 200 may be configured to use solar power to distill seawater into fresh water and salt. As illustrated in FIG. 8, a plurality of parabolic troughs 204 may be provided in the system 200 (see "Solar Field" label in FIG. 8). Each parabolic trough of the plurality of parabolic troughs 204 may include a parabolic reflector or curved mirror that houses an absorber tube or trough holding a volume of molten salt. The molten salt may be transported from plurality of parabolic troughs 204 via a molten salt transport system 210. The molten salt transport system 210 may include a hot salt tank 210A, which is in fluid communication with the plurality of parabolic troughs 204. The hot salt tank 210A is adapted to be heated at a first temperature to maintain or further heat the molten salt.

The molten salt is then transported into an apparatus 203 (substantially similar to apparatus 3 described above) for heating the apparatus 203 as compared to be heated by the plurality of heliostats 4 in SDS 1 described above. In other exemplary embodiment, molten salt transported into an apparatus via a molten salt transport system may provide an internal heat source to the apparatus while a plurality of heliostats provides an external heat source on an apparatus. In system 200, the apparatus 203 is remote from the plurality of parabolic troughs 204.

Once separated by the apparatus 203, the molten salt is then transported to a cold salt tank 210B of the molten salt transport system 210, which is in fluid with the apparatus 203. Additionally, salt collected by the apparatus 203 may be transferred into the molten salt transport system 210 or into a salt transport system 212 for housing useable salt (similar to the salt storage 10 described above). In this salt transport system 212, the salt would be transported to a salt processing stage 212A for suitable processing techniques and methods and then transported to a salt storage 212B. The cold salt tank 210B is adapted to be heated at a second temperature less than first temperature of the hot salt tank 210A. This molten salt is then transported back into the plurality of parabolic troughs 204 to be heated once again. This transportation of molten salt along the molten salt transport system 210 may continuously provide internal heat to the apparatus 203 to convert seawater into steam.

It should be understood that FIG. 8 is diagrammatic only for the SDS 200 and do not illustrate exact and precise dimensions of any component, assembly, or apparatus provided herein. Such diagrammatic illustrations of the apparatuses, machines, components, and systems of the SDS 200 shown in FIG. 8 should not limit the exact positioning, orientation, or location of the apparatuses, machines, components, and systems of the SDS 200 relative to one another.

Figure 9:
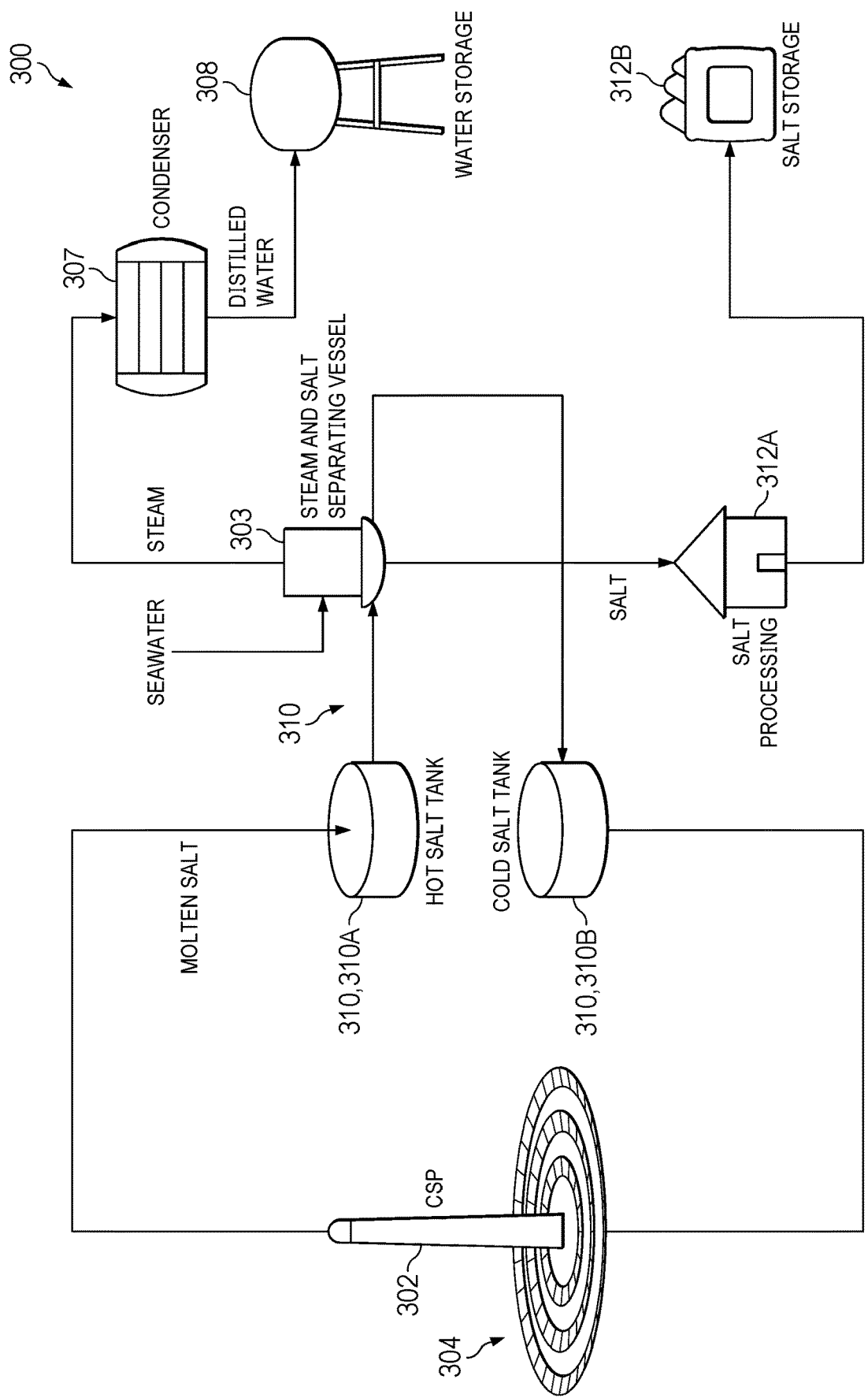
FIG. 9 is a diagrammatic view of another seawater distillation system in accordance with another aspect of the present disclosure.

FIG. 9 illustrates another system 300 similar to systems 1 and 200 provided in FIGS. 1-6 and 8, except as detailed below. In the illustrated embodiment, the system 300 may be configured to use solar power to distill seawater into fresh water and salt (i.e., using concentrated solar power technology). As illustrated in FIG. 9, a solar tower 302 may be provided in an epicenter of a plurality of heliostats 304 that is circumferentially disposed about the tower 302. As compared to systems 1 and 200, the tower 302 holds a continuous volume of molten salt that is heated via the external heat source created by the plurality of heliostats 304. The molten salt may be transported from tower 302 and away from tower 302 via a molten salt transport system 310. The molten salt transport system 310 may include a hot salt tank 310A, which is in fluid communication with the tower 302. The hot salt tank 310A is adapted to be heated at a first temperature to maintain or further heat the molten salt.

The molten salt is then transported into an apparatus 303 (substantially similar to apparatuses 3, 203 described above) for heating the apparatus 303 as compared to be heated by the plurality of heliostats 4 in SDS 1 described above. In other exemplary embodiment, molten salt transported into an apparatus via a molten salt transport system may provide an internal heat source to the apparatus while a plurality of heliostats provides an external heat source on an apparatus. In the illustrated embodiment, the apparatus 303 may be provided at ground level remote from the tower 302. In other exemplary embodiments, an apparatus may be placed at any suitable location relative to a tower.

Once separated by the apparatus 303, the molten salt is then transported to a cold salt tank 310B of the molten salt transport system 310, which is in fluid with the apparatus 303. Additionally, salt collected by the apparatus 303 may be transferred into the molten salt transport system 310 or into a salt transport system 312 for housing useable salt (similar to the salt storage 10 described above). In this salt transport system 312, the salt would be transported to a salt processing stage 312A for suitable processing techniques and methods and then transported to a salt storage 312B. The cold salt tank 310B is adapted to be heated at a second temperature less than first temperature of the hot salt tank 310A. This molten salt is then transported back into the tower 302 to be heated once again via the external heat source created by the plurality of heliostats 304. This transportation of molten salt along the molten salt transport system 310 may continuously provide internal heat to the apparatus 303 to convert seawater into steam.

It should be understood that FIG. 9 is diagrammatic only for the SDS 300 and do not illustrate exact and precise dimensions of any component, assembly, or apparatus provided herein. Such diagrammatic illustrations of the apparatuses, machines, components, and systems of the SDS 300 shown in FIG. 9 should not limit the exact positioning, orientation, or location of the apparatuses, machines, components, and systems of the SDS 300 relative to one another.

Figure 10:
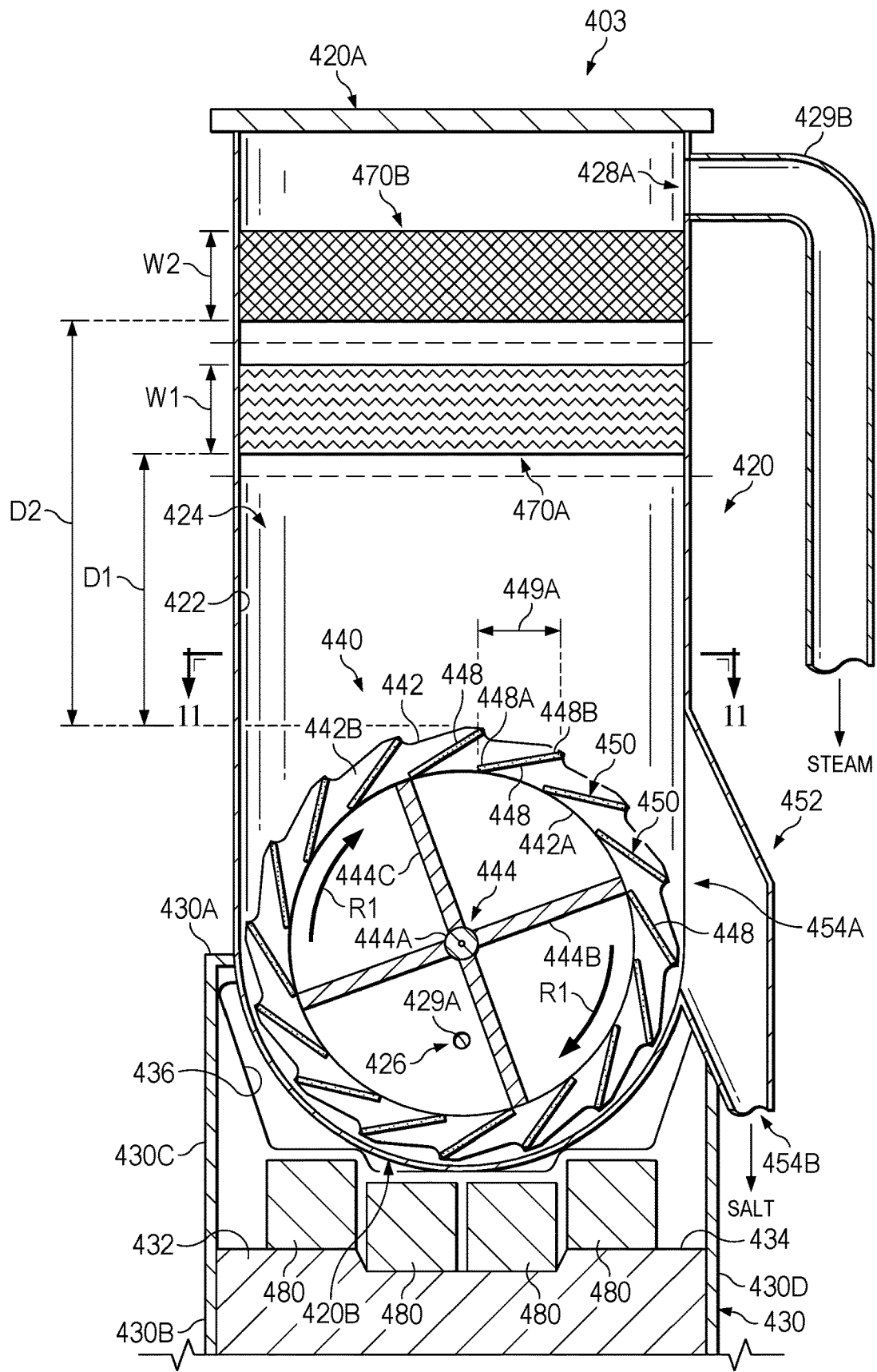
FIG. 10 is a longitudinal sectional view of another apparatus of a seawater distillation system.
Figure 11:
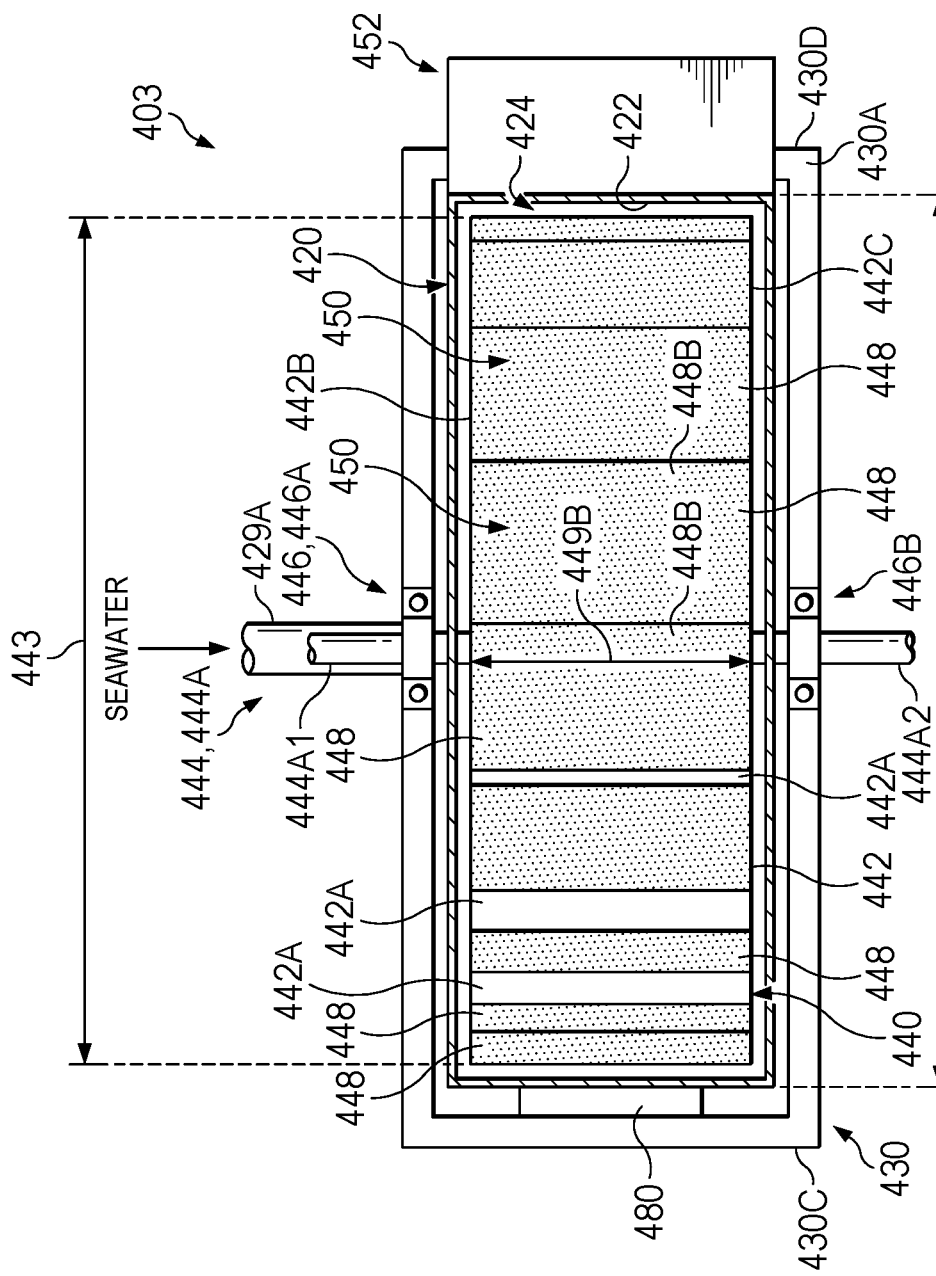
FIG. 11 is a cross-sectional view of the apparatus taken in the direction line 11-11 in FIG. 10.

FIGS. 10 and 11 illustrate another seawater distillation system (SDS) 400 that is substantially similar to the SDS 1 illustrated in FIGS. 1 through 4, except as detailed below. The SDS 400 has an apparatus 403 that is substantially similar to the apparatus 3 of the SDS 1, except as detailed below.

Referring to FIGS. 10 and 11, the apparatus 403 may include a vessel 420. The vessel 420 may have a closed top end 420A, an opposing closed bottom end 420B, and a longitudinal axis defined therebetween. A portion of the vessel 420 proximate to the bottom end 420B may be rounded or curvilinear. Such use of the rounded or curvilinear shape is described in more detail below. In other exemplary embodiments, a portion of a vessel proximate to a bottom end may define any suitable shape or configuration. The vessel 420 also includes a circumferential wall 422 that extends between the top end 420A and the bottom end 420B. The circumferential wall 422 defines a diameter 423 (see FIG. 11) that is continuous from the top end 420A towards the bottom end 420B. In one exemplary embodiment, the diameter 423 defined by the circumferential wall 422 is about four feet. The top end 420A, the bottom end 420B, and the circumferential wall 422 collectively define a chamber 424 that extends between the top end 420A and the bottom end 420B. With the closed ends 420A, 420B of the vessel 420, the vessel 420 is pressurized and sealed at a desired atmospheric pressure greater than the ambient pressure exterior to the chamber 424.

Referring to FIG. 10, the vessel 420 defines an inlet opening 426 in the circumferential wall 422 at a position between the top end 420A and the bottom end 420B. The inlet opening 426 of the vessel 420 provides fluid communication between a seawater line 429A (see FIG. 11) and the chamber 424 defined by the vessel 420. The seawater line 429A is able to deliver seawater from a body of seawater into the vessel 420 via at least one pump (e.g., the at least one pump 9) connected to a main seawater line "SWL" (see FIG. 2). The vessel 420 also defines an output opening 428A in the circumferential wall 422 at a position between the top end 420A and the bottom end 420B opposite to the inlet opening 426 relative to the longitudinal axis of the vessel 420. The output opening 428A of the vessel 420 provides fluid communication between a vessel steam line 429B and the chamber 424 defined by the vessel 420; the vessel steam line 429B is able to deliver steam from the apparatus 403 to the at least one steam line previously described above.

Still referring to FIG. 10, the apparatus 403 may include a base frame 430 to hold the vessel 420. The base frame 430 may include a first or top end 430A, an opposing second or bottom end 430B, a first or left side 430C, and an opposing second or right side 430D. The base frame 430 also includes a platform 432 that is operably engaged between the left and right sides 430C, 430D of the base frame 430. The platform 432 includes an upper support wall 434 that extends longitudinally along the platform 432 between the left and right sides of the base frame 430. The platform 432 may also include a set of heat shields 436. Each heat shield of the set of heat shields 436 may be operably engaged with the base frame 430 to fully encapsulate devices operably engaged with the platform 432 inside of the base frame 430. Such use and purpose of the set of heat shields 436 is described in more detail below.

Referring to FIGS. 10 and 11, the apparatus 403 may include a separation or removal assembly 440 operably engaged with the vessel 420. The separation assembly 440 may also be configured to separate and/or remove a volume of salt from the volume of seawater inside of the vessel 420, which is described in more detail below. The separation assembly 440 includes a structural support or wheel 442 that is operably engaged with the vessel 420. The wheel 442 includes a circumferential base wall 442A operably engaged with a first lateral wall 442B and an opposing second lateral wall 442C (see FIG. 11). The wheel 442 is also structurally configured with the vessel 420 where the wheel 442 is able to move and/or rotate inside of the vessel 420 during separation operations. Such rotation of the wheel 442 is described in more detail below. The wheel 442 also defines a diameter 443 (see FIG. 11) that is complementary to the diameter 423 of the vessel 420. In other words, the diameter 443 of the wheel 442 is substantially equal to the diameter 423 of the vessel 420 where the wheel 442 is able to collect and gather precipitate salt while still being able to move and/or rotate inside of the vessel 420 during separation operations. In one exemplary embodiment, the diameter 443 of the wheel 442 is about four feet where the wheel 442 is able to collect and gather precipitate salt while still being able to move and/or rotate inside of the vessel 420.

The separation assembly 440 also includes a drive assembly 444 operably engaged with the wheel 442. As illustrated in FIG. 11, the drive assembly 444 has a drive shaft 444A with a first or front end 444A1, an opposing second or rear end 444A2, and a longitudinal axis defined therebetween. The drive shaft 444A is operably engaged with the wheel 442 via first and second cross members 444B, 444C. In the illustrated embodiment, the first and second cross members 444B, 444C are operably engaged with the circumferential base wall 442A of the wheel 442. Such engagement between the drive assembly 444 and the wheel 442 allows the drive assembly 444 to move the wheel 442 about the longitudinal axis of the drive shaft 444A via a motor (not illustrated) or similar mechanism operably engaged with said drive shaft 444A. The movement of the wheel 442 via the drive assembly 444 is denoted by arrows labeled "R1" in FIG. 10.

Referring to FIG. 11, the separation assembly 440 may include at least one bearing set 446 operably engaged with the base frame 430. The at least bearing set 446 is adapted to provide stability and support to the wheel 442 when the wheel 442 is rotating during a separation operation. As illustrated in FIG. 11, the bearing set 446 includes a first bearing 446A and an opposing second bearing 446B. The first bearing 446A is operably engaged with the drive shaft 444A proximate to the first end 444A1 of the drive shaft 444A. Similarly, the second bearing 446B is operably engaged with the drive shaft 444A proximate to the second end 444A2 of the drive shaft 444A. In the illustrated embodiment, the first and second bearings 446A, 446B may be ball bearings that provide stability and support to the drive shaft 444A of the drive assembly 444 when the drive shaft 444A is rotating during a separation operation. In other exemplary embodiments, any suitable bearing or rotational support member may be used to provide stability and support to a structural support when the structural support is rotating during a separation operation.

Still referring to FIG. 10, the separation assembly 440 may include at least one set of collecting members 448 operably engaged with the wheel 442. Specifically, the at least one set of collecting members 448 is operably engaged with the circumferential base wall 442A, the first lateral wall 442B, and the second lateral wall 442C. In the illustrated embodiment, the separation assembly 440 includes a single set or flight of collecting members 448. The set of collecting members 448 is considered advantageous at least because the set of collecting members 448 are configured to collect a volume of salt from the seawater bath that settle at the bottom end 420B of the vessel 420 while allowing the water to drain through the set of collecting members 448 and back into the vessel 420. Such separation operation by the set of collecting members 448 is described in more detail below.

The set of collecting members 448 is configured to the collect and gather precipitate salt from the externally heat seawater while allowing the water to permeate through each collecting member of the set of collecting members 448. As such, the set of collecting members 448 are adapted to hold a predetermined volume of salt when rotating with the wheel 442 and drive assembly 444 during a separation operation. As illustrated in FIG. 10, each collecting member of the set of collecting members 448 has a first end 448A operably engaged with the circumferential base wall 442A, and opposing second end 448B free from engagement with and remote from the circumferential base wall 442A, and a longitudinal axis defined therebetween. Each collecting member of the set of collecting members 448 also has a length 449A defined between the first and second ends 448A, 448B (See FIG. 10) and a width 449B defined between the first and second lateral walls 442B, 442C (see FIG. 11). In one exemplary embodiment, the width 449B of each collecting member of the set of collecting members 448 is about sixteen inches based on a three to one ratio between the diameter 443 of the wheel 442 and the width 449B of each collecting member of the set of collecting members 448.

The second or terminal end 448B of each collecting member of the set of collecting members 448 is complementary in shape with the bottom end 420B of the vessel 420. Such complementary shape between the at least one set of collecting members 448 and the bottom end 420B of the vessel 420 is considered advantageous at least because the at least one set of collecting members 448 may be able to efficiently collect a volume of salt from the seawater bath that settles at the bottom end 420B of the vessel 420. As illustrated in FIG. 10, the separation assembly 440 includes sixteen equally distanced collecting members in the set of collecting members 448 that are operably engaged with the circumferential base wall 442A and radially extend away from the circumferential base wall 442A. In other exemplary embodiments, a separation assembly may include any suitable number of collecting members in a set of screens based on various considerations, including the size, shape, and configuration of the wheel, the size, shape and configuration of the vessel, and other various considerations of the like.

As illustrated in FIG. 10, each collecting member of the set of collecting members 448 is disposed at an angle relative to one or both of the first and second lateral walls 442B, 442C of the wheel 442. The structural configuration of each collecting member of the set of collecting members 448 being disposed at an angle relative to one or both of the first and second lateral walls 442B, 442C is considered advantageous at least because the at least one set of collecting members 448 may be able to collect a volume of salt from the seawater bath that settles at the bottom end 420B of the vessel 420 while draining water back into the seawater bath inside of the vessel 420. In the illustrated embodiment, each collecting member of the set of collecting members 448 are relatively flat along its length (see FIG. 10). In other exemplary embodiments, each collecting member of a set of collecting members may define any suitable size, shape, or configuration based on various considerations, including the configuration of a vessel, the amount of seawater pumped into the vessel, and other various considerations.

In the illustrated embodiment, each collecting member of the set of collecting members 448 is a porous wall (e.g., a screen, colander, and other devices of the like) to collect a volume of salt from the seawater bath that settle at the bottom end 420B of the vessel 420. Having each collecting member of set of collecting members being a porous wall is considered advantageous at least because the set of collecting members may be able to collect a volume of salt from the seawater bath that settle at a bottom end of a vessel while allowing the water to drain through the set of collecting members and back into the vessel for steam and condensing purposes. Such separation operation by the set of collecting members 448 is described in more detail below. In one exemplary embodiment, each collecting member of the set of collecting member may be a solid wall for scooping and retaining a volume of precipitate salt and water. In other words, each collecting member of the set of collecting member may act as a basket to collect a volume of salt from the seawater bath that settle at a bottom end of a vessel.

Referring to FIGS. 10 and 11, a receptacle 450 is defined between each collecting member of the set of collecting members 448, a portion of the circumferential base wall 442A, a portion of the first lateral wall 442B, and a portion of the second lateral wall 442C. The receptacle 450 inside each collecting member of the set of collecting members 448 is configured to the collect and gather precipitate salt from the externally heat seawater while allowing the water to permeate through each collecting member of the set of collecting members 448. As such, the set of collecting members 448 are adapted to hold a predetermined volume of salt when rotating with the wheel 442 and drive assembly 444 during a separation operation Still referring to FIG. 10, the separation assembly 440 may include a salt conveyor 452 operably engaged with the vessel 420. In the illustrated embodiment, the salt conveyor 452 is integral with the vessel 420 where the salt conveyor 452 and the vessel 420 depict a single, unitary member. The salt conveyor 452 defines an inlet opening 454A that provides an additional access point into the chamber 424 of the vessel 420. The salt conveyor 452 also defines an outlet opening 454B at a position away from the vessel 420 exterior to the chamber 424. As provided herein, the salt conveyor 452 is configured to receive a continuous volume of precipitate salt from the wheel 442, collected by the set of collecting members 448, and to transport the volume of precipitate salt to the at least one salt tank 10 via a salt line (e.g., salt line "SL"). In the illustrated embodiment, the salt conveyor 452 may have a funneled portion that extends inwardly from the inlet opening 454A to the outlet opening 454B for transporting volume of precipitate salt to the at least one salt tank 10.

During operation, the salt conveyor 452 delivers the precipitated salt into the salt line where the salt line is able to deliver said precipitated salt from the apparatus 403 to at least one salt tank previously described above (e.g., the at least one salt tank 10). To maintain pressure inside of the vessel, at least one lock chamber (not illustrated) may be positioned within the salt line to transport precipitated salt from the apparatus 403 to the at least one salt tank without depressurizing the vessel 420. In other words, the lock chamber creates a two-stage seal mechanism that prevents depressurization of the vessel 420 during operation. Such configuration is substantially equal to the lock chamber provided in the apparatus 3 described above.

Referring to FIG. 10, the apparatus 403 may include at least one mist eliminator 470. In the illustrated embodiment, the apparatus 403 includes a first mist eliminator 470A and a second mist eliminator 470B. In other exemplary embodiments, any suitable number of mist eliminators may be used in an apparatus based on various considerations, including the size, shape, and configuration of the vessel, the volume of seawater injected into the vessel, and other various considerations of the like.

Each of the first and second mist eliminators 470A, 470B may be operably engaged with the circumferential wall 422 of the vessel 420 inside of the chamber 424 vertically above the separation assembly 440 and vertically above the seawater bath that is held inside of the vessel 420. In the illustrated embodiment, the first and second mist eliminators 470A, 470B are configured to remove water droplets and precipitated salt from the steam when converted from the seawater. As the steam initially passes through the first mist eliminator 470A, the steam endures a first purification stage where the first mist eliminator 470A removes any water droplets or excess salt precipitate from said steam. For further removal, the steam endures a second purification stage where the second mist eliminator 470B removes any remaining water droplets or excess salt precipitate from said steam. Upon passing through the first and second mist eliminators 470A, 470B, the steam is free of any water droplets or precipitated salt. In other words, the first and second mist eliminators 470A, 470B purifies the steam converted from seawater prior to be transported to the at least one condenser (e.g., the at least one condenser 7).

In the illustrated embodiment, the first mist eliminator 470A is a single mesh type mist eliminator, and the second mist eliminator 470B is a single vane or chevron (plate) type mist eliminator. In other exemplary embodiment, first and second mist eliminator may be any suitable type of mist eliminator geometry described herein or other available geometries based on the application for removing water droplets, precipitate salt, or other solids and fluids. The different geometries between the first mist eliminator 470A and the second mist eliminator 470B is considered advantageous at least because such difference in structural geometries allow for fine-tuning the performances of the mist eliminators to screen and remove solids and fluids in the steam.

Referring to FIG. 10, the first mist eliminator 470A defines a first width "W1" and the second mist eliminator 470B defines a second width "W2"; the first width "W1" of the first mist eliminator 470A is greater than the second width "W2" of the second mist eliminator 470B. In the illustrated embodiment, the first width "W1" of the first mist eliminator 470A is about eighteen inches, and the second width "W2" of the second mist eliminator 470B is about twelve inches. In other exemplary embodiments, first and second mist eliminators may define any suitable width based on the particular application. In one exemplary embodiment, a first width defined by a first mist eliminator is substantially equal to a second width defined by a second mist eliminator. In another exemplary embodiment, a first width defined by a first mist eliminator is less than a second width defined by a second mist eliminator.

Still referring to FIG. 10, the first mist eliminator 470A is disposed at a first distance "D1" away from the top end of the wheel 442 of the separation assembly 440, and the second mist eliminator 470B is disposed at a second distance "D2" away from top end of the wheel 442; the second distance "D2" is greater than the first distance "D1" as shown in FIG. 10. In the illustrated embodiment, the first distance "D1" is about four feet between the top end of the wheel 442 and the bottom end of the first mist eliminator 470A, which substantially equal to the diameter of the wheel 442. Additionally, the second distance "D2" is about five feet between the top end of the wheel 442 and the bottom end of the second mist eliminator 470B (or twelve inches above the first mist eliminator 470A).

Still referring to FIG. 10, the apparatus 403 may also include at least one heater 480 operably engaged with the platform 432, specifically with the upper support wall 434 of the platform 432. Such engagement with the platform 432 and encapsulation by the set of heat shields 436 allows the base frame 430 to retain and conserve the heat energy generated by the at least one heater 480. As such, the at least one heater 480 may be configured to provide external heat at the bottom end 420B of the vessel 420 to evaporate the water from a liquid state to a vapor state (i.e., steam). During separation operations, the at least one heater 480 may be used when the apparatus 403 is provided on a ground surface.

The at least one heater 480 may be powered by propane gas or other similar fuels for generating heat for the at least one heater 480. In other exemplary embodiments, any suitable energy source or mechanism may be used to power at least one heater for providing external heat at a bottom end of a vessel. In the illustrated embodiment, four heaters 480 are operably engaged with the base frame 430 inside of the platform 432. In other exemplary embodiments, any suitable number of heaters may be operably engaged with a base frame inside of a platform based on various considerations, including the size, shape and configuration of a vessel.

Having now described the components and assemblies of the apparatus 403, methods of using the apparatus 3 may be described below.

As illustrated in FIG. 10, a continuous volume of seawater is pumped into the vessel 420, via the seawater line 429A, from the main seawater pipeline "SWL" of the SDS 1. Once the seawater enters into the vessel 420, via the inlet opening 426, a seawater bath is formed inside of the vessel 420. Once inside of the vessel 420, the seawater bath begins to increase in temperature due to the external heat created on the vessel 420 via the at least one heater 480 directed at the apparatus 403.

Upon entrance of the seawater, the separation assembly 440 may begin separating and/or removing precipitated salt from the seawater bath once the salt from the seawater begins to precipitate or crystallize out of the seawater (via the external heat source). During this operation, the drive assembly 444 may begin rotating the wheel 442 about the longitudinal axis of the drive shaft 444A. Once the wheel 442 begins to rotate, the set of collecting member 448 rotates with the wheel 442 inside of the vessel 420. During the separation operation, the set of collecting members 448 rotates towards the bottom end 420B of the vessel 420 where the set of collecting members 448 collects and traps a volume of precipitated salt from seawater bath while allowing water to permeate through (i.e., collecting members 448 being porous walls). The set of collecting members 448 is able to collect the volume of precipitate salt due to the configuration of each collecting member 448 entrapping salt. Moreover, the external heat created by the at least one heater 480 on the vessel 420 may also provide ease of gathering and collecting precipitate salt from the seawater bath.

Once a volume of precipitate salt is collected, the set of collecting members 448 rotates away from the bottom end 420B of the vessel 420 towards the first and second mist eliminators 470A, 470B and the top end 420A of the vessel 420 (see FIG. 10). Once a collecting member of the set of collecting members 448 is substantially vertically over the salt conveyor 452, the precipitated salt on the respective collecting member of the set of collecting members 448 falls from the respective collecting member and into the salt conveyor 452. Specifically, the precipitated salt on the respective collecting member of the set of collecting members 448 falls from the respective collecting member and into the inlet opening 454A of the salt conveyor 452. Once in the salt conveyor 452, the precipitated salt is transported from inlet opening 454A towards the outlet opening 454B and into the salt line. During transportation, any excess water provided on the precipitated salt may be drained from the precipitated salt due to the set of collecting members 448 being porous walls.

Once inside of the salt line "SL" and away from the vessel 420, the precipitated salt may be housed inside of a lock chamber (not illustrated) downstream on the salt line and away from the vessel 420. The lock chamber may be configured to transport a volume of precipitated salt from the vessel 420 to at least one salt tank (such as at least one salt tank 10) while maintaining the pressure and heat inside of the vessel 420. In other exemplary embodiments, any suitable number of lock chambers may be used with an apparatus for transporting volumes of precipitated salt from a vessel to at least one salt tank while maintaining the constant pressure and heat inside of the vessel.

Referring to FIG. 10, the bath of seawater housed inside of the vessel 420 may evaporate from the liquid state to the vapor state (i.e., steam) via the external heat created by the at least one heater 480 on the vessel 420. As the steam rises from the seawater bath, the steam permeates through the first mist eliminator 470A. As described above, the first mist eliminator 470A purifies the steam in a first purification stage by eliminating and/or removing water droplets and excess precipitated salt from the steam. As the steam passes through the first mist eliminator 470A, the steam then permeates through the second mist eliminator 470B. As described above, the second mist eliminator 470B further purifies the steam in a second purification stage by further eliminating and/or removing water droplets and excess precipitated salt from the steam. As the steam passes through the second mist eliminator 470B, the steam then passes through the output opening 428A and into the vessel steam line 429B.

Once inside of the vessel steam line 429B, the steam is transported into at least one steam line (e.g., the at least one steam line 6) of SDS 1 and into at least one condenser (e.g., the at least one condenser 7). Once inside of the at least one condenser, the at least one condenser condenses and/or converts the purified steam into fresh, distilled water. The fresh water condensed by the at least one condenser is transported to at least one fresh water tank via water lines "WL" shown in FIG. 2.

The separation of salt and distillation of seawater may be repeated discretely or continuously based on the SDS. As illustrated above, the SDS would be a continuous operation in which separation of salt and distillation of seawater would be continuously performed.

The apparatus 403 may be used with any SDS 1, 200, 300 described and illustrated herein. In one instance, the apparatus 403 may be operably engaged with a solar tower (such as solar tower 2) where the at least one heater 480 may be removed and externally heated by a plurality of heliostats (such as the plurality of heliostats 4) at an elevated level above ground surface. In another instance, the apparatus 403 may also be powered by a plurality of photovoltaic (or PV) cells (such as the plurality of PV cells 5) to operate the drive assembly 444 and/or the at least one heater 480. In another instance, any suitable device described and illustrated in SDS 1, 200, 300 may be operably engaged with the apparatus 403 for removing salt from seawater and providing fresh and/or potable water.

It should be understood that FIGS. 10 and 11 are diagrammatic only for the SDS 400 and do not illustrate exact and precise dimensions of any component, assembly, or apparatus provided herein. Such diagrammatic illustrations of the apparatus 403 and other machines, components, and systems of the SDS 400 shown in FIGS. 10 and 11 should not limit the exact positioning, orientation, or location of the apparatus 403 and machines, components, and systems of the SDS 400 relative to one another.

Figure 12:
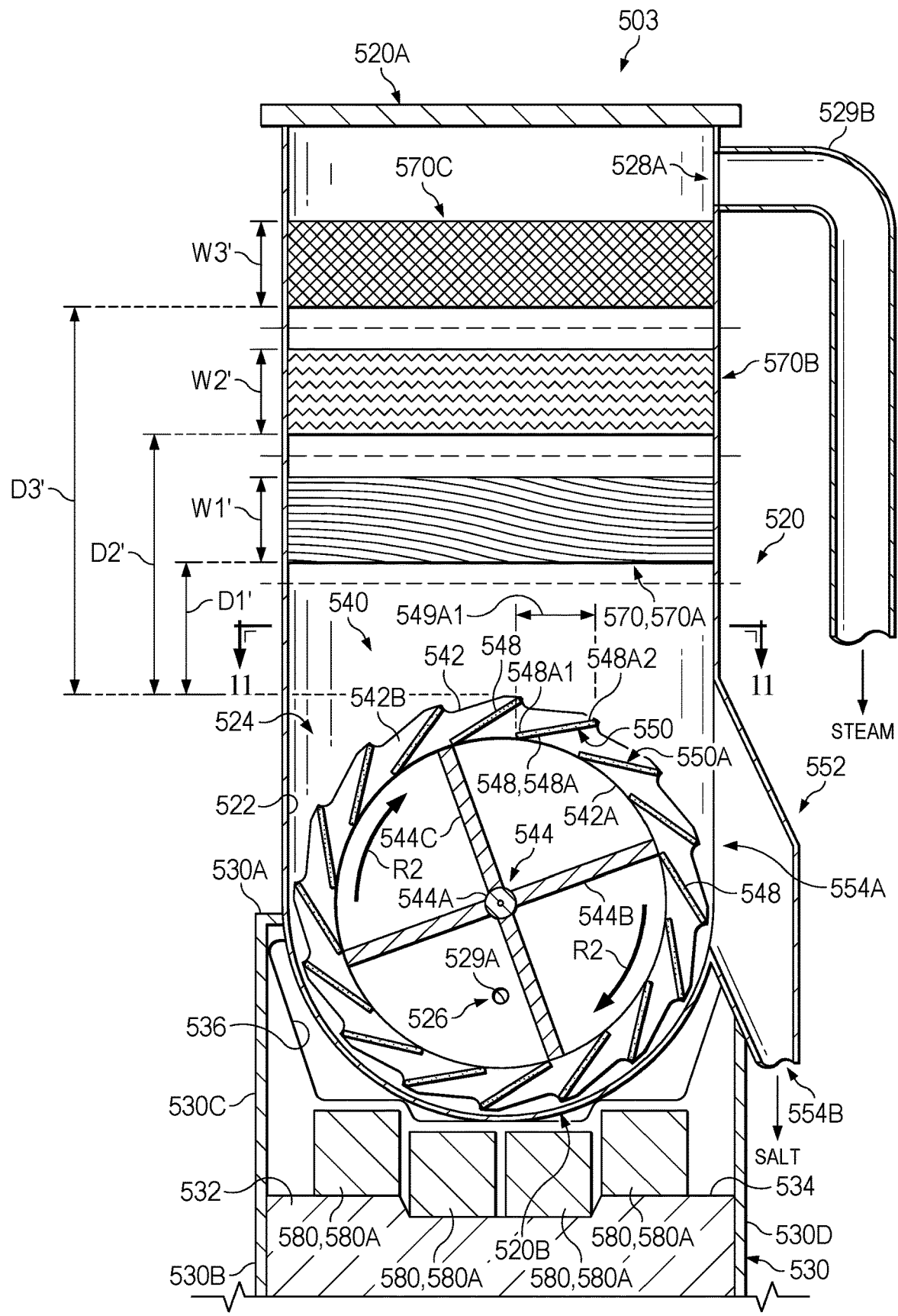
FIG. 12 is a longitudinal sectional view of another apparatus of a seawater distillation system.
Figure 13:
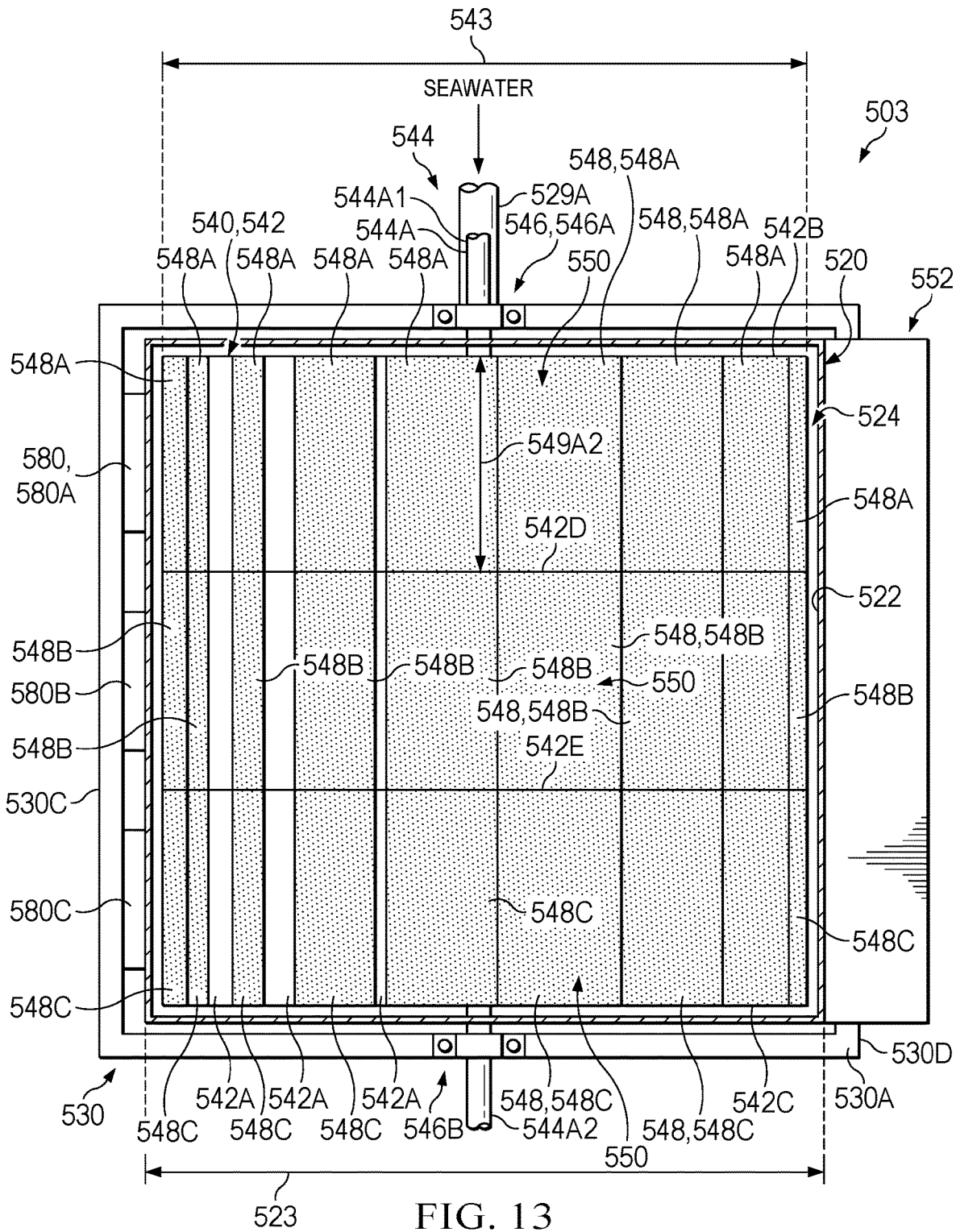
FIG. 13 is a cross-sectional view of the apparatus taken in the direction line 13-13 in FIG. 12.

FIGS. 12 and 13 illustrate another seawater distillation system (SDS) 500 that is substantially similar to SDS 1, 400 illustrated in FIGS. 1 through 4 and 10 through 11, except as detailed below. The SDS 500 has an apparatus 503 that is substantially similar to the apparatus 403 of the SDS 400, except as described below.

Referring to FIGS. 12 and 13, the apparatus 503 may include a vessel 520. The vessel 520 may have a closed top end 520A, an opposing closed bottom end 520B, and a longitudinal axis defined therebetween. A portion of the vessel 520 proximate to the bottom end 520B may be rounded or curvilinear. Such use of the rounded or curvilinear shape is described in more detail below. In other exemplary embodiments, a portion of a vessel proximate to a bottom end may define any suitable shape or configuration. The vessel 520 also includes a circumferential wall 522 that extends between the top end 520A and the bottom end 520B. The circumferential wall 522 defines a diameter 523 that continuous from the top end 520A towards the bottom end 520B (see FIG. 13). In one exemplary embodiment, the diameter 523 defined by the circumferential wall 522 is about six feet. The top end 520A, the bottom end 520B, and the circumferential wall 522 collectively define a chamber 524 that extends between the top end 520A and the bottom end 520B. With the closed ends 520A, 520B of the vessel 520, the vessel 520 is pressurized and sealed at a desired atmospheric pressure greater than the ambient pressure exterior to the chamber 524.

Referring to FIG. 12, the vessel 520 defines an inlet opening 526 in the circumferential wall 522 at a position between the top end 520A and the bottom end 520B. The inlet opening 526 of the vessel 520 provides fluid communication between a seawater line 529A (see also FIG. 13) and the chamber 524 defined by the vessel 520. The seawater line 529A is able to deliver seawater from a body of seawater into the vessel 520 via at least one pump (e.g., the at least one pump 9) connected to a main seawater line "SWL" (see FIG. 2). The vessel 520 also defines an output opening 528A in the circumferential wall 522 at a position between the top end 520A and the bottom end 520B opposite to the inlet opening 526 relative to the longitudinal axis of the vessel 520. The output opening 528A of the vessel 520 provides fluid communication between a vessel steam line 529B and the chamber 524 defined by the vessel 520 where the vessel steam line 529B is able to deliver steam from the apparatus 503 to the at least one steam line previously described above.

Still referring to FIG. 10, the apparatus 503 may include a base frame 530 to hold the vessel 520. The base frame 530 may include a first or top end 530A, an opposing second or bottom end 530B, a first or left side 530C, and an opposing second or right side 530D. The base frame 530 also includes a platform 532 that is operably engaged between the left and right sides of the base frame 530. The platform 532 includes an upper support wall 534 that extends longitudinally along the platform 532 between the left and right sides 530C, 530D of the base frame 530. The platform 532 may also include a set of heat shields 536. Each heat shield of the set of heat shields 536 may be operably engaged with the base frame 530 to fully encapsulate devices operably engaged with the platform 532 inside of the base frame 530. Such use and purpose of the set of heat shields 536 is described in more detail below.

Referring to FIGS. 12 and 13, the apparatus 503 may include a separation or removal assembly 540 operably engaged with the vessel 520. The separation assembly 540 may be configured to separate and/or remove a volume of salt from the volume of seawater inside of the vessel 520, which is described in more detail below. The separation assembly 540 includes a structural support or wheel 542 that is operably engaged with the vessel 520. The wheel 542 includes a circumferential base wall 542A operably engaged with a first lateral wall 542B, an opposing second lateral wall 542C (see FIG. 13), a first intermediate wall 524D (see FIG. 13), and a second intermediate wall 524E (see FIG. 13). Here, the first intermediate wall 524D may be proximate to the first lateral wall 524B, and the second intermediate wall 524E may be proximate to the second lateral wall 524C. Such uses of the first and second intermediate walls 524D, 524E are described in more detail below.

The wheel 542 is also structurally configured with the vessel 520 such that the wheel 542 is able to move and/or rotate inside of the vessel 520 during separation operations. Such rotation of the wheel 542 is described in more detail below. The wheel 542 also defines a diameter 543 that is complementary to the diameter 523 of the vessel 520 (see FIG. 13). In other words, the diameter 543 of the wheel 542 is substantially equal to the diameter 523 of the vessel 520 where the wheel 542 is able to collect and gather precipitate salt while still being able to move and/or rotate inside of the vessel 520 during separation operations. In one exemplary embodiment, the diameter 543 of the wheel 542 is about six feet where the wheel 542 is able to collect and gather precipitate salt while still being able to move and/or rotate inside of the vessel 520 during separation operations.

The separation assembly 540 also includes a drive assembly 544 operably engaged with the wheel 542. As illustrated in FIG. 13, the drive assembly 544 has a drive shaft 544A with a first or front end 544A1, an opposing second or rear end 544A2, and a longitudinal axis defined therebetween. The drive shaft 544A is operably engaged with the wheel 542 via first and second cross members 544B, 544C. In the illustrated embodiment, the first and second cross members 544B, 544C are operably engaged with the circumferential base wall 542A of the wheel 542. Such engagement between the drive assembly 544 and the wheel 542 allows the drive assembly 544 to move the wheel 542 about the longitudinal axis of the drive shaft 544A via a motor (not illustrated) or similar mechanism operably engaged with said drive shaft 544A. The movement of the wheel 542 via the drive assembly 544 is denoted by arrows labeled "R2" in FIG. 12. In one exemplary embodiment, a drive assembly may include a set of first cross members and a set of second cross members operably engaged with a wheel that allows the drive assembly to move and/or rotate the wheel during separation operations.

Referring to FIG. 13, the separation assembly 540 may include at least one bearing set 546 operably engaged with the base frame 530. The at least bearing set 546 is adapted to provide stability and support to the wheel 542 when the wheel 542 is rotating during a separation operation. As illustrated in FIG. 13, the bearing set 546 includes a first bearing 546A and an opposing second bearing 546B. The first bearing 546A is operably engaged with the drive shaft 544A proximate to the first end 544A1 of the drive shaft 544A. The second bearing 546B is also operably engaged with the drive shaft 544A proximate to the second end 544A2 of the drive shaft 544A. In the illustrated embodiment, the first and second bearings 546A, 546B may be ball bearings that provide stability and support to the drive shaft 544A of the drive assembly 544 when the drive shaft 544A is rotating during a separation operation. In other exemplary embodiments, any suitable bearing or rotational support member may be used to provide stability and support to a structural support when the structural support is rotating during a separation operation.

Still referring to FIG. 12, the separation assembly 540 may include at least one set of collecting members 548 operably engaged with the wheel 542. Specifically, the at least one set of collecting members 548 is operably engaged with the circumferential base wall 542A, the first lateral wall 542B, and the second lateral wall 542C. In the illustrated embodiment, the separation assembly 540 includes a first set of collecting members 548A, a second set of collecting members 548B, and a third set of collecting members 548C where the vessel 520 is sized and configured to hold the first, second, and third sets of collecting members 548A, 548B, 548C. The first, second, and third sets of collecting members 548A, 548B, 548C are considered advantageous at least because the additional sets of collecting members 548 allows the wheel 542 to collect a larger volume of salt from the seawater bath that settles at the bottom end 520B of the vessel 520, as compared to the separation assembly 440 described above, while allowing the water to drain through the set of collecting members 548 and back into the vessel 520. Such separation operations by the sets of collecting members 548A, 548B, 548C are described in more detail below.

The sets of collecting members 548A, 548B, 548C is configured to the collect and gather precipitate salt from the externally heat seawater while allowing the water to permeate through each collecting member of the sets of collecting members 548A, 548B, 548C. As such, the sets of collecting members 548A, 548B, 548C are adapted to hold a predetermined volume of salt when rotating with the wheel 542 and drive assembly 544 during a separation operation. In the illustrated embodiment, each collecting member of the first, second, and third sets of collecting member 548A, 548B, 548C is substantially similar to one another and are orientated in a mirrored-image relative to the circumferential wall 442A of the wheel 442. Inasmuch as the first, second, and third sets of collecting member 548A, 548B, 548C are substantially similar, the following description will relate to the first set of collecting members 548A. It should be understood, however, that the description of the first set of collecting members 548A applies substantially equally to the second and third sets of collecting members 548B, 548C.

In the illustrated embodiment, each collecting member of the first sets of collecting members 548A has a first end 548A1 operably engaged with the circumferential base wall 542A, and opposing second end 548A2 free from engagement and remote from the circumferential base wall 542A, and a longitudinal axis defined therebetween. Each collecting member of the first sets of collecting members 548A also has a length 549A1 defined between the first and second ends 548A1, 548A2 (see FIG. 12). Each collecting member of the first sets of collecting members 548A also has a width 549A2 (see FIG. 13). For the first set of collecting members 548A, each collecting member of the first set of collecting members 548A has a width 549A2 that is defined between the first lateral wall 542B and a first intermediate wall 542D of the wheel 542 (see FIG. 13). For the second set of collecting members 548B, each collecting member of the second set of collecting members 548B has a width 549A2 that is defined between the first intermediate wall 542D of the wheel 542 and a second intermediate wall 542E of the wheel 542. (see FIG. 13). For the third set of collecting members 548C, each collecting member of the third set of collecting members 548C has a width 549A2 that is defined between the second intermediate wall 542E of the wheel 542 and the second lateral wall 542C. (see FIG. 13). In one exemplary embodiment, the width 549A2 of each collecting member of the sets of collecting members 548A, 548B, 548C is about twenty-four inches based on a three to one ratio of the wheel diameter (diameter 543 of wheel 542) to the width (width 549B) of each collecting member of a set of collecting members 548A, 548B, 548C.

The second or terminal end 548A2 of each collecting member of the sets of collecting members 548A, 548B, 548C is complementary in shape with the bottom end 520B of the vessel 520. Such complementary shape between the sets of collecting members 548A, 548B, 548C and the bottom end 520B of the vessel 520 is considered advantageous at least because the sets of collecting members 548A, 548B, 548C may be able to collect a volume of salt from the seawater bath that settle at the bottom end 520B of the vessel 520. As illustrated in FIG. 12, the separation assembly 540 includes sixteen equally distanced collecting member in each set of collecting members 548A, 548B, 548C that are operably engaged with the circumferential base wall 542A and radially extend away from the circumferential base wall 542A. In other exemplary embodiments, a separation assembly may include any suitable number of screens in a set of screens based on various considerations, including the size, shape, and configuration of the wheel and other various considerations.

As illustrated in FIG. 12, each collecting member of the sets of collecting members 548A, 548B, 548C is disposed at an angle relative to one or all of the first lateral wall 542B, the second lateral wall 542C, the first intermediate wall 542D, and the second intermediate wall 542E of the wheel 542. The structural configuration of each collecting member of the sets of collecting members 548A, 548B, 548C being disposed at an angle relative to one or all of the first lateral wall 542B, the second lateral wall 542C, the first intermediate wall 542D, and the second intermediate wall 542E is considered advantageous at least because the sets of collecting members 548A, 548B, 548C is able to collect a volume of salt from the seawater bath that settle at the bottom end 520B of the vessel 520. In the illustrated embodiment, each collecting member of the sets of collecting members 548A, 548B, 548C are relatively flat along its length (see FIG. 12). In other exemplary embodiments, each collecting member of a set of collecting members may define any suitable size, shape, or configuration based on various considerations, including the configuration of a vessel, the amount of seawater pumped into the vessel, and other various considerations.

In the illustrated embodiment, each collecting member of the sets of collecting members 548A, 548B, 548C is a porous wall (e.g., a screen, colander, and other devices of the like) to efficiently collect a volume of salt from the seawater bath that settle at the bottom end 520B of the vessel 520. Having each collecting member of sets of collecting members 548A, 548B, 548C being a porous wall is considered advantageous at least because the sets of collecting members 548A, 548B, 548C are able to efficiently collect a volume of salt from the seawater bath that settle at a bottom end of a vessel while allowing the water to drain through the sets of collecting members 548A, 548B, 548C and back into the vessel 520 for steam and condensing purposes. Such separation operation by the sets of collecting members 548A, 548B, 548C is described in more detail below. In an exemplary embodiment, each collecting member of the sets of collecting member may be a solid wall for scooping and retaining a volume of precipitate salt and water. In other words, each collecting member of the sets of collecting member may act as a basket to collect a volume of salt from the seawater bath that settle at a bottom end of a vessel.

Referring to FIGS. 12 and 13, a receptacle 550 is defined between each collecting member of the first set of collecting members 548A, a portion of the circumferential base wall 542A, a portion of the first lateral wall 542B, and a portion of the first intermediate wall 542D. The receptacles 550 for the second and third collecting members 548B, 548C are similarly defined as compared to the receptacles 550 of the first set of collecting members 548A. The receptacle 550 inside each collecting member of the sets of collecting members 548A, 548B, 548C is configured to the collect and gather precipitate salt from the externally heat seawater while allowing the water to permeate through each collecting member of the sets of collecting members 548A, 548B, 548C. As such, the sets of collecting members 548A, 548B, 548C are adapted to hold a predetermined volume of salt when rotating with the wheel 542 and drive assembly 544 during a separation operation Still referring to FIG. 12, the separation assembly 540 may include a salt conveyor 552 operably engaged with the vessel 520. In the illustrated embodiment, the salt conveyor 552 is integral with the vessel 520 where the salt conveyor 552 and the vessel 520 depict a single, unitary member. The salt conveyor 552 defines an inlet opening 554A that provides an additional access point into the chamber 524 of the vessel 520. The salt conveyor 552 also defines an outlet opening 554B at a position away from the vessel 520 exterior to the chamber 524. As provided herein, the salt conveyor 552 is configured to receive a continuous volume of precipitate salt from the wheel 542 collected by the set of collecting members 548 and to transport the volume of precipitate salt to the at least one salt tank 10 via a salt line (like salt line "SL") In the illustrated embodiment, the salt conveyor 552 may have a funneled portion that extends inwardly from the inlet opening 554A to the outlet opening 554B for transporting volume of precipitate salt to the at least one salt tank 10.

During separation operations, the salt conveyor 552 transports precipitated salt to the salt line where the salt line is able to deliver said precipitated salt from the apparatus 503 to at least one salt tank previously described above (e.g., the at least one salt tank 10). To maintain pressure inside of the vessel, at least one lock chamber (not illustrated) may be positioned within the salt line to transport precipitated salt from the apparatus 503 to the at least one salt tank without depressurizing the vessel 520. In other words, the lock chamber creates a two-stage seal mechanism that prevents depressurization of the vessel 520 during operation. Such lock chamber provided in the apparatus 503 is substantially similar to the lock chamber provided in the apparatus 3 described above.

Referring to FIG. 12, the apparatus 503 may include at least one mist eliminator 570. In the illustrated embodiment, the apparatus 503 includes a first mist eliminator 570A, a second mist eliminator 570B, and a third mist eliminator 570C. In other exemplary embodiments, any suitable number of mist eliminators may be used in an apparatus based on various considerations, including the size, shape, and configuration of the vessel, the volume of seawater pumped into the vessel, and other various considerations of the like.

Each of the first, second, and third mist eliminators 570A, 570B, 570C may be operably engaged with the circumferential wall 522 of the vessel 520 inside of the chamber 524 vertically above the separation assembly 540 and vertically above the seawater bath that is held inside of the vessel 520. In the illustrated embodiment, the first, second, and third mist eliminators 570A, 570B, 570C are configured to remove water droplets and precipitated salt from the steam when converted from the seawater. As the steam initially passes through the first mist eliminator 570A, the steam endures a first purification stage where the first mist eliminator 570A removes any water droplets or excess salt precipitate from said steam. For further removal, the steam endures a second purification stage where the second mist eliminator 570B removes any remaining water droplets or excess salt precipitate from said steam. For further removal, the steam endures a third purification stage where the third mist eliminator 570C removes any remaining water droplets or excess salt precipitate from said steam. Upon passing through the first, second, and third mist eliminators 570A, 570B, 570C, the steam is free of any water droplets or salt. In other words, the first second, and third mist eliminators 570A, 570B, 570C purifies the steam converted from seawater prior to be transported to the at least one condenser (e.g., the at least one condenser).

In the illustrated embodiment, the first mist eliminator 570A is a spiral type mist eliminator, the second mist eliminator 570B is a single vane or chevron (plate) type mist eliminator, and the third mist eliminator 570C is a mesh type mist eliminator. In other exemplary embodiment, first, second, and third mist eliminators may be any suitable type of mist eliminator geometry described herein or available based on the application for removing water droplets, precipitate salt, or other solids and fluids. The different geometries between the first, second, and third mist eliminators 570A, 570B, 570C are considered advantageous at least because such difference in structural geometries allows for fine-tuning the performances of the mist eliminators for being more versatile or efficient in screening and removing solids and fluids in the steam.

Referring to FIG. 10, the first mist eliminator 570A defines a first width "W1'", the second mist eliminator 570B defines a second width "W2", and the third mist eliminator 570C defines a third width "W3". In the illustrated embodiment, the first width "W1'" of the first mist eliminator 570A is greater than the second width "W2" of the second mist eliminator 570B and the third width "W3" of the third mist eliminator 570C. Additionally, the second width "W2" of the second mist eliminator 570B is greater than the third width "W3" of the third mist eliminator 570C. In the illustrated embodiment, the first width "W1'" of the first mist eliminator 470A is about twenty-four inches, the second width "W2" of the second mist eliminator 470B is about eighteen inches, and the third width "W3" of the third mist eliminator 470C is about twelve inches. In other exemplary embodiments, first, second, and third mist eliminators may define any suitable width based on the particular application, including the size, shape, and configuration of a vessel, the size, shape, and configuration of a separation assembly, and other various applications.

Still referring to FIG. 12, the first mist eliminator 570A is disposed at a first distance "D1" away from the wheel 542 of the separation assembly 540, the second mist eliminator 570B is disposed at a second distance "D2" away from the wheel 442, and the third mist eliminator 570C is disposed at a third distance "D3" away from the wheel 542. In the illustrated embodiment, the third distance "D3" is greater than the first and second distances "D1", "D2" as shown in FIG. 12. In the illustrated embodiment, the first distance "D1" is about six feet, which substantially equal to the diameter of the wheel 542, the second distance "D2" is about seven feet (or twelve inches above the first mist eliminator 570A), and the third distance "D3'" is about eight feet (or twelve inches above the second mist eliminator 570B).

Still referring to FIG. 12, the apparatus 503 may also include at least one heater 580 operably engaged with the platform 532, specifically with the upper support wall 534 of the platform 532. Such engagement with the platform 532 and encapsulation by the set of heat shields 536 allows the base frame 530 to retain and conserve the heat energy generated by the at least one heater 580. As such, the at least one heater 580 may be configured to provide external heat at the bottom end 520B of the vessel 520 to evaporate the water from a liquid state to a vapor state (i.e., steam). During separation operations, the at least one heater 580 may be used when the apparatus 503 is provided on a ground surface.

The at least one heater 580 may be powered by propane gas or other similar fuels for generating heat for the at least one heater 580. In other exemplary embodiments, any suitable energy source or mechanism may be used to power at least one heater for providing external heat at a bottom end of a vessel. In the illustrated embodiment, twelve heaters 580 are operably engaged with the base frame 530 inside of the platform 532. In other exemplary embodiments, any suitable number of heaters may be operably engaged with a base frame inside of a platform based on various considerations, including the size, shape and configuration of the vessel 520.

The apparatus 503 may be used with any SDS 1, 200, 300 described and illustrated herein. In one instance, the apparatus 503 may be operably engaged with a solar tower (such as solar tower 2) where the at least one heater 580 may be removed and externally heated by a plurality of heliostats (such as the plurality of heliostats 4) at an elevated level above ground surface. In another instance, the apparatus 503 may also be powered by a plurality of photovoltaic (or PV) cells (such as the plurality of PV cells 5) to operate the drive assembly 544. In another instance, any suitable device described and illustrated in SDS 1, 200, 300 may be operably engaged with the apparatus 503 for removing salt from seawater and providing fresh and/or potable water.

It should be understood that FIGS. 12 and 13 are diagrammatic only for the SDS 500 and do not illustrate exact and precise dimensions of any component, assembly, or apparatus provided herein. Such diagrammatic illustrations of the apparatus 503 and other machines, components, and systems of the SDS 500 shown in FIGS. 12 and 13 should not limit the exact positioning, orientation, or location of the apparatus 503 and machines, components, and systems of the SDS 500 relative to one another.

Figure 14:
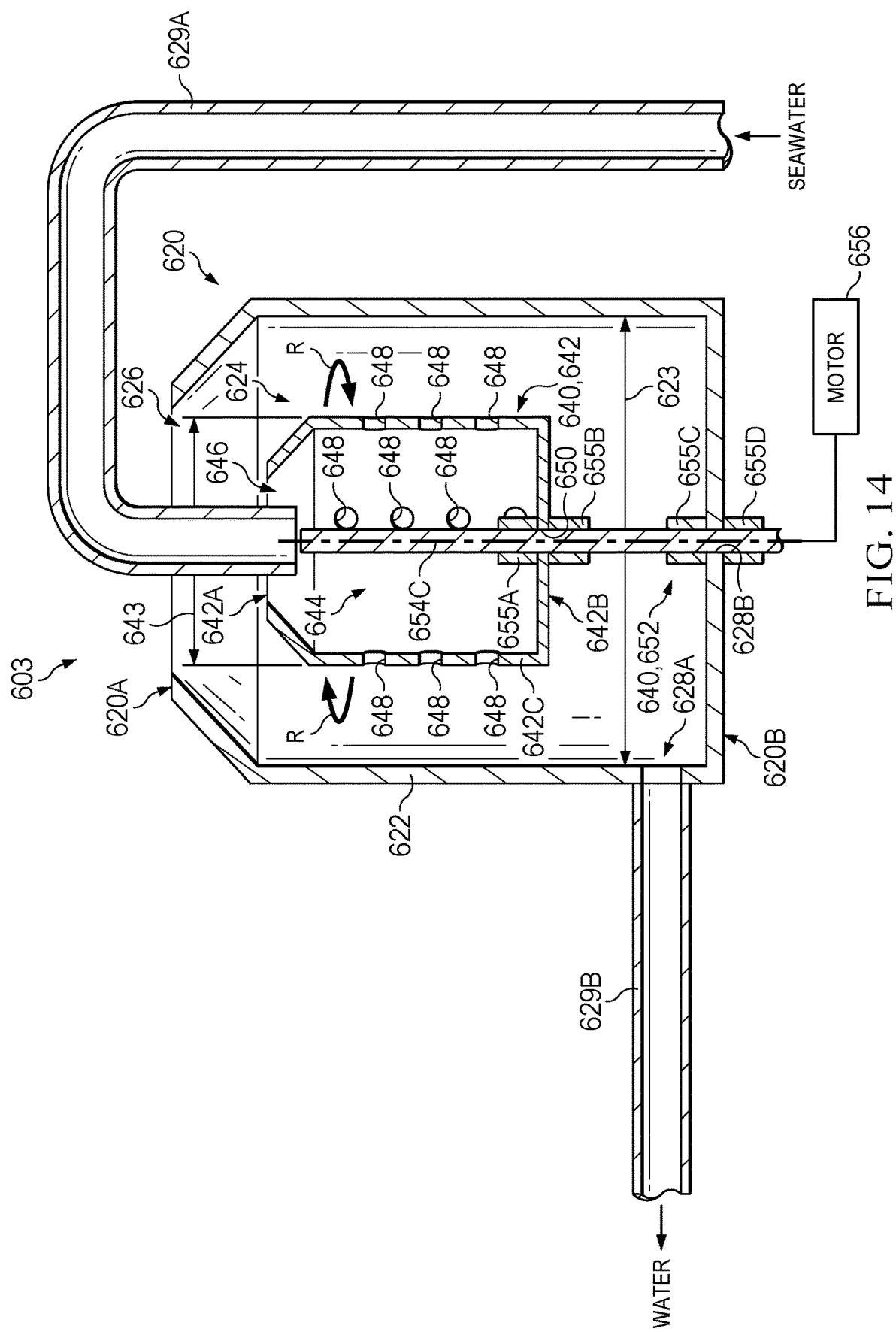
FIG. 14 is a longitudinal sectional view of another apparatus of a seawater distillation system.

FIG. 14 illustrates another seawater distillation system (SDS) 600 that is substantially similar to SDS 1, 400, 500 illustrated in FIGS. 1 through 4 and 10 through 13, except as detailed below. The SDS 600 has an apparatus 603 that is substantially similar to the apparatuses 3, 403, 503 of the SDS 1, 400, 500, except as described below.

Referring to FIG. 14, the apparatus 603 may include a vessel 620. The vessel 620 may have a closed top end 620A, an opposing closed bottom end 620B, and a longitudinal axis defined therebetween. The vessel 620 also includes a circumferential wall 622 that extends between the top end 620A and the bottom end 620B. The circumferential wall 622 defines a diameter 623 that continuous from the top end 620A towards the bottom end 620B; the diameter 623 is described in more detail below. The top end 620A, the bottom end 620B, and the circumferential wall 622 collectively define a chamber 624 that extends between the top end 620A and the bottom end 620B. With the closed ends 620A, 620B of the vessel 620, the vessel 620 is pressurized and sealed at a desired atmospheric pressure greater than the ambient pressure exterior to the chamber 624.

Still referring to FIG. 14, the vessel 620 defines an inlet opening 626 in the circumferential wall 622 proximate the top end 620A of the vessel 620. The inlet opening 626 of the vessel 620 provides fluid communication between a seawater line 629A and the chamber 624 defined by the vessel 620. The seawater line 629A is able to deliver seawater from a body of seawater into the vessel 620 via at least one pump (e.g., the at least one pump 9) connected to a main seawater line "SWL" (see FIG. 2). The vessel 620 also defines an output opening 628A in the circumferential wall 622 between the top and bottom ends 620A, 620B of the vessel 620 proximate to the bottom end 620B of the vessel 620. The output opening 628A also opposes the inlet opening 526 relative to the longitudinal axis of the vessel 520. The output opening 528A of the vessel 520 also provides fluid communication between a vessel water line 629B and the chamber 624 defined by the vessel 620 where the vessel water line 629B is able to deliver water from the apparatus 603 to the at least one steam line previously described above.

Still referring to FIG. 14, the apparatus 603 may include a separation or removal assembly 640 operably engaged with the vessel 620. The separation assembly 640 may be configured to separate and/or remove a volume of salt from the volume of seawater inside of the vessel 620, which is described in more detail below. The separation assembly 640 includes a structural support or rotor 642 that is operably engaged with the vessel 620. The rotor 642 includes an open first or top end 642A, an opposing closed second or bottom end 642B, and a longitudinal axis defined therebetween. The rotor 642 also includes a surrounding wall 642C that extends between the top and bottom ends 642A, 642B. The top end 642A, the bottom end 642B, and the circumferential wall 642C collectively define a chamber 644 for receiving a continuous volume of seawater, which is described in more detail below.

The rotor 642 is also structurally configured with the vessel 620 such that the rotor 642 is able to move and/or rotate inside of the vessel 620 during separation operations. Such rotation of the rotor 642 is described in more detail below. The rotor 642 also defines a diameter 643 (see FIG. 14) that is complementary to the diameter 623 of the vessel 620. In other words, the diameter 643 of the wheel 642 is less than the diameter 623 of the vessel 620 where the rotor 642 is able to collect and gather precipitate salt while still being able to move and/or rotate inside of the vessel 520 during separation operations.

Still referring to FIG. 14, an intake or top opening 646 is defined at the top end 642A of the rotor 642. The intake opening 646 provides access to the chamber 644 where a portion of the vessel water line 629B extends into the chamber 644 of the rotor 642 to pump a continuous volume of seawater into the rotor 642. A plurality of separation holes 648 is defined in the surrounding wall 542C. Each separation hole of the plurality of separation holes 648 provides fluid communication between the chamber 624 of the vessel 620 and the chamber 644 of the rotor 642. As described in more detail, the plurality of separation hole 648 allows the rotor 642 to continuously separate and/or remove water from the chamber 644 of the rotor 642 while retaining precipitate salt inside of the rotor 642. A bottom opening 650 is also defined in the bottom end 642B of the rotor 642; such use and purpose of the bottom opening 650 is described in more detail below.

Still referring to FIG. 14, the separation assembly 640 also includes a drive assembly 652 operably engaged with the rotor 642. As illustrated in FIG. 14, the drive assembly 652 has a drive shaft 654 with a first or top end 654A, an opposing second or bottom end 654B, and a longitudinal axis 654C defined therebetween. The drive shaft 654 operably engages with the rotor 642 via the bottom opening 650 of the rotor 642 where the drive shaft 654 extends through and into the rotor 642 such that the top end 654A of the drive shaft 654 is positioned inside of the chamber 644 of the rotor 642. In one exemplary embodiment, a drive shaft may be operably engaged with a filter exterior to a chamber defined by the filter.

Still referring to FIG. 14, the drive shaft 654 operably engages with the rotor 642 via first and second collars 655A, 655B. In the illustrated embodiment, the first collar 655A operably engages with the bottom end 642B of the rotor 642 inside of the chamber 644. The second collar 655B also operably engages with the bottom end 642B of the rotor 642 exterior to the chamber 644. Such engagement between the drive assembly 652 and the wheel 642 allows the drive assembly 652 to move the wheel 642 about the longitudinal axis of the drive shaft 654 via a motor 656 or similar mechanism operably engaged with said drive shaft 654. The movement of the wheel 642 via the drive assembly 652 is denoted by arrows labeled "R" in FIG. 14. The first and second collars 655A, 655B are also configured to provide a fluid tight seal between the rotor 642 and the drive assembly 652 where the first and second collars 655A, 655B prevent precipitate salt from leaking or escaping through the bottom opening 650 of the rotor 642 during operation.

Still referring to FIG. 14, the drive shaft 654 also operably engages with the vessel 620 via third and fourth collars 655C, 655D. In the illustrated embodiment, the third collar 655C operably engages with the bottom end 620B of the vessel 620 inside of the chamber 624. The fourth collar 655D also operably engages with the bottom end 620B of the vessel 620 exterior to the chamber 624. Such engagement between the drive assembly 652 and the vessel 620 allows the drive shaft 654 to be maintained at a constant vertical position to move the wheel 642 about the longitudinal axis 654C of the drive shaft 654 via the motor 656. The third and fourth collars 655C, 655D are also configured to provide a fluid tight seal between the vessel 620 and the drive assembly 652 where the third and fourth collars 655C, 655D prevent water from leaking or escaping from the vessel 620 during operation.

During operation of the apparatus 603, the motor 656 of the drive assembly 652 may rotate the drive shaft 654 about its longitudinal axis 654C via suitable mechanisms and/or components attached between the drive shaft 654 and the motor 656. As the drive shaft 654 rotates, the rotor 642 rotates with the drive shaft 654 about the longitudinal axis 654C of the drive shaft 654 via the structural configuration between the rotor 642 and the drive shaft 654. The rotation of the rotor 642 and the drive shaft 654 may occur prior to the introduction of the seawater into the vessel 620 and the rotor 642.

Once rotation begins, a continuous volume of seawater may flow into the rotor 642 via the seawater line 629A. As the seawater enters into the rotor 642, the seawater is spun inside of the rotor 642 at a desired speed controlled by the motor 656 of the drive assembly 652. During this operation, the water and the precipitate salt that make up the seawater are separated from one another via the centrifugal force created on the seawater via the separation assembly 640. Specifically, a continuous volume of water of the seawater is radially forced through the plurality of separation holes 648 via the centrifugal force exerted on the water while a continuous volume precipitate salt of the seawater is held and collected by the rotor 642 inside of the chamber 644. The separation operation may cease once a suitable volume of salt is collected inside of the rotor 642 where the collected precipitate salt is removed from the rotor 642.

Once the water is separated from the precipitate salt, the water flows into the chamber 624 of the vessel 620. As the water enters into the chamber 624, the water is directed towards the vessel water line 629B. While not illustrated herein, the vessel 620 may include suitable structural configurations where the water is directed towards the vessel water line 629B (e.g., declined surfaces terminating at a vessel water line). As the water enters into the vessel water line 629B, the water may then be transported to various output locations for further purification (i.e., further removal of precipitate salt or other solids in the water) or for storage.

Figure 15:
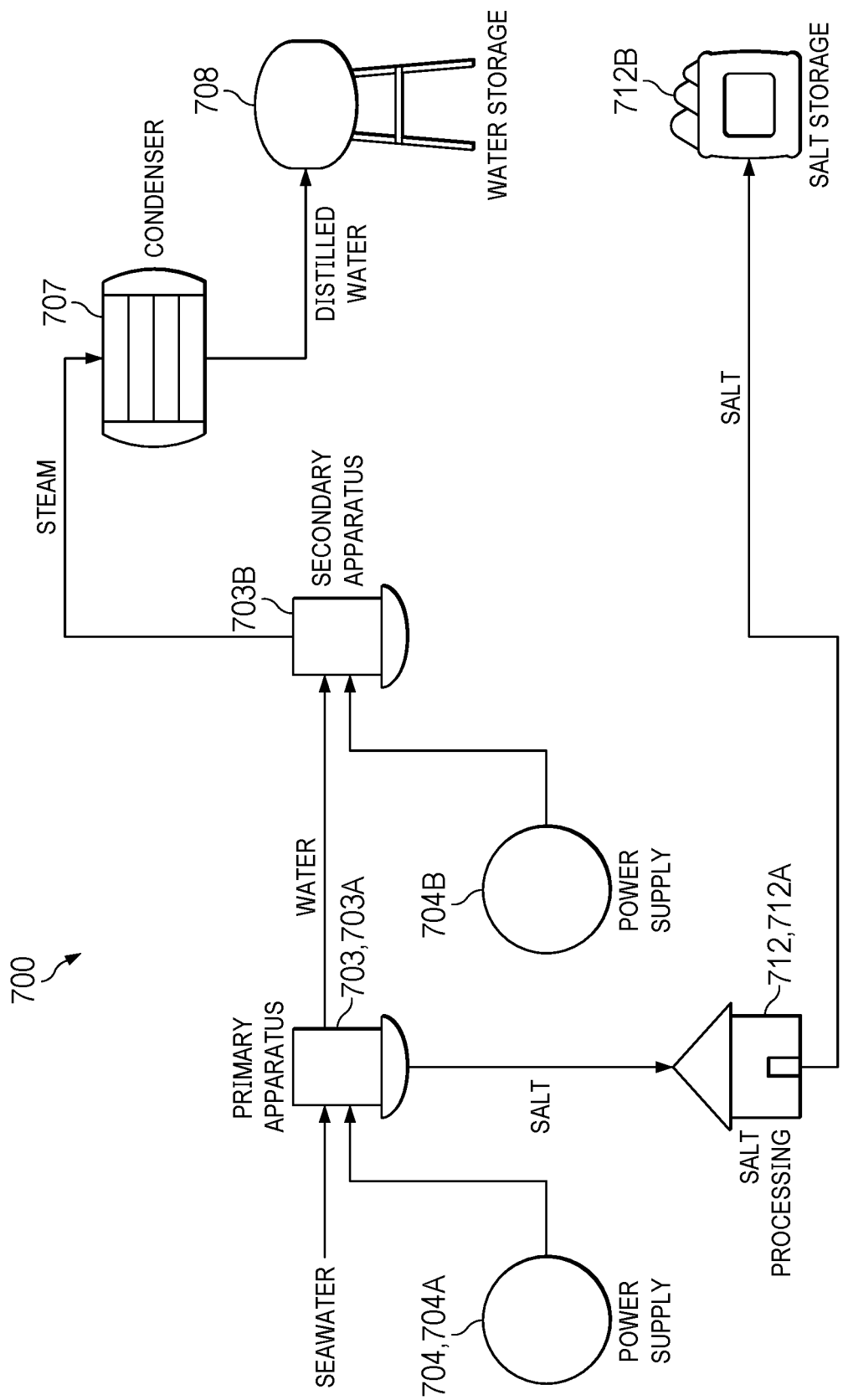
FIG. 15 is a diagrammatic view of another seawater distillation system in accordance with another aspect of the present disclosure.

FIG. 15 illustrates another seawater distillation system 700 similar to systems 1, 200, and 300 provided in FIGS. 1-6, 8, and 9, except as detailed below. In the illustrated embodiment, the system 700 includes at least one apparatus 703 that is configured purify seawater by separating and/or removing precipitate salt from the water provided in seawater. The at least one apparatus 703 may be any apparatus described herein, including apparatuses 3, 203, 303, 403, 503, 603, and any other available apparatuses that are configured to purify seawater by separating and/or removing precipitate salt from water provided in seawater. The at least one apparatus 703 is also powered by at least one power supply or source 704. The at least one power supply 704 may be any suitable power supply or source described herein, including parabolic troughs/solar panels 204, heliostats 304, and any other available power supplies or sources to power the at least one apparatus 703.

As illustrated in FIG. 15, the system 700 includes a first or primary apparatus 703A that is in fluid communication with a continuous volume of seawater. The primary apparatus 703A may include a separation assembly that is configured to separate and remove precipitate salt from a continuous volume of seawater being pumped into the primary apparatus 703A. In the illustrated embodiment, the primary apparatus 703A may include any suitable separation assembly described herein, including separation assemblies 40, 40', 440, 540, 640, and any other available separation assemblies that are configured to separate and remove precipitate salt from a continuous volume of seawater. Such transporting of collected precipitate salt from the primary apparatus 703A is described in more detail below. Additionally, the primary apparatus 703A is operatively connected with a primary or first power source 704A where the separation assembly of the primary apparatus 703A is powered by said primary or first power source 704A.

Once precipitate salt is removed from the water, the water is transported to a secondary apparatus 703B that is in fluid communication with the primary apparatus 703A. The secondary apparatus 703B may be configured to evaporate the water into steam via a second power source 704B providing external or internal heat inside of the secondary apparatus 703B (specifically a vessel of the apparatus 703B). The second power source 704B may be any suitable power source or heat source described herein, including parabolic troughs/solar panels 204, heliostats 304, plurality of heaters 480, 580, or any other available power sources or heat sources to provide external or internal heat to evaporate water into steam. The secondary apparatus 703B may also be configured to purify the steam for further removal of precipitate salt provided in the steam and/or removal of water droplets via power from the secondary power source 704B. The secondary apparatus 703B may include any suitable device or mechanism for removal of precipitate salt provided in the steam and/or removal of water droplets as described herein, such as mist eliminators 70, 470A, 470B, 570A, 570B, 570C, and any other suitable devices or mechanisms for removal of precipitate salt provided in the steam and/or removal of water droplets.

As the steam is purified by the secondary apparatus 703B, the steam is transported to at least one condenser 707 that is if fluid communication with the secondary apparatus 703B. The at least one condenser 707 may be any suitable condenser 707 to convert the purified steam into distilled or purified water. Once the at least one condenser 707 converts the purified steam into distilled water, the distilled water may be transported to at least one water storage 708.

As for the collected precipitate salt, the precipitate salt is then transported along a salt transport system 712 from the primary apparatus 703A to at least one salt processing device and/or location 712A of the salt transport system 712. The at least one salt processing device 712A is configured to further refine the precipitate salt collected from the primary apparatus 703A during a separation operation. The precipitate salt may then be transported from the at least one salt processing device 712A to at least one salt storage 712B for storing said precipitate salt.

As provided herein, a jacket may be provided circumferential about a vessel of an apparatus for retaining heat inside of the vessel during operation. Specifically, the jacket may be provided any vessel of any apparatus described and illustrated herein, such as vessels 20, 20', 420, 520, 620. The jacket may be configured in any suitable structure in order to operably engage with a vessel and to provide heat retention of said vessel.

Figure 16A:
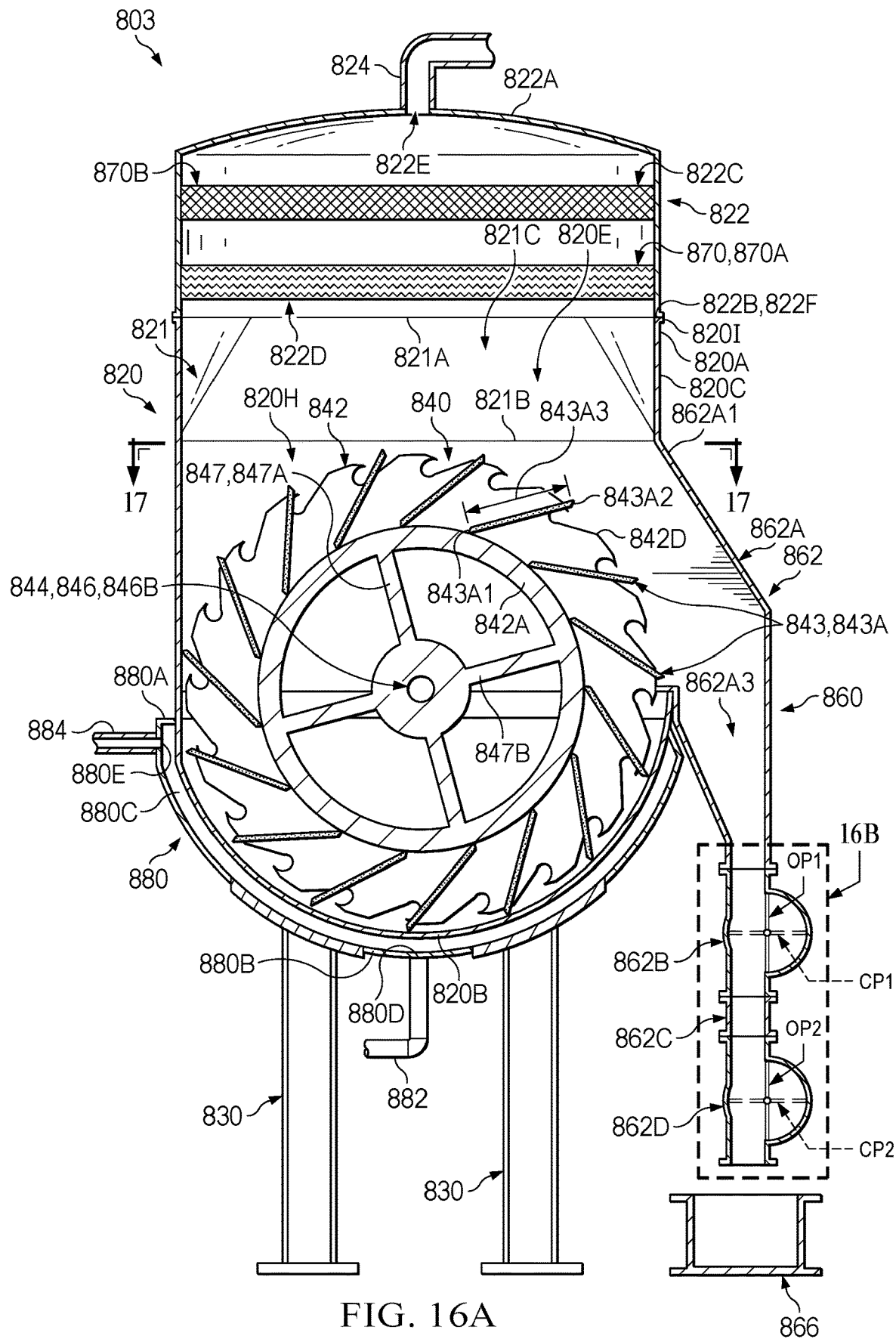
FIG. 16A is a sectional view of another apparatus of a seawater distillation system.
Figure 16B:
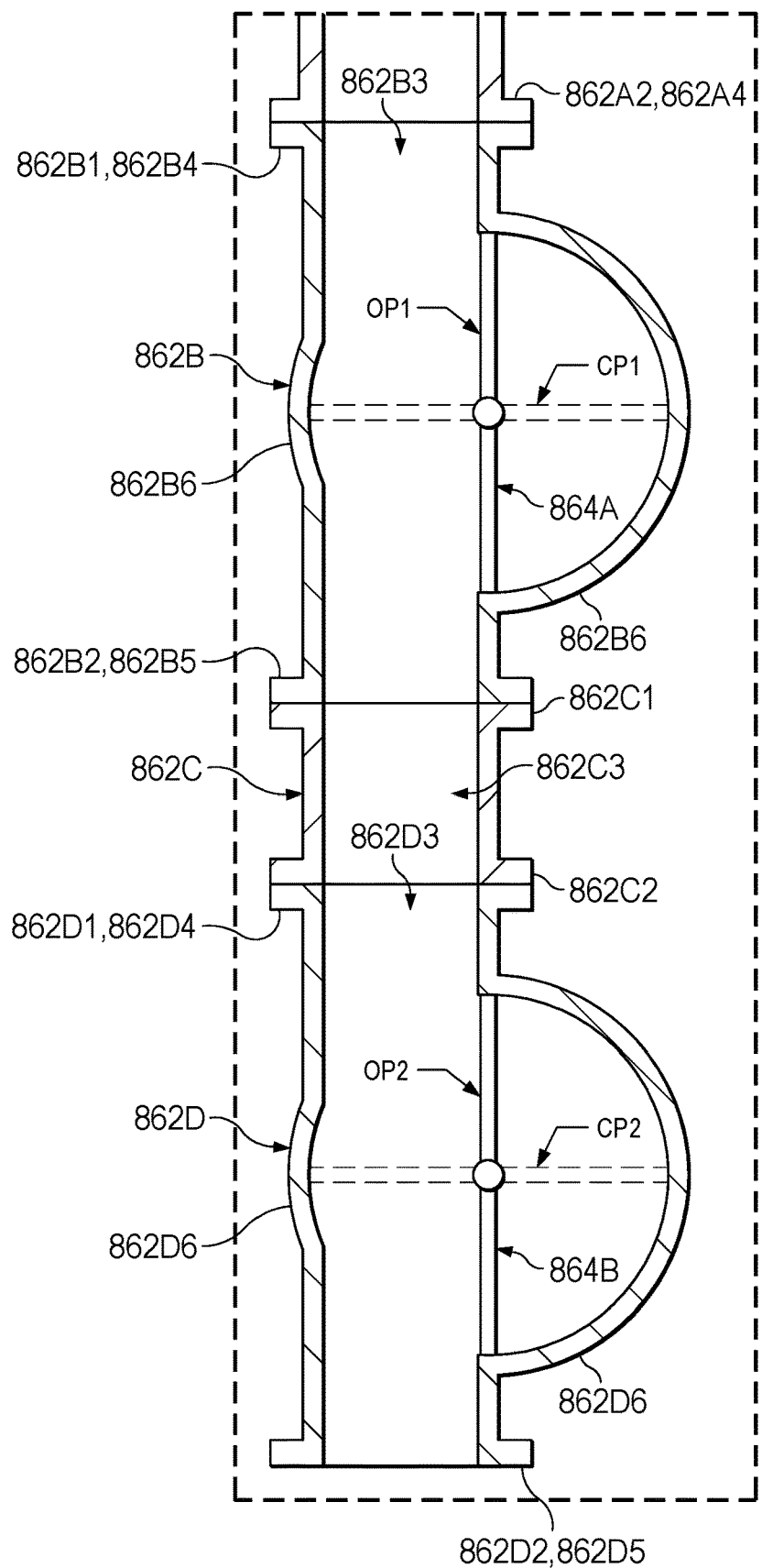
FIG. 16B is an enlargement that is highlighted in FIG. 16A.
Figure 17:
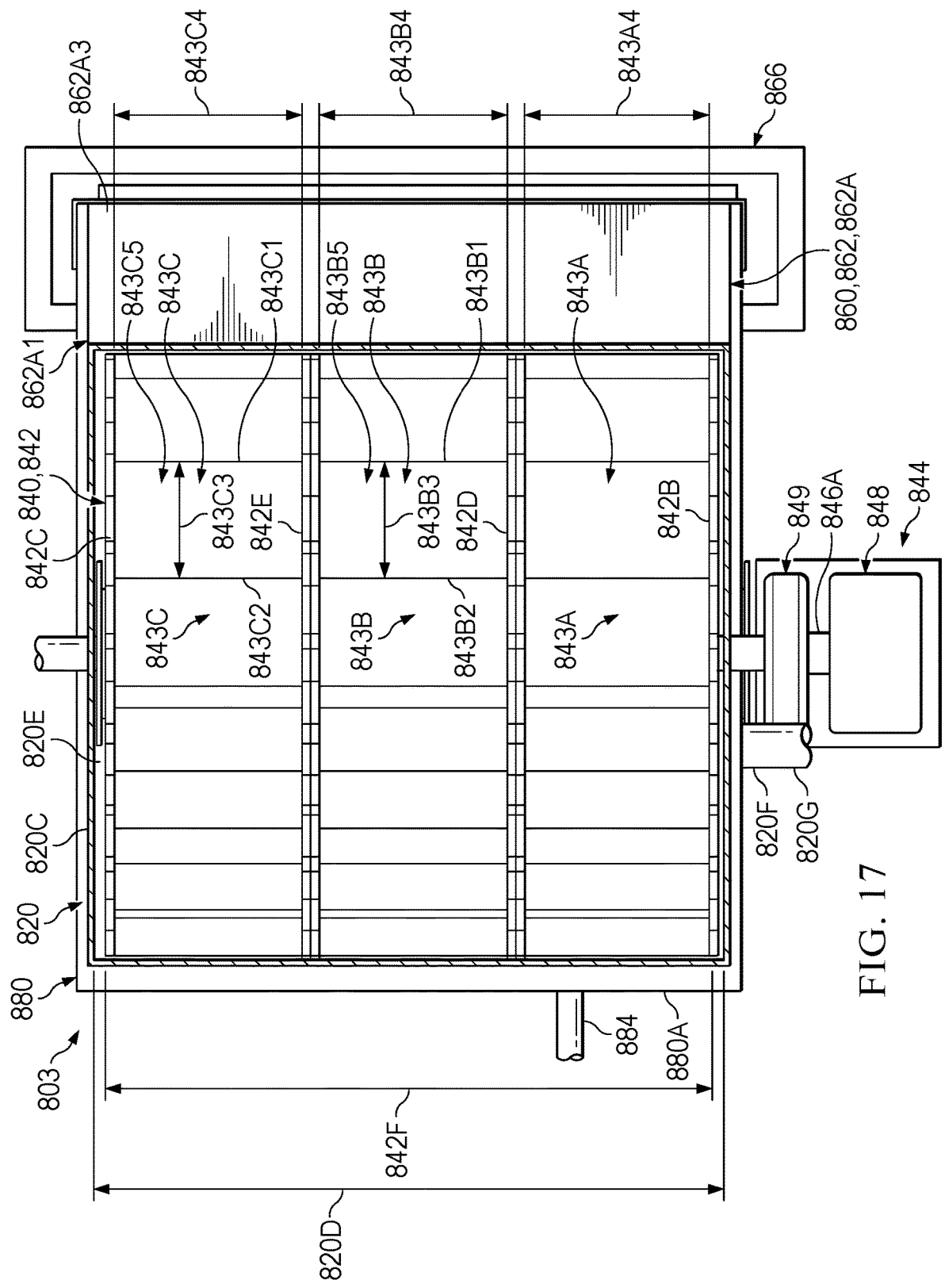
FIG. 17 is a sectional view of the apparatus taken in the direction of line 17-17 shown in FIG. 16A.

FIGS. 16 and 17 illustrate another apparatus 803 that is configured purify seawater by separating and/or removing the precipitate salt from the water provided in seawater. The apparatus 803 is similar to apparatuses 403, 503 as illustrated in FIGS. 10-13, except as detailed below.

It should be understood that the at least one apparatus 803 may be powered by at least one power supply or source described and illustrated herein. The at least one power supply may be any suitable power supply or power source described herein, including parabolic troughs/solar panels 204, heliostats 304, power supply 704, and any other available power supplies or sources to power the at least one apparatus 803.

Referring to FIG. 16A, apparatus 803 may include a vessel 820. The vessel 820 may have a top end 820A, a bottom end 820B opposite to the top end 820A, and a longitudinal axis defined therebetween. A portion of the vessel 820 proximate to the bottom end 820B may be rounded or curvilinear. Such use of the rounded or curvilinear shape is described in more detail below. In other exemplary embodiments, a portion of a vessel proximate to a bottom end may define any suitable shape or configuration. The vessel 820 also includes a circumferential wall 820C that extends between the top end 820A and the bottom end 820B. The circumferential wall 820C defines a diameter 820D that continuous from the top end 820A towards the bottom end 820B (see FIG. 16A). In one exemplary embodiment, the diameter 820D defined by the circumferential wall 820C is greater than eight feet. The top end 820A, the bottom end 820B, and the circumferential wall 820C collectively define a chamber 820E that extends between the top end 820A and the bottom end 820B. As described in more detail below, the vessel 820 is pressurized and sealed at a desired atmospheric pressure greater than the ambient pressure exterior to the chamber 820E.

Referring to FIG. 17, the vessel 820 defines an inlet opening 820F in the circumferential wall 820C at a location between the top end 820A and the bottom end 820B. The inlet opening 820F of the vessel 820 provides fluid communication between a seawater line 820G (see also FIG. 17) and the chamber 820E defined by the vessel 820. The seawater line 820G is able to deliver seawater from a body of seawater into the vessel 820 via at least one pump (e.g., the at least one pump 9) connected to a main seawater line "SWL" (see FIG. 2). The vessel 820 also defines an output opening 820H in the circumferential wall 820C at the top end 820A. The output opening 820H is positioned opposite to the inlet opening 820F relative to the longitudinal axis of the vessel 820 and is positioned vertically above the inlet opening 820F. The output opening 820H of the vessel 820 provides fluid communication between a hood of the apparatus 803 and the chamber 820E defined by the vessel 820 where the hood is able to deliver steam from the apparatus 803 to the at least one steam line previously described above; additional information and detail about the hood of the apparatus 803 is described in more detail below.

The vessel 820 may also include an upper flange 820I. As best seen in FIG. 16A, the upper flange 820I is operably engaged with the circumferential wall 820C at the top end 820A of the vessel 820. As described in more detail below, the upper flange 820I may enable a hood or similar component of apparatus 803 to operably engage at the top end 820A of the vessel 820 to pressurize and seal the chamber 820E at a desired atmospheric pressure greater than the ambient pressure exterior to the chamber 820E.

The vessel 820 may also define a transition portion 821. The transition portion 821 includes a top end 821A positioned proximate to the top end 820A of the vessel 820, a bottom end 821B vertically opposite to the top end 821A, and a passageway 821C defined entirely through the transition portion 821 and extending between the top end 821A and the bottom end 821B. As best seen in FIG. 16A, the passageway 821C defined by the transition portion 821 tapers outwardly from the top end 821A to the bottom end 821B. As described in more detail below, the tapered-shape of the passageway 821C defined by the transition portion 821 enables steam to be funneled and/or channeled into a hood of the apparatus 803 for steam purification by at least one mist eliminator of the apparatus 803.

Apparatus 803 also includes a hood 822 that operably engages with the vessel 820. As best seen in FIG. 16A, the hood 822 operably engages with vessel 820 at the top end 820A to pressurize and seal the chamber 820E at a desired atmospheric pressure greater than the ambient pressure exterior to the chamber 820E. The hood 822 includes a top end 822A, a bottom end 822B positioned adjacent to the top end 820A of the vessel 820 and vertically opposite to the top end 822A, and a cavity 822C extending upwardly from the bottom end 822B to the top end 822A. The hood 822 also defines an inlet opening 822D that is defined at the bottom end 822B of the hood 822 and provides access into the cavity 822C. In the illustrated embodiment, the chamber 820E of the vessel 820 and the inlet opening 822D of the hood 822 are in fluid communication with one another via the output opening 820H and the inlet opening 822D. The hood 822 also defines an outlet opening 822E at the top end 822A of the hood 822 and provides access into the cavity 822C. The outlet opening 822E enables a steam outlet connection 824 to operably engage with the hood 822 to transport purified steam from the apparatus 803 to downstream components for distilling operations, such as condensers and similar devices of the like described and illustrated herein.

The hood 822 may also include a lower flange 822F. As best seen in FIG. 16A, the lower flange 822F is operably engaged with the hood 822 at the bottom end 822B of the hood 822. As illustrated herein, the lower flange 822F is configured to operably engage with the upper flange 820I of the vessel 820 to operably engage the bottom end 822B of the hood 822 with the top end 820A of the vessel 820. Such engagement between the hood 822 and the vessel 820 enables the chamber 820E and the cavity 822C to be pressurized and sealed at a desired atmospheric pressure greater than the ambient pressure exterior to the chamber 820E and the cavity 822C.

Apparatus 503 may also include a base support frame 830 operably engaging a vessel 820 with a support surface or ground support surface. As best seen in FIG. 16A, a set of support frames 830 operably engages with the circumferential wall 820C of the vessel 820 at the bottom end 820B of the vessel 820. In other exemplary embodiments, any suitable number of base support frames may operably engage a vessel with a support surface or ground support surface. In other exemplary embodiments, any support structures and/or frames described and illustrated herein may be used to operably engage a vessel with a support surface or ground support surface.

Referring to FIGS. 16 and 17, the apparatus 803 may include a separation or removal assembly 840 operably engaged with the vessel 820. The separation assembly 840 may be configured to continuously separate and/or remove a volume of salt from the volume of seawater inside of the vessel 820, which is described in more detail below. The separation assembly 840 includes a structural support or wheel 842 that is operably engaged with the vessel 820. The wheel 842 includes a circumferential base wall 842A that operably engages with a first lateral wall 842B, a second lateral wall 842C (see FIG. 17) positioned opposite to the first lateral wall 842B, a first intermediate wall 842D (see FIG. 17), and a second intermediate wall 842E (see FIG. 17). As illustrated in FIG. 17, the first intermediate wall 842D is positioned between the first lateral wall 842B and the second lateral wall 842C proximate to the first lateral wall 842B. As illustrated in FIG. 17, the second intermediate wall 842E is positioned between the first intermediate wall 842D and the second lateral wall 842C. Such uses of the first and second intermediate walls 842D, 842E are described in more detail below.

The support structure 842 is also structurally configured with the vessel 820 such that the wheel 842 is able to move and/or rotate inside of the vessel 820 during separation operations; such rotation of the wheel 842 is described in more detail below. The wheel 842 also defines a diameter 842F that is measured between the first lateral wall 842B to the second lateral wall 842C and is complementary to the diameter 820D of the vessel 820 (see FIG. 17). In other words, the diameter 842F of the wheel 842 is less than the diameter 820D of the vessel 820 where the wheel 842 is able to collect and gather volumes of salt while still being able to move and/or rotate inside of the vessel 820 during separation operations. In one exemplary embodiment, the diameter 842F of the wheel 842 is about eight feet where the wheel 842 is able to collect and gather volumes of salt while still being able to move and/or rotate inside of the vessel 820 during separation operations.

Still referring to FIG. 16A, the separation assembly 840 may include at least one set of collecting members 843 that operably engages with the wheel 842. Specifically, the at least one set of collecting members 843 is operably engaged with the circumferential base wall 842A and at least one of the first lateral wall 842B, the second lateral wall 842C, the first intermediate wall 842D, and the second intermediate wall 842E. In the illustrated embodiment, the separation assembly 840 includes a first set of collecting members 843A, a second set of collecting members 843B, and a third set of collecting members 843C where the vessel 820 is sized and configured to house the first, second, and third sets of collecting members 843A, 843B, 843C. The first, second, and third sets of collecting members 843A, 843B, 843C are considered advantageous at least because the sets of collecting members 843A, 843B, 843C enables the wheel 842 to collect a larger volume of salt from the seawater bath that settles at the bottom end 820B of the vessel 820, as compared to the separation assembly 440 described above, while allowing the water to drain through the set of collecting members 843 and back into the vessel 820. Such separation operations by the sets of collecting members 843A, 843B, 843C are described in more detail below.

The sets of collecting members 843A, 843B, 843C are configured to the collect and gather precipitate salt from the seawater being internally and/or externally heated while allowing the water to permeate through each collecting member of the sets of collecting members 843A, 843B, 843C. As such, the sets of collecting members 843A, 843B, 843C are adapted to hold a predetermined volume of salt when rotating with the wheel 842 during a separation operation. In the illustrated embodiment, each collecting member of the first, second, and third sets of collecting member 843A, 843B, 843C is substantially similar to one another and is orientated in a mirrored-image relative to the circumferential wall 842A of the wheel 842. Inasmuch as the first, second, and third sets of collecting member 843A, 843B, 843C are substantially similar, the following description will relate to the first set of collecting members 843A. It should be understood, however, that the description of the first set of collecting members 843A applies substantially similarly to the second and third sets of collecting members 843B, 843C.

In the illustrated embodiment, each collecting member of the first set of collecting members 843A has a first end 843A1 operably engaged with the circumferential base wall 842A, a second end 843A2 opposite to the first end 834A1 that is free from engagement and remote from the circumferential base wall 842A, and a longitudinal axis defined therebetween. Each collecting member of the first sets of collecting members 843A also has a length 843A3 defined between the first and second ends 843A1, 843A2 (see FIG. 16A). Each collecting member of the first sets of collecting members 843A also has a width 843A4 that is defined between the first lateral wall 842B and a first intermediate wall 842D of the wheel 842 (see FIG. 17). It should be understood that each collecting member of the second set of collecting members 843B also includes a first end 843B1, a second end 843B2, a length 843B3, and a width 843B4 that are substantially similar to the first end 843A1, the second end 843A2, the length 843A3, and the width 843A4 of each collecting member of the first set of collecting members 843A. It should also be understood that each collecting member of the third set of collecting members 843C also includes a first end 843C1, a second end 843C2, a length 843C3, and a width 843C4 that are substantially similar to the first end 843A1, the second end 843A2, the length 843A3, and the width 843A4 of each collecting member of the first set of collecting members 843A.

The second or terminal end 843A2 of each collecting member of the first set of collecting members 843A is complementary in shape with the bottom end 820B of the vessel 820. Similarly, the second or terminal ends 843B2, 843C2 of each collecting member of the second and third sets of collecting members 843B, 843C are also complementary in shape with the bottom end 820B of the vessel 820. Such complementary shape between the sets of collecting members 843A, 843B, 843C and the bottom end 820B of the vessel 820 is considered advantageous at least because the sets of collecting members 843A, 843B, 843C are able to collect volumes of salt from the seawater bath that settle at the bottom end 820B of the vessel 820. As illustrated in FIG. 16A, the separation assembly 840 includes fifteen equally distanced collecting member in each set of collecting members 843A, 843B, 843C that are operably engaged with the circumferential base wall 542A and radially extend away from the circumferential base wall 542A. In other exemplary embodiments, a separation assembly may include any suitable number of collecting members in a set of collecting members based on various considerations, including the size, shape, and configuration of the wheel and other various considerations.

As illustrated in FIG. 16A, each collecting member of the sets of collecting members 843A, 843B, 843C is disposed at an angle relative to one or all of the first lateral wall 842B, the second lateral wall 842C, the first intermediate wall 842D, and the second intermediate wall 842E of the wheel 842. The structural configuration of each collecting member of the sets of collecting members 843A, 843B, 843C being disposed at an angle relative to one or all of the first lateral wall 842B, the second lateral wall 842C, the first intermediate wall 842D, and the second intermediate wall 842E is considered advantageous at least because the sets of collecting members 843A, 843B, 843C are able to collect volumes of salt from the seawater bath that settle at the bottom end 820B of the vessel 820. In the illustrated embodiment, each collecting member of the sets of collecting members 843A, 843B, 843C are relatively flat along its length (see FIG. 16A). Moreover, the structural configuration of each collecting member of the sets of collecting members 843A, 843B, 843C being disposed at an angle relative to one or all of the first lateral wall 842B, the second lateral wall 842C, the first intermediate wall 842D, and the second intermediate wall 842E enables the sets of collecting member 843A, 843B, 843C to retain the volumes of salt inside receptacles defined by the sets of collecting member 843A, 843B, 843C, which are described in greater detail below. In other exemplary embodiments, each collecting member of a set of collecting members may define any suitable size, shape, or configuration based on various considerations, including the configuration of a vessel, the amount of seawater pumped into the vessel, and other various considerations.

In the illustrated embodiment, each collecting member of the sets of collecting members 843A, 843B, 843C is a porous wall (e.g., a screen, colander, and other devices of the like) to efficiently collect a volume of salt from the seawater bath that settle at the bottom end 820B of the vessel 820. Having each collecting member of sets of collecting members 843A, 843B, 843C being porous walls are considered advantageous at least because the sets of collecting members 843A, 843B, 843C are able to efficiently collect volumes of salt from the seawater bath that settles at a bottom end of a vessel while allowing the water to drain through the sets of collecting members 843A, 843B, 843C and back into the vessel 820 for steam and condensing purposes; such separation operation by the sets of collecting members 843A, 843B, 843C is described in more detail below. In an exemplary embodiment, each collecting member of the sets of collecting member may be a solid wall for scooping and retaining volumes of salt and water. In other words, each collecting member of the sets of collecting member may act as baskets to collect volumes of salt from the seawater bath that settle at a bottom end of a vessel.

Referring to FIGS. 16 and 17, a receptacle 843A5 is defined between each collecting member of the first set of collecting members 843A, a portion of the circumferential base wall 842A, a portion of the first lateral wall 842B, and a portion of the first intermediate wall 842D. Receptacles 843B5, 843C5 for the second and third collecting members 843B, 843C are similarly defined as compared to the receptacles 843A5 of the first set of collecting members 843A. The receptacles 843A5, 843B5, 843C5 defined inside each collecting member of the sets of collecting members 843A, 843B, 843C is configured to the collect and gather salt from the heated seawater while allowing the water to permeate through each collecting member of the sets of collecting members 843A, 843B, 843C. As such, the sets of collecting members 843A, 843B, 843C are adapted to hold a predetermined volume of salt when rotating with the wheel 842 and a drive assembly during a separation operation, which is described in more detail below.

The separation assembly 840 also includes a drive assembly 844 operably engaged with the wheel 842. As illustrated in FIG. 17, the drive assembly 844 has a drive shaft 846 that operably engages with the wheel 842. The drive shaft 846 includes a first or front end 846A, an opposing second or rear end 846B, and a longitudinal axis defined therebetween. The drive shaft 846 is operably engaged with the wheel 842 via first and second cross members 847A, 847B. In the illustrated embodiment, the first and second cross members 847A, 847B are operably engaged with the circumferential base wall 842A of the wheel 842.

The drive assembly 844 also includes at least one motor 848 that operably engages with one of the first end 846A of the drive shaft 846 and the second end 846B of the drive shaft 846. In the illustrated embodiment, a single motor 848 operably engages with first end 846A of the drive shaft 846 (see FIG. 17). The engagement between the motor 848 and the drive shaft 846 enables the motor 848 to rotatably move the wheel 842 inside of the vessel 820 about the longitudinal axis of the drive shaft 846. The drive assembly 844 also includes at least one pillow block bearing 849 that operably engages with the drive shaft 846 and is positioned between the vessel 820 and the motor 848. As best seen in FIG. 17, a single pillow block bearing 849 operably engages with drive shaft 846 and is positioned between the vessel 820 and the motor 848. The pillow block bearing 849 is configured to provide axial support along the drive shaft 846 when the drive shaft 846 is being rotated by the motor 848 during separation operations.

Apparatus 803 also includes a salt discharge assembly 860 that operably engages with the vessel 820. In the illustrated embodiment, the salt discharge assembly 860 is configured to receive collected volumes of salt from at least one set of collecting members 843A, 843B, 843C and to discharge the collected volumes of salt away from the apparatus 803. Such components and devices that form the salt discharge assembly 860 are described in greater detail below.

Referring to FIG. 16B, the salt discharge assembly 860 includes a salt discharge chute 862 that is operably engaged with the vessel 820 and is in fluid communication with the chamber 820E of the vessel 820. The salt discharge chute 862 includes a first chute portion 862A that operably engages with the vessel 820 and extends outwardly from the circumferential wall 820C of the vessel 820. The first chute portion 862A and the vessel 820 are integral with one another in that the first chute portion 862A of the salt discharge assembly 860 and the vessel 820 depict a single, unitary member. The first chute portion 862A also defines a V-shaped configuration and/or a tapered configuration that tapers inwardly from a first end 862A1 defined in the first chute portion 862A to a second end 862A2 vertically below the first end 862A1. The first chute portion 862A also defines a passageway 862A3 that extends between the first end 862A1 and the second end 862A2. The passageway 862A3 is in fluid communication with the chamber 820E of the vessel 820 via the first end 862A1 being in communication with the chamber 820E. The first portion also has a flange 862A4 that is positioned at the second end 862A2 and enabled to operably engage additional chute portions of the salt discharge assembly 860 with the first chute portion 862A; such additional chute portions are described in more detail below.

Still referring to FIG. 16B, the salt discharge chute 862 also includes a second chute portion 862B that operably engages with the first chute portion 862A. The second chute portion 862B includes a first end 862B1, a second end 862B2 vertically below the first end 862B1, and a passageway 862B3 extending between the first end 862B1 and the second end 862B2. As illustrated, the second chute portion 862B is in fluid communication with the first chute portion 862A via the passageway 862A3 and the passageway 862B3. The second chute portion 862B also includes a first flange 862B4 positioned at the first end 862B1 and configured to operably engage with the flange 862A4 of the first chute portion 862A. The second chute portion 862B also includes a second flange 862B5 positioned at the second end 862B2 and configured to operably engage with a flange of a fourth chute portion, which is described in more detail below. The second chute portion 862B also defines a pair of pockets 862B6 that is configured to house at least one exit valve of the salt discharge assembly 860, which is described in more detail below.

Still referring to FIG. 16B, the salt discharge chute 862 also includes a third chute portion 862C that operably engages with the second chute portion 862B. The third chute portion 862C includes a first end 862C1, a second end 862C2 vertically below the first end 862C1, and a passageway 862C3 extending between the first end 862C1 and the second end 862C2. As illustrated, the third chute portion 862C is in fluid communication with the second chute portion 862B via the passageway 862B3 and the passageway 862C3. The third chute portion 862C also includes a first flange 862C4 positioned at the first end 862C1 and configured to operably engage with the second flange 862B5 of the second chute portion 862B. The third chute portion 862C also includes a second flange 862C5 positioned at the second end 862C2 and configured to operably engage with a flange of another chute portion, which is described in more detail below.

Still referring to FIG. 16B, the salt discharge chute 862 also includes a fourth chute portion 862D that operably engages with the third chute portion 862C. The fourth chute portion 862D includes a first end 862D1, a second end 862D2 vertically below the first end 862D1, and a passageway 862D3 extending between the first end 862D1 and the second end 862D2. As illustrated, the fourth chute portion 862D is in fluid communication with the third chute portion 862C via the passageway 862C3 and the passageway 862D3. The fourth chute portion 862D also includes a first flange 862D4 positioned at the first end 862D1 and configured to operably engage with the second flange 862C5 of the third chute portion 862C. The fourth chute portion 862D also includes a second flange 862D5 positioned at the second end 862D2 and configured to operably engage with a flange of another chute portion, which is described in more detail below. The fourth chute portion 862D also defines a pair of pockets 862D6 that is configured to house at least another rotary valve of the salt discharge assembly 860, which is described in more detail below.

The salt discharge assembly 860 may also include at least one exit valve or rotary valve 864 that operably engages with the salt discharge chute 862. As best seen in FIG. 16B, a first rotary valve 864A operably engages with the second chute portion 862B, via the pair of pockets 862B6. As illustrated, the first rotary valve 864A is moveable between an opened position OP1 and a closed position CP1 (phantom lines in FIG. 16B). In the opened position OP1, the first rotary valve 864A is housed inside one of the pockets of the pair of pockets 862B6 for enabling volumes of salt to pass through the second chute portion 862B towards the third chute portion 862C. In the closed position CP1, the first rotary valve 864A is housed inside both pockets of the pair of pockets 862B6 to prevent salt and/or fluid from passing through the second chute portion 862B and discharged to the third chute portion 862C. Similarly, a second rotary valve 864B operably engages with the fourth chute portion 862D via the pair of pockets 862D6. As illustrated, the second rotary valve 864B is moveable between an open position OP2 and a closed position CP2 (phantom lines in FIG. 16B). In the opened position OP2, the second rotary valve 864B is housed inside one of the pockets of the pair of pockets 862D6 for enabling volumes of salt to pass through the fourth chute portion 862D towards salt processing stages and/or containers. In the closed position CP2, the second rotary valve 864B is housed inside both pockets of the pair of pockets 862D6 to prevent salt and/or fluid from passing through the fourth chute portion 862D and discharged to salt processing stages and/or containers.

During separation operations, the salt discharge assembly 860 is configured to receive volumes of salt collected by the separation assembly 840 and to transport the volumes of salt from the apparatus 803 to at one container 866 of the salt discharge assembly 860 or least one salt tank previously described above (e.g., the at least one salt tank 10). During transporting operations, the salt discharge assembly 860 uses a two-stage seal mechanism that prevents depressurization of the vessel 820 and loss of the heat inside of the vessel 820. In a first stage, the first rotary valve 864A transitions from the closed position CP1 to the opened position OP1 to enable the volumes of salt to pass through the second chute portion 862B towards the third chute portion 862C. During this first stage, the second rotary valve 864B is maintained at the closed position CP2 to maintain the pressurized, heated environment inside of the chamber 820E. As such, the volumes of salt remain inside one or both of the second chute portion 862B and the third chute portion 862C. In a second stage, the first rotary valve 864A transitions from the opened position OP1 to the closed position CP1 to maintain the pressurized, heated environment inside of the chamber 820E. Once the first rotary valve 864A is provided in the closed position CP1, the second rotary valve 864B transitions from the closed position CP2 to the opened position OP2 to enable the volumes of salt to pass through the fourth chute portion 862D. Such use of the first rotary valve 864A and the second rotary valve 864B creates this two-stage seal mechanism to prevent depressurization of the vessel 820 and loss of the heat inside of the vessel 820.

Referring to FIG. 16A, the apparatus 803 may include at least one mist eliminator 870. In the illustrated embodiment, the apparatus 803 includes a first mist eliminator 870A and a second mist eliminator 870B. In other exemplary embodiments, any suitable number of mist eliminators may be used in an apparatus based on various considerations, including the size, shape, and configuration of the vessel, the volume of seawater pumped into the vessel, and other various considerations of the like.

As best seen in FIG. 16A, each of the first and second mist eliminators 870A, 870B is operably engaged with hood 822 inside of the cavity 822C. Each of the first and second mist eliminators 870A, 870B is also positioned inside of the chamber 820E of the vessel 820 and is positioned vertically above the separation assembly 840 and the seawater bath that is held inside of the vessel 820. In the illustrated embodiment, the first and second mist eliminators 870A, 870B are configured to remove water droplets and salt precipitate from the steam when converted from the seawater. As the steam initially passes through the first mist eliminator 870A, the steam endures a first purification stage where the first mist eliminator 870A removes any water droplets or excess salt precipitate from said steam. For further removal, the steam endures a second purification stage where the second mist eliminator 870B removes any remaining water droplets or excess salt precipitate from said steam. Upon passing through the first and second mist eliminators 870A, 870B, the steam is substantially free of any water droplets or salt precipitate. As such, the first and second mist eliminators 870A, 870B purifies the steam prior to be transported to the at least one condenser (e.g., the at least one condenser).

In the illustrated embodiment, the first mist eliminator 870A is a spiral type mist eliminator and the second mist eliminator 870B is a single vane or chevron (plate) type mist eliminator. In other exemplary embodiment, first and second mist eliminators may be any suitable type of mist eliminator geometry described herein or available based on the application for removing water droplets, precipitate salt, or other solids and fluids. The different geometries between the first and second mist eliminators 870A, 870B are considered advantageous at least because such difference in structural geometries allows for fine-tuning the performances of the mist eliminators for being more versatile or efficient in screening and removing solids and fluids in the steam.

Still referring to FIG. 16A, the apparatus 803 may also include a vessel jacket 880 that operably engages with a portion of the vessel 820 exterior to the chamber 820E defined by the vessel 820. The vessel jacket 880 is configured to cover and/or encapsulate a portion of the vessel 820 to provide continuous thermal energy to the vessel 820 for externally heating the seawater bath inside of the vessel 820. As such, the vessel jacket 880 is configured to provide external heat at the bottom end 820B of the vessel 820 to evaporate the seawater inside of the vessel 820 from a liquid state to a vapor state (i.e., steam).

As best seen in FIG. 16A, the vessel jacket 880 includes a top end 880A, a bottom end 880B vertically opposite to the top end 880A, and a chamber 880C defined between the top end 880A and the bottom end 880B. As illustrated, the top end 880A is positioned at a location between the top end 820A of the vessel 820 and a bottom end 820B of the vessel 820 proximate to the bottom end 820B. The bottom end 880B is positioned at the bottom end 820B of the vessel 820. The vessel jacket 880 also defines a heated fluid inlet opening 880D at the bottom end 880B of the vessel jacket 880 providing access into the chamber 880C. A heated fluid inlet connection 882 operably engages with the vessel jacket 880 via the heated fluid inlet opening 880D for delivering heated fluid into the vessel jacket 880. The vessel jacket 880 also defines a heated fluid outlet opening 880E proximate to the top end 880A of the vessel jacket 880 and provides access into the chamber 880C. A heated fluid outlet connection 884 operably engages with the vessel jacket 880 via the heated fluid outlet opening 880E for extracting used heated fluid from the vessel jacket 880. Such inclusion of the heated fluid inlet opening 880D and the heated fluid outlet opening 880E enables the apparatus 803 to continuously pass heated fluid through the vessel jacket 880 to maintain a desired temperature inside of the vessel 820 during separation operations.

The apparatus 803 may be used with any SDS (e.g. SDS 1, 200, 300, 700) described and illustrated herein. In one instance, the apparatus 803 may be operably engaged with a solar tower (such as solar tower 2) where the vessel jacket 880 may be removed and externally heated by a plurality of heliostats (such as the plurality of heliostats 4) at an elevated level above ground surface. In another instance, the apparatus 803 may also be powered by a plurality of photovoltaic (or PV) cells (such as the plurality of PV cells 5) to operate the drive assembly 844. In another instance, any suitable device in any SDS described and illustrated (e.g. SDS 1, 200, 300, 700) may be operably engaged with the apparatus 803 for removing salt from seawater and providing fresh and/or potable water.

It should be understood that FIGS. 16 and 17 are diagrammatic only and do not illustrate exact and precise dimensions of any component, assembly, or apparatus provided herein. Such diagrammatic illustrations of the apparatus 803 and other machines, components, and systems shown in FIGS. 16 and 17 should not limit the exact positioning, orientation, or location of the apparatus 803 and machines, components, and systems operably engaged with apparatus 803 relative to one another.

Figure 18:
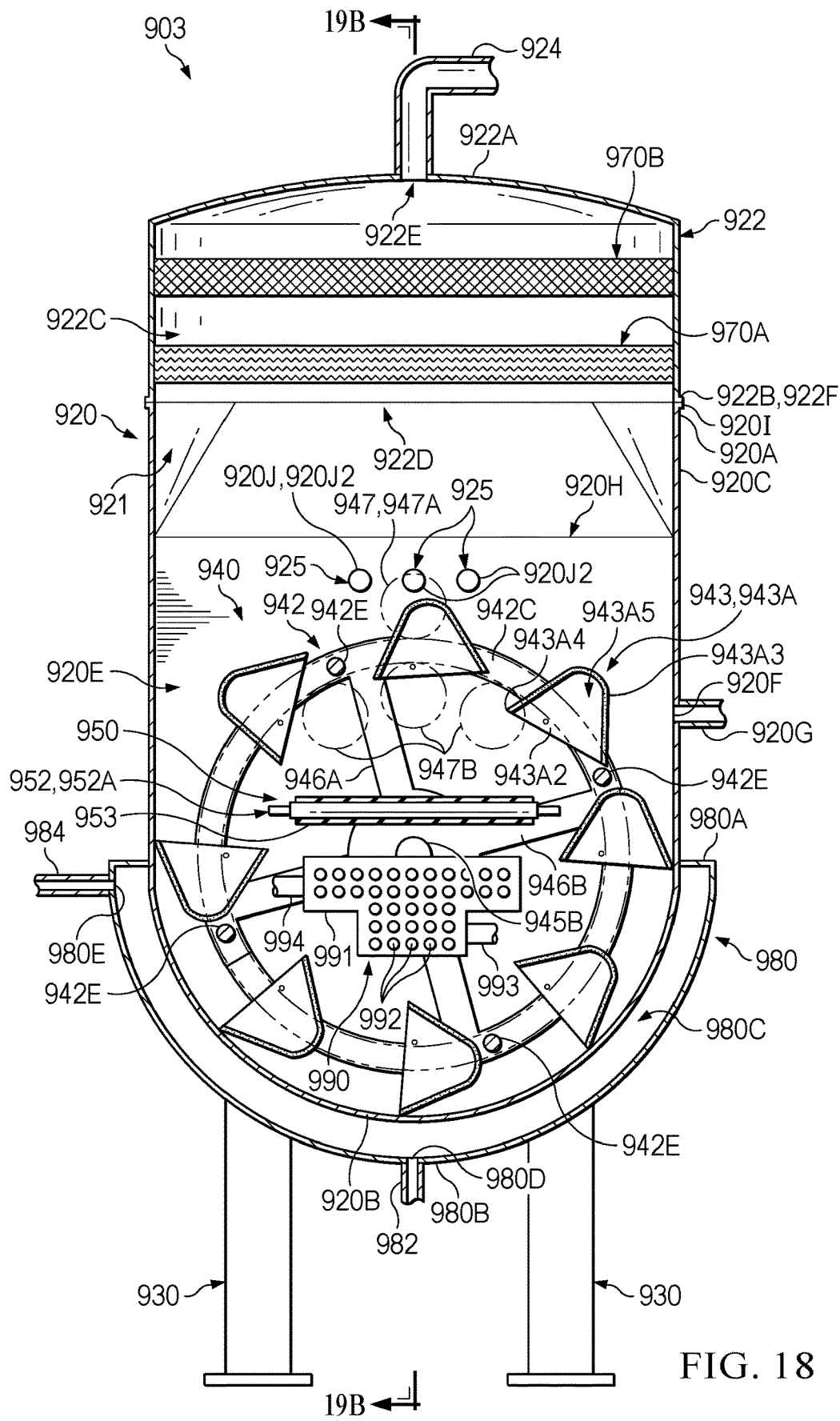
FIG. 18 is a sectional view of another apparatus of a seawater distillation system.
Figure 19A:
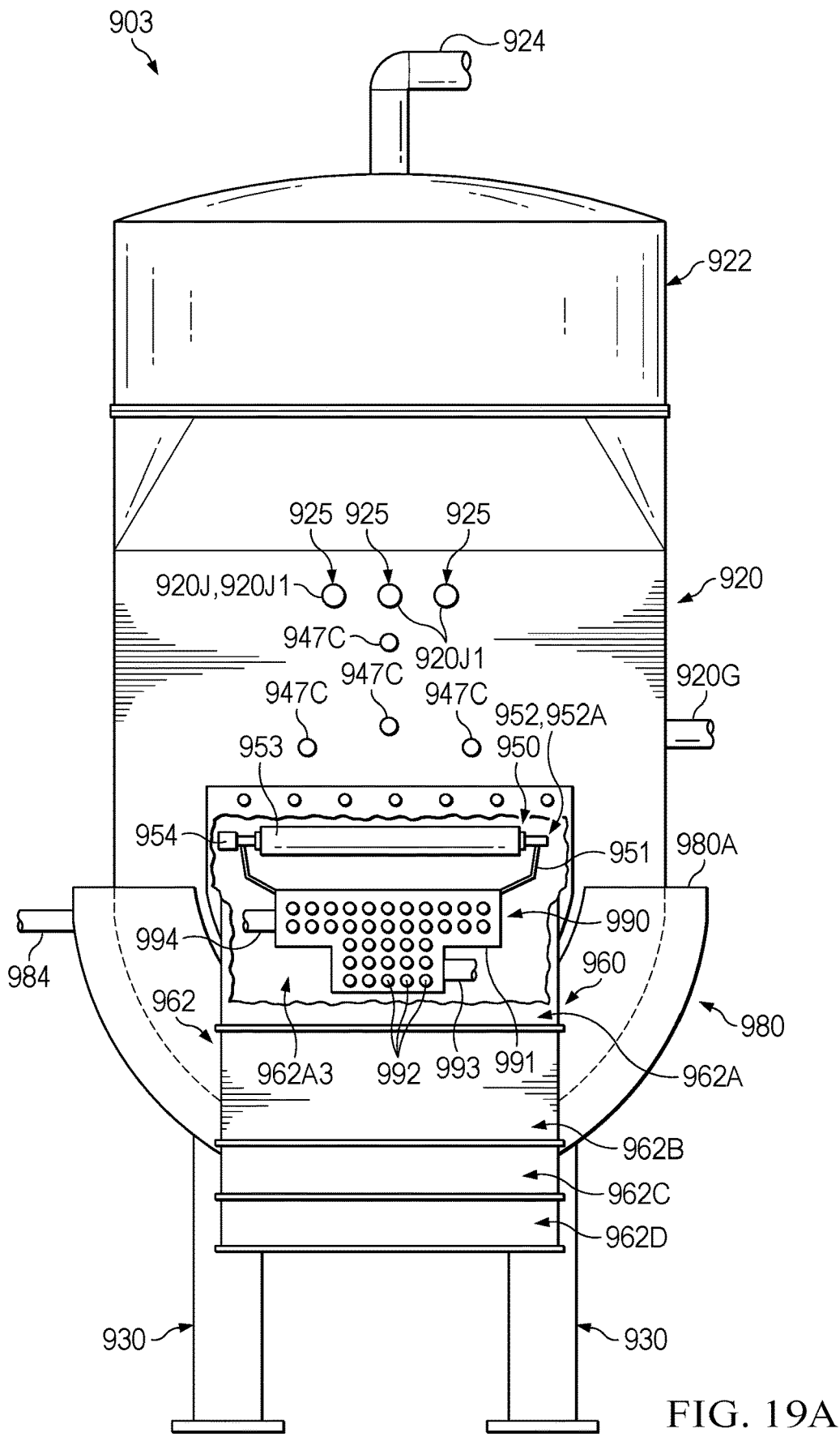
FIG. 19A is a partial cut away view of a conveyor assembly and a heating tube assembly of the apparatus shown in FIG. 18.
Figure 19B:
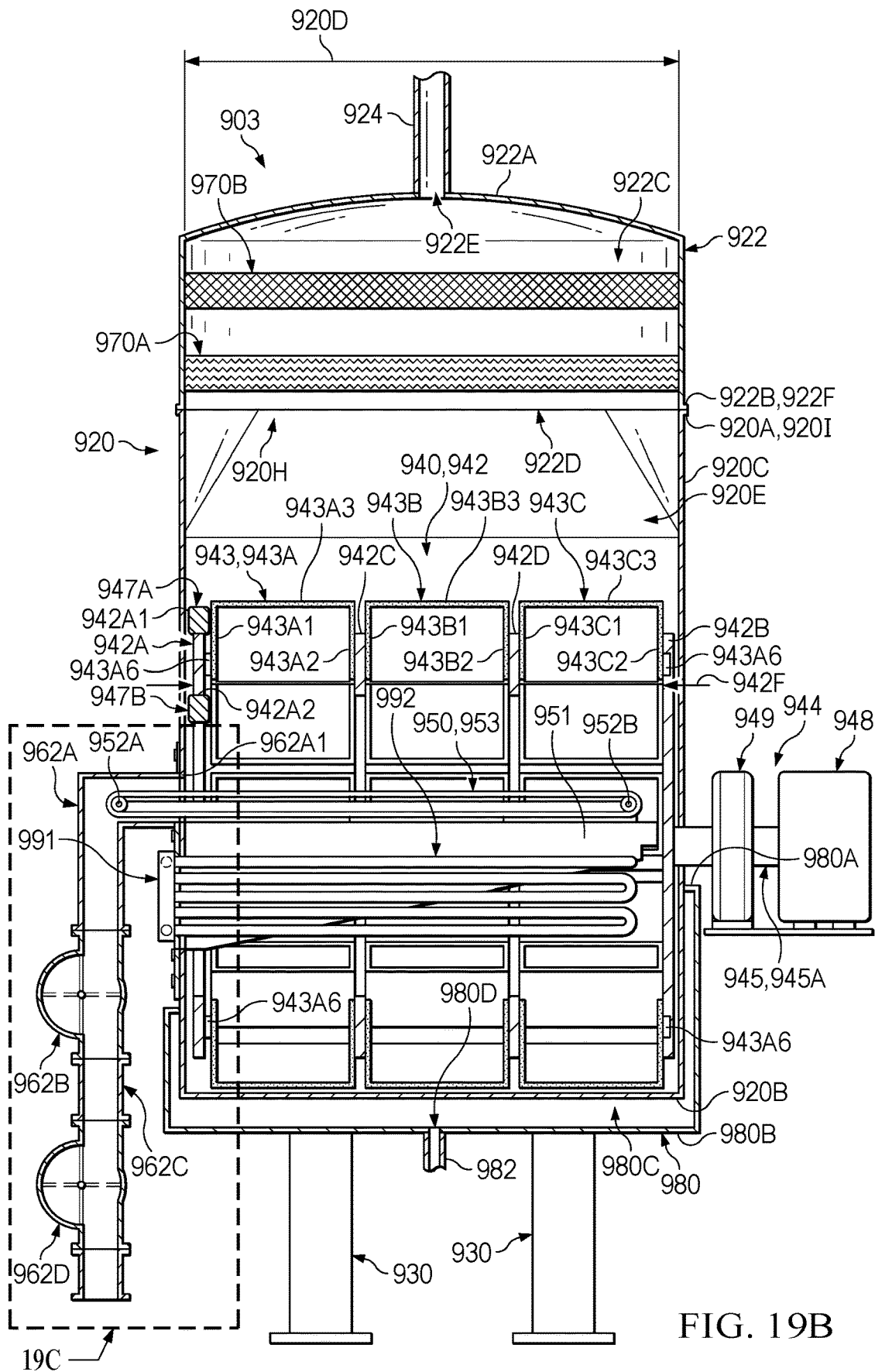
FIG. 19B is a sectional view of the apparatus taken in the direction of line 19B-19B shown in FIG. 18.

FIGS. 18-19B illustrate another apparatus 903 that is configured to purify seawater by separating and/or removing the precipitate salt from the water provided in seawater. The apparatus 903 is similar to apparatuses 403, 503, 803 as illustrated in FIGS. 10-13 and 16-17, except as detailed below.

It should be understood that the at least one apparatus 903 may be powered by at least one power supply or source described and illustrated herein. The at least one power supply may be any suitable power supply or source described herein, including parabolic troughs/solar panels 204, heliostats 304, power supply 704, and any other available power supplies or sources to power the at least one apparatus 903.

Referring to FIG. 18, apparatus 903 may include a vessel 920. The vessel 920 may have a top end 920A, a bottom end 920B opposite to the top end 920A, and a longitudinal axis defined therebetween. A portion of the vessel 920 proximate to the bottom end 920B may be rounded or curvilinear. Such use of the rounded or curvilinear shape is described in more detail below. In other exemplary embodiments, a portion of a vessel proximate to a bottom end may define any suitable shape or configuration. The vessel 920 also includes a circumferential wall 920C that extends between the top end 920A and the bottom end 920B. The circumferential wall 920C defines a diameter 920D that continuous from the top end 920A towards the bottom end 920B (see FIG. 18). In one exemplary embodiment, the diameter 920D defined by the circumferential wall 920C is greater than eight feet. The top end 920A, the bottom end 920B, and the circumferential wall 920C collectively define a chamber 920E that extends between the top end 920A and the bottom end 920B. As described in more detail below, the vessel 920 may be pressurized and sealed at a desired atmospheric pressure greater than the ambient pressure exterior to the chamber 920E.

Referring to FIG. 18, the vessel 920 defines an inlet opening 920F in the circumferential wall 920C at a position between the top end 920A and the bottom end 920B. The inlet opening 920F of the vessel 920 provides fluid communication between a seawater line 920G (see also FIGS. 18 and 19A) and the chamber 920E defined by the vessel 920. The seawater line 920G is able to deliver seawater from a body of seawater into the vessel 920 via at least one pump (e.g., the at least one pump 9) connected to a main seawater line "SWL" (see FIG. 2). The vessel 920 also defines an output opening 920H in the circumferential wall 920C at the top end 920A opposite to the inlet opening 920F relative to the longitudinal axis of the vessel 920. The output opening 920H of the vessel 920 provides fluid communication between a hood of the apparatus 903 and the chamber 920E defined by the vessel 920 where the hood is able to deliver steam from the apparatus 903 to the at least one steam line previously described above; additional information and detail about the hood of the apparatus 903 is described in more detail below.

The vessel 920 may also include an upper flange 9201. As best seen in FIG. 18, the upper flange 9201 is operably engaged with the circumferential wall 920C at the top end 920A of the vessel 920. As described in more detail below, the upper flange 9201 may enable a hood or similar component to operably engage at the top end 920A of the vessel 920 to pressurize and seal the chamber 920E at a desired atmospheric pressure greater than the ambient pressure exterior to the chamber 920E.

The vessel 920 may also define at least one side opening 920J positioned at a location between the top end 920A and the bottom end 920B. As illustrated, the at least one side opening 920J is defined in the circumferential wall 920C of the vessel 920 at a location between the top end 920A and the bottom end 920B proximate to the top end 920A. The at least one side opening 920J also extends entirely through the circumferential wall 920C such that the at least one side opening 920J provides fluid communication between the chamber 920E of the vessel 920 and the exterior environment of the vessel 920. Such use and purpose of the at least one side opening 920J is described in more detail below. In the illustrated embodiment, six side openings 920J are defined in the circumferential wall 920C of the vessel 920 at locations between the top end 920A and the bottom end 920B proximate to the top end 920A. In this illustrated embodiment, a first set of side openings 920J1 are defined along a first side of the circumferential wall 920C, and a second set of side openings 920J2 are defined along a second side of the circumferential wall 920C where the second set of side openings 920J2 is opposite to the first set of side openings 920J1 and is coaxial with the first set of side openings 920J1. In other exemplary embodiments, a vessel may define any suitable number of side openings to provide fluid communication between a chamber of the vessel and the exterior environment of the vessel.

The vessel 920 may also have a transition portion 921 substantially similar to the transition portion 821 of the vessel 820 described above. Similar to the transition portion 821, the tapered-shape of the transition portion 921 enables steam to be funneled and/or channeled into a hood of the apparatus 903 for steam purification by at least one mist eliminator of the apparatus 903.

Apparatus 903 also includes a hood 922 that operably engages with the vessel 920. As best seen in FIG. 18, the hood 922 operably engages with vessel 920 at the top end 920A to pressurize and seal the chamber 920E at a desired atmospheric pressure that may be greater than the ambient pressure exterior to the chamber 920E and the hood 922. The hood 922 includes a top end 922A, a bottom end 922B positioned adjacent to the top end 920A of the vessel 920 and vertically opposite to the top end 922A, and a cavity 922C extending upwardly from the bottom end 922B to the top end 922A. The hood 922 also defines an inlet opening 922D that is defined at the bottom end 922B of the hood 922 and provides access into the cavity 922C. In the illustrated embodiment, the chamber 920E of the vessel 920 and the inlet opening 922D of the hood 922 are in fluid communication with one another via the output opening 920H and the inlet opening 922D. The hood 922 also defines an outlet opening 922E at the top end 922A of the hood 922 and provides access into the cavity 922C. The outlet opening 922E enables a steam outlet connection 924 to operably engage with the hood 922 to transport purified steam from the apparatus 903 to downstream components, such as condensers and similar devices of the like described and illustrated herein.

The hood 922 may also include a lower flange 922F. As best seen in FIG. 18, the lower flange 922F is operably engaged with the hood 922 at the bottom end 922B of the hood 922. As illustrated herein, the lower flange 922F is configured to operably engage with the upper flange 9201 of the vessel 920 to operably engage the bottom end 922B of the hood 922 with the top end 920A of the vessel 920. Such engagement between the hood 922 and the vessel 920 enables the chamber 920E and the cavity 922C to be pressurized and sealed at a desired atmospheric pressure that may be greater than the ambient pressure exterior to the chamber 920E and the cavity 922C.

Referring to FIG. 19A, at least one pressurized fluid connection 925 may be operably engaged with the vessel 920 via the at least one side opening 920J. More particularly, the at least one pressurized fluid connection 925 is operably engaged with the circumferential wall 920C of the vessel via the at least one side opening 920J. The at least one pressurized fluid connection 925 is positioned inside of the chamber 920E and is configured to exert pressurized fluid into the chamber 920E of the vessel 920 for removing salt from at least one collecting member of the apparatus 903, which is described in more detail below. In one example, the at least one pressurized fluid connection 925 may be connected to an air compressor (not illustrate) or similar machine of the like for delivering and exerting pressurized air into the chamber 920E of the vessel 920 to remove salt from at least one collecting member of the apparatus 903. In another example, the at least one pressurized fluid connection 925 may be connected to a water pressurized device (not illustrate) or similar machine of the like for delivering and exerting pressurized water into the chamber 920E of the vessel 920 to remove salt from at least one collecting member of the apparatus 903. In the illustrated embodiment, three pressurized fluid connections 925 operably engages with the circumferential wall 920C via the first set of side openings 920J1 and the second set of side openings 920J2. In other exemplary embodiments, any suitable number of pressurized fluid connections may be operably engaged with a vessel for delivering and exerting pressurized fluid into a chamber of the vessel 920 to remove salt from at least one collecting member of an apparatus.

Apparatus 903 may also include a base support frame 930 operably engaging a vessel 920 with a support surface or ground support surface. As best seen in FIG. 18, a set of support frames 930 operably engages with the circumferential wall 920C of the vessel 920 at the bottom end 920B of the vessel 920. In other exemplary embodiments, any suitable number of base support frames may operably engage a vessel with a support surface or ground support surface. In other exemplary embodiments, any support structures and/or frames described and illustrated herein may be used to operably engage a vessel with a support surface or ground support surface.

Referring to FIGS. 18-19B, the apparatus 903 may include a separation or removal assembly 940 operably engaged with the vessel 920. The separation assembly 940 may be configured to continuously separate and/or remove a volume of salt from a continuous volume of seawater transferred inside of the vessel 920, which is described in more detail below. The separation assembly 940 includes a structural support or wheel 942 that is operably engaged with the vessel 920. The wheel 942 includes a first lateral wall or ring 942A (see FIG. 19B), a second lateral wall or ring 942B (see FIGS. 18 and 19B) positioned opposite to the first lateral wall 942A, a first intermediate wall or ring 942C (see FIG. 19B) positioned between the first lateral wall 942A and the second lateral wall 942B, and a second intermediate wall or ring 942D (see FIG. 19B) positioned between the first lateral wall 942A and the second lateral wall 942B. As illustrated in FIG. 19B, the first intermediate wall 942C is positioned between the first lateral wall 942A and the second lateral wall 942B proximate to the first lateral wall 942A. As illustrated in FIG. 19B, the second intermediate wall 942D is positioned between the first intermediate wall 942C and the second lateral wall 942B. Such uses of the first and second intermediate walls 942C, 942D are described in more detail below.

Referring to FIGS. 18 and 19B, the wheel 942 also includes at least one support pipe 942E that operably engages the first lateral wall 942A, the second lateral wall 942B, the first intermediate wall 942C, and the second intermediate wall 942D with one another. As shown in FIG. 19B, the at least one support pipe 942E extends from the first lateral wall 942A, through the first intermediate wall 942C, through the second intermediate wall 942D, and terminates at the second lateral wall 942B to operably engage the first lateral wall 942A, the second lateral wall 942B, the first intermediate wall 942C, and the second intermediate wall 942D with one another. In the illustrated embodiment, the wheel 942 includes four support pipes 942E that are positioned at equal distances from one another and operably engage the first lateral wall 942A, the second lateral wall 942B, the first intermediate wall 942C, and the second intermediate wall 942D with one another. In other exemplary embodiments, any suitable number of support pipes may be used to operably engage a first lateral wall of a wheel, a second lateral wall of the wheel, a first intermediate wall of the wheel, and a second intermediate wall of the wheel with one another.

The support structure 942 is also structurally configured with the vessel 920 such that the wheel 942 is able to move and/or rotate inside of the vessel 920 during separation operations. Such rotation of the wheel 942 is described in more detail below. The wheel 942 also defines a diameter 942F that is complementary to the diameter 920D of the vessel 920 (see FIG. 18). In other words, the diameter 942F of the wheel 942 is less than the diameter 920D of the vessel 920 where the wheel 942 is able to collect and gather volumes of salt while still being able to move and/or rotate inside of the vessel 920 during separation operations. In one exemplary embodiment, the diameter 942F of the wheel 942 is about eight feet where the wheel 942 is able to collect and gather volumes of salt while still being able to move and/or rotate inside of the vessel 920 during separation operations.

The separation assembly 940 may include at least one set of collecting members 943 that operably engages with the wheel 942. As best seen in FIGS. 18 an 19B, the at least one set of collecting members 943 is operably engaged with at least one of the first lateral wall 942A, the second lateral wall 942B, the first intermediate wall 942C, and the second intermediate wall 942D. In the illustrated embodiment, the separation assembly 940 includes a first set of collecting members 943A, a second set of collecting members 943B, and a third set of collecting members 943C where the vessel 920 is sized and configured to house the first, second, and third sets of collecting members 943A, 943B, 943C. The first, second, and third sets of collecting members 943A, 943B, 943C are considered advantageous at least because the additional sets of collecting members 943 enables the wheel 942 to collect a larger volumes of salt from the seawater bath that settles at the bottom end 920B of the vessel 920, as compared to the separation assembly 440 described above, while allowing the water to drain through the set of collecting members 943 and back into the vessel 920. Such separation operations by the sets of collecting members 943A, 943B, 943C are described in more detail below.

The sets of collecting members 943A, 943B, 943C are configured to the collect and gather volumes of salt from the seawater being internally and/or externally heated while allowing the water to permeate through each collecting member of the sets of collecting members 943A, 943B, 943C. As such, the sets of collecting members 943A, 943B, 943C are adapted to hold a predetermined volume of salt when rotating with the wheel 942 during a separation operation. In the illustrated embodiment, the first, second, and third sets of collecting member 943A, 943B, 943C are substantially similar to one another and are operably engaged with the wheel 942 in substantially similar configurations. Inasmuch as the first, second, and third sets of collecting member 943A, 943B, 943C are substantially similar, the following description will relate to the first set of collecting members 943A. It should be understood, however, that the description of the first set of collecting members 943A applies substantially equally to the second and third sets of collecting members 943B, 943C.

In the illustrated embodiment, each collecting member of the first set of collecting members 943A has a first wall 943A1 operably engaged with the first lateral wall 942A, a second wall 943A2 operably engaged with second lateral wall 942B and opposite to the first wall 943A1, and a base or perforated wall 943A3 operably engaged with the first wall 943A1 and the second wall 943A2. In the illustrated embodiment, the perforated wall 943A3 of each collecting member of the first set of collecting member 943A defines a curvilinear shape and/or arcuate shape where the first wall 943A1 and the second wall 943A2 define complementary curvilinear shapes and/or arcuate shapes to match the perforated wall 943A3. More particularly, each collecting member of the first set of collecting members 943A defines a substantially V-shaped cross-section suitable for collecting and/or gathering salt inside of the chamber 920E at the bottom end 920B of the vessel 920. In the illustrated embodiment, the perforated wall 943A3 is a porous wall (e.g., a screen, colander, and other devices of the like) to efficiently collect a volume of salt from the seawater bath that settle at the bottom end 820B of the vessel 820. Having perforated wall 943A3 being a porous wall is considered advantageous at least because the first set of collecting members 943A is able to efficiently collect a volume of salt from the seawater bath that settles at a bottom end of a vessel while allowing the water to drain through each collecting member of the first set of collecting member 943A and back into the vessel 820 for steam and condensing purposes. In an exemplary embodiment, each collecting member of a first set of collecting members may be a solid wall for scooping and retaining a volume of precipitate salt and water. In other words, each collecting member of the first set of collecting members may act as a basket to collect a volume of salt from the seawater bath that settle at a bottom end of a vessel.

It should be understood that each collecting member of the second set of collecting members 943B includes a first wall 943B1, a second wall 943B2, and a base wall 943B3 that are substantially similar to the first wall 943A1, a second wall 943A2, and a base wall 943A3 of each collecting member of the first set of collecting members 943A. It should also be understood that each collecting member of the third set of collecting members 943C includes a first wall 943C1, a second wall 943C2, and a base wall 943C3 that are substantially similar to the first wall 943A1, a second wall 943A2, and a base wall 943A3 of each collecting member of the first set of collecting members 943A.

Additionally, each collecting member of the first set of collecting member 943A include at least one leading edge 943A4 defined by the base wall 943A3. The at least one leading edge 943A4 of each collecting member of the first set of collecting members 943A is complementary in shape with the bottom end 920B of the vessel 920 for collecting and/or gathering salt inside of the chamber 920E at the bottom end 920B of the vessel 920. Similarly, each collecting member of the second and third sets of collecting members 843B, 843C may also include at least one leading edge (not illustrated) that is also complementary in shape with the bottom end 920B of the vessel 920. Such complementary shape between the sets of collecting members 943A, 943B, 943C and the bottom end 920B of the vessel 920 is considered advantageous at least because the sets of collecting members 943A, 943B, 943C are able to collect a volume of salt from the seawater bath that settle at the bottom end 920B of the vessel 920. As illustrated in FIG. 19B, the separation assembly 940 includes eight equally distanced collecting members in each set of collecting members 943A, 943B, 943C. In regards to the first set of collecting members 943A, each collecting member of the first set of collecting member 943A operably engages with the first lateral wall 942A, via the first wall 943A1, and the first intermediate wall 942C, via the second wall 943A2. In regards to the second set of collecting members 943B, each collecting member of the second set of collecting member 943B operably engages with the first intermediate wall 942C, via the first wall 943B1, and the second intermediate wall 942D, via the second wall 943B2. In regards to the third set of collecting members 943C, each collecting member of the third set of collecting member 943C operably engages with the second intermediate wall 942D, via the first wall 943C1, and the second lateral wall 942B, via the second wall 943C2. In other exemplary embodiments, a separation assembly may include any suitable number of screens in a set of screens based on various considerations, including the size, shape, and configuration of the wheel and other various considerations.

Referring to FIGS. 18 and 19B, a receptacle 943A5 is collectively defined between the first wall 943A1, the second wall 943A2, and the perforated wall 943A3 in each collecting member of the first set of collecting members 943A. Receptacles (not illustrated) for the second and third collecting members 943B, 943C are similarly defined as compared to the receptacles 943A5 of the first set of collecting members 943A. The receptacles defined inside each collecting member of the sets of collecting members 943A, 943B, 943C is configured to the collect and gather precipitate salt from the heated seawater while allowing the water to permeate through each collecting member of the sets of collecting members 943A, 943B, 943C. As such, the sets of collecting members 943A, 943B, 943C are adapted to hold a predetermined volume of salt when rotating with the wheel 942 and a drive assembly during a separation operation, which is described in more detail below.

During operation, the at least one pressurized fluid connection 925 may exert pressurized fluid directly at and/or into the receptacle 943A5 of each collecting member of the first set of collecting members 943A for removing trapped salt precipitate. Similarly, the at least one pressurized fluid connection 925 may also exert pressurized fluid directly at and/or into the receptacles of each collecting member of the second set of collecting members 943B and the third set of collecting members 943C for removing trapped salt precipitate. Such pressurized fluid forces the trapped salt precipitate to fall or drop from each collecting member towards a conveyor belt of a conveyor assembly of the apparatus 903 for transporting and removing salt precipitate from the chamber 920E of the vessel 920; such conveyor assembly of the apparatus 903 is described in more detail below. In the illustrated embodiment.

The separation assembly 940 may also include at least one rotating device 943A6 that operably engages with each collecting member of the first set of collecting members 943A. As best seen in FIG. 19B, a single rotating device 943A6 operably engages with each collecting member of the first set of collecting members 943A and the first lateral wall 942A. The rotating device 943A6 operably engaged with a collecting member of the first set of collecting members 943A is configured to rotate the collecting member between a scraping position or orientation to a dumping position or orientation during operation. As best seen in FIG. 18, the rotating devices 943A6 transition and/or move the first set of collecting members 943A in scraping orientations as the first set of collecting member 943A travels downwardly from the top end 920A of the vessel 920 to the bottom end 920B of the vessel 920. In this scraping orientation, the leading edges 943A4 of the first set of collecting members 943A are configured to scrap and collect crystallized or precipitated salt at the bottom end 920B of the vessel 920 as the wheel 942 rotates inside of the vessel 920. As best seen in FIG. 18, the rotating devices 943A6 also transition and/or move the first set of collecting members 943A in dumping orientations as the first set of collecting member 943A travels upwardly from the bottom end 920B of the vessel 920 to the top end 920A of the vessel 920. In the dumping orientation, the leading edges 943A4 of the first set of collecting members 943A are facing downwardly towards the bottom end 920B of the vessel 920 for dumping the collected crystallized or precipitated salt onto a conveyor assembly of the apparatus 903, which is described in more detail below.

It should be understood that rotating devices 943A6 also operably engaged with second set of collecting members 943B and the third set of collecting members 943C to rotate or pivot the second set of collecting members 943B and the third set of collecting members 943C between scraping orientations and dumping orientations during separation operations. As best seen in FIG. 19B, a rotating device 943A6 operably engages with each collecting member of the second collecting member and the third set of collecting members 943C and the second lateral wall 942B to rotate or pivot each collecting member of the second and third sets of collecting members 943B, 943C between scraping orientations and dumping orientations.

The rotating devices 943A6 described and illustrated herein included include mechanical mechanisms that are moved by powered devices for transitioning the first, second, and third sets of collecting members 943A, 943B, 943C between scraping orientations and dumping orientations. As such, the rotating devices 943A6 includes drive mechanisms powered by motors or similar devices to transition the first, second, and third sets of collecting members 943A, 943B, 943C between scraping orientations and dumping orientations. In one example, rotating devices may include a mechanical system that is operated by a motor for transitioning first, second, and third sets of collecting members between scraping orientations and dumping orientations. In another example, rotating devices may include an actuator that is either pneumatically powered, hydraulically powered, or electrically powered for transitioning first, second, and third sets of collecting members between scraping orientations and dumping orientations. In another example, rotating devices may have a cam mechanism that enables first, second, and third sets of collecting members to transition between scraping orientations and dumping orientations.

Each collecting member of the sets of collecting members 943A, 943B, 943C may also be engaged with the wheel 942 in any suitable configuration. In one example, each collecting member of sets of collecting members is oriented at an angle relative to a wheel in order to scrape and/or collect a volume of salt from a bottom end of a vessel. In other words, each collecting member of the sets of collecting members is mounted to the wheel at an angle relative to the wheel in order to scrape and/or collect a volume of salt from the bottom end of the vessel. In another example, each collecting member of sets of collecting members may be rotatably engaged with a wheel in that each collecting member of the sets of collecting members is freely rotatable on the wheel. In this instance, each collecting member of the sets of collecting members may freely swivel and/or pivot in place on the wheel as the wheel rotates inside of a vessel during separation operations.

The separation assembly 940 also includes a drive assembly 944 operably engaged with the wheel 942. As illustrated in FIG. 19B, the drive assembly 944 has a drive shaft 945 that operably engages with the wheel 942. The drive shaft 945 includes a first or front end 945A, an opposing second or rear end 945B, and a longitudinal axis defined therebetween. The drive shaft 945 is operably engaged with the wheel 942 via first and second cross members 946A, 946B. In the illustrated embodiment, the first and second cross members 946A, 946B are operably engaged with the second lateral wall 942B of the wheel 942.

The drive assembly 944 may also include a roller bearing assembly 947 that operably engages with the wheel 942. As best seen in FIG. 19B, the roller bearing assembly 947 includes at least one outer roller bearing 947A that operably engages with at least one of the first lateral wall 942A, the second lateral wall 942B, the first intermediate wall 942C, and the second intermediate wall 942D. In the illustrated embodiment, a single outer roller bearing 947A operably engages with the first lateral wall 942A along an outer circumferential surface 942A1 of the first lateral wall 942A. As best seen in FIG. 19B, the roller bearing assembly 947 also includes at least one lower roller bearing 947B that operably engages with at least one of the first lateral wall 942A, the second lateral wall 942B, the first intermediate wall 942C, and the second intermediate wall 942D. In the illustrated embodiment, three inner roller bearings 947B spaced equally apart from one another operably engage with the first lateral wall 942A along an inner circumferential surface 942A2 of the first lateral wall 942A. The structural configuration between the roller bearing assembly 947 and the wheel 942 is considered advantageous at least because the roller bearing assembly 947 provides rotational support along an outer region of the wheel 942 and along an inner region of the wheel 942 when the wheel 942 rotates inside of the vessel 920 and is loaded with volumes of seawater and volumes of salt.

Referring to FIG. 19A, the roller bearing assembly 947 also includes connectors 947C that operably engage the at least one outer roller bearing 947A and the at least one inner roller bearing 947B with the vessel 920. More particularly, the connectors 947C operably engage the at least one outer roller bearing 947A and the at least one inner roller bearing 947B with the circumferential wall 920C of the vessel 920. The connectors 947C are free from hindering and/or preventing axial rotation of the at least one outer roller bearing 947A and the at least one inner roller bearing 947B.

The drive assembly 944 also includes at least one motor 948 that operably engages with one of the first end 945A of the drive shaft 945 and the second end 945B of the drive shaft 945. As best seen in FIG. 19B, a single motor 948 operably engages with first end 945A of the drive shaft 945. The engagement between the motor 948 and the drive shaft 945 enables the motor 948 to rotatably move the wheel 942 inside of the vessel 920 about the longitudinal axis of the drive shaft 945. The drive assembly 944 also includes at least one pillow block bearing 949 that operably engages with the drive shaft 945 and is positioned between the vessel 920 and the motor 948. As best seen in FIG. 19B, a single pillow block bearing 949 operably engages with drive shaft 945 and is positioned between the vessel 920 and the motor 948. The pillow block bearing 949 is configured to provide axial support along the drive shaft 945 when the drive shaft 945 is being rotated by the motor 948 during separation operations.

The motor 948 and the pillow block 949 may be positioned at any suitable location relative to the separation assembly 940 while still being enabled to rotate the wheel 942 and sets of collecting members 943 inside of the vessel 920. In one exemplary embodiment, a motor and a pillow block of a drive assembly described and illustrated herein may be mounted to a circumferential wall of a vessel described and illustrated. In another exemplary embodiment, a motor and a pillow block of a drive assembly described and illustrated herein may be mounted to a ground support surface separate from a vessel described and illustrated.

Apparatus 903 also includes a conveyor assembly 950 that operably engages with the vessel 920 and is positioned inside of the wheel 942. As described in more detail below, the conveyor assembly 950 is configured to continuously convey and transport volumes of salt collected by the separation assembly 940 from the vessel 920 to a salt processing stage (e.g., salt processing stage 312A). Such components and devices that form the conveyor assembly 950 are described in greater detail below.

The conveyor assembly 950 includes a support frame 951. As best seen in FIG. 19B, the support frame 951 operably engages with the circumferential wall 920C of the vessel 920 and is positioned between the top end 920A and the bottom end 920B of the vessel 920. In the illustrated embodiment, the support frame 951 is operably engaged at a single position with the circumferential wall 920C of the vessel 920. In other exemplary embodiments, a support frame of a conveyor assembly may be operably engaged at any suitable number of position with circumferential wall of a vessel. The support frame 951 is also positioned inside of the wheel 942 in which the support frame 951 is free from hindering and/or interfering with the rotational movement of the wheel 942.

The conveyor assembly 950 also includes a pair of pulleys 952 that is rotatably engaged with the support frame 951. As best seen in FIG. 19B, a first pulley 952A of the pair of pulleys 952 is rotatably engaged with the support frame 951. The first pulley 952A is also positioned away from the chamber 920E of the vessel 920 and positioned inside of a salt discharge chute of the apparatus 903, which is described in more detail below. The first pulley 952A is in fluid communication with the chamber 920E yet positioned outside of the chamber 920E. As best seen in FIG. 19B, a second pulley 952B of the pair of pulleys 952 is also rotatably engaged with the support frame 951 at a location opposite to the first pulley 952A. The second pulley 952B is also positioned inside of the chamber 920E of the vessel 920 and positioned inside of the wheel 942.

The conveyor assembly 950 also includes a conveyor belt 953 that is rotatably engaged with the pair of pulleys 952. The conveyor belt 953 is configured to receive volumes of salt collected by the separation assembly 940 while continuously conveying and transporting the volumes of salt from the vessel 920 via rotational force applied by the pair of pulleys 952. In the illustrated embodiment, the conveyor belt 953 is a solid member that prevents escapement of volumes of salt and/or other fluids provided with the volumes of salt. In one exemplary embodiment, a conveyor belt of a conveyor assembly described and illustrated herein may have a porous configuration that enables seawater and/or fluid to escape and drain through the conveyor belt while retaining the volume of salt on the conveyor belt.

The conveyor assembly 950 may also include at least one motor 954 that operably engages with at least one pulley of the pair of pulleys 952. As best seen in FIG. 19A, a motor 954 operably engages with the first pulley 952A of the pair of pulleys 952 to rotate the first pulley 952A about a longitudinal axis defined by the first pulley 952A. Upon rotation of the first pulley 952A, the motor 954 also rotates the second pulley 952B via the conveyor belt 953 linking the first pulley 952A and the second pulley 952B with one another. As such, the motor 954 is configured to rotate the conveyor belt 953, via the pair of pulleys 952, for conveying and transporting volumes of salt from the vessel 920. In other exemplary embodiments, a suitable number of motors may be used in a conveyor assembly described and illustrated herein. In one example, a motor may be operably engaged with a second pulley of a pair of pulleys while a first pulley of the pair of pulleys is free from engagement of the motor. In another example, a first motor may be operably engaged with a first pulley of a pair of pulleys, and a second motor may be operably engaged with a second pulley of the pair of pulleys.

Apparatus 903 also includes a salt discharge assembly 960 that operably engages with the vessel 920. In the illustrated embodiment, the salt discharge assembly 960 is configured to receive collected salt precipitate from at least one set of collecting members 943A, 943B, 943C and to discharge the collected salt precipitate away from the apparatus 903. Such components and devices that form the salt discharge assembly 860 are described in greater detail below.

Figure 19C:
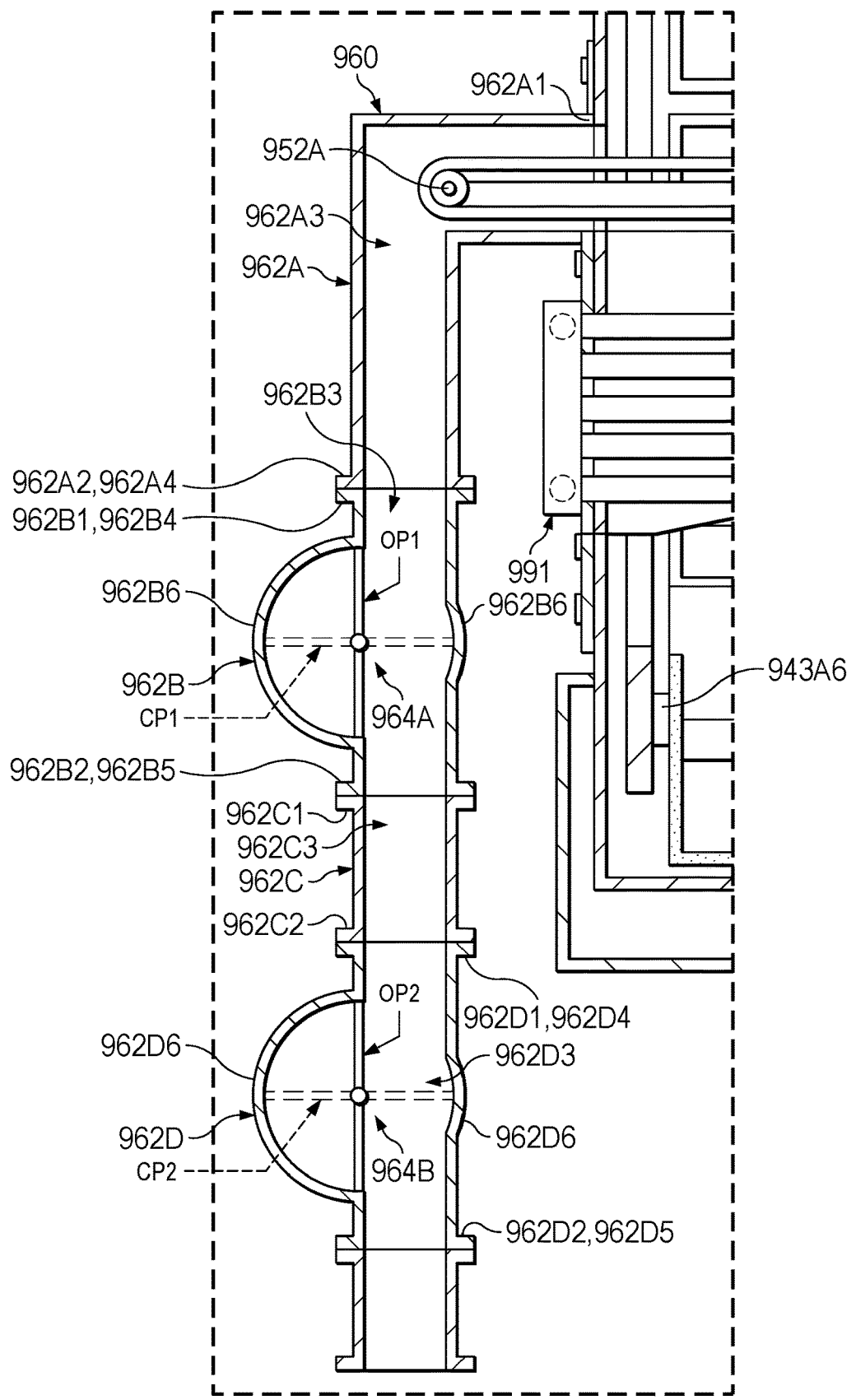
FIG. 19C is an enlargement that is highlighted in FIG. 19B.

Referring to FIG. 19C, the salt discharge assembly 960 includes a salt discharge chute 962 that is operably engaged with the vessel 920 and is in fluid communication with the chamber 920E of the vessel 920. The salt discharge chute 962 includes a first chute portion 962A that operably engages with the vessel 920 and extends outwardly from the circumferential wall 920C of the vessel 920. The first chute portion 962A and the vessel 920 are integral with one another in that the first chute portion 962A of the salt discharge assembly 960 and the vessel 920 depict a single, unitary member. The first chute portion 962A also defines a L-shaped configuration between a first end 962A1 of the first chute portion 962A to a second end 962A2 of the first chute portion 962A vertically below the first end 962A1. The first chute portion 962A also defines a passageway 962A3 that extends between the first end 962A1 and the second end 962A2. The passageway 962A3 is in fluid communication with the chamber 920E of the vessel 920 via the first end 962A1 being in communication with the chamber 920E. The first chute portion 962A also has a flange 962A4 that is positioned at the second end 962A2 for operably engaging additional chute portions of the salt discharge assembly 960 with the first chute portion 962A; such additional chute portions are described in more detail below.

As best seen in FIG. 19C, the first chute portion 962A is configured to house a portion of the conveyor assembly 950. More particularly, the passageway 962A3 of the first chute portion 962A is configured to house the first pulley 952A and a portion of the conveyor belt 953 of the conveyor assembly 950. The passageway 962A3 of the first chute portion 962A is also free from impeding rotational movement of either the first pulley 952A and the conveyor belt 953. Such configuration between the conveyor assembly 950 and the salt discharge chute 962 enables the volumes of salt collected by the separation assembly 940 to be substantially discharged from the vessel 920. In other words, placement of the first pulley 952A and a portion of the conveyor belt 953 prevents spillage and/or discharge of collected salt back into the chamber 920E of the vessel 920.

Still referring to FIG. 19C, the salt discharge chute 962 also includes a second chute portion 962B that operably engages with the first chute portion 962A. The second chute portion 962B includes a first end 962B1, a second end 962B2 vertically below the first end 962B1, and a passageway 962B3 extending between the first end 962B1 and the second end 962B2. As illustrated, the second chute portion 962B is in fluid communication with the first chute portion 962A via the passageway 962A3 and the passageway 962B3. The second chute portion 962B also includes a first flange 962B4 positioned at the first end 962B1 and configured to operably engage with the flange 962A4 of the first chute portion 962A. The second chute portion 962B also includes a second flange 962B5 positioned at the second end 962B2 and configured to operably engage with a flange of a fourth chute portion, which is described in more detail below. The second chute portion 962B also defines a pair of pockets 962B6 that is configured to house at least one rotary valve of the salt discharge assembly 960, which is described in more detail below.

Still referring to FIG. 19C, the salt discharge chute 962 also includes a third chute portion 962C that operably engages with the second chute portion 962B. The third chute portion 962C includes a first end 962C1, a second end 962C2 vertically below the first end 962C1, and a passageway 962C3 extending between the first end 962C1 and the second end 962C2. As illustrated, the third chute portion 962C is in fluid communication with the second chute portion 962B via the passageway 962B3 and the passageway 962C3. The third chute portion 962C also includes a first flange 962C4 positioned at the first end 962C1 and configured to operably engage with the second flange 962B5 of the second chute portion 962B. The third chute portion 962C also includes a second flange 962C5 positioned at the second end 962C2 and configured to operably engage with a flange of another chute portion, which is described in more detail below.

Still referring to FIG. 19C, the salt discharge chute 962 also includes a fourth chute portion 962D that operably engages with the third chute portion 962C. The fourth chute portion 962D includes a first end 962D1, a second end 962D2 vertically below the first end 962D1, and a passageway 962D3 extending between the first end 962D1 and the second end 962D2. As illustrated, the fourth chute portion 962D is in fluid communication with the third chute portion 962C via the passageway 962B3 and the passageway 962C3. The fourth chute portion 962D also includes a first flange 962D4 positioned at the first end 962D1 and configured to operably engage with the second flange 962C5 of the third chute portion 962C. The fourth chute portion 962D also includes a second flange 962D5 positioned at the second end 962D2 and configured to operably engage with a flange of another chute portion. The fourth chute portion 962D also defines a pair of pockets 962D6 that is configured to house at least another rotary valve of the salt discharge assembly 960, which is described in more detail below.

The salt discharge assembly 960 may also include at least one exit valve or rotary valve 964 that operably engages with the salt discharge chute 862. As best seen in FIG. 19B, a first rotary valve 964A operably engages with the second chute portion 962B, via the pair of pockets 962B6. As illustrated, the first rotary valve 964A is moveable between an opened position OP1 and a closed position CP1 (phantom lines in FIG. 19C). In the opened position OP1, the first rotary valve 964A is housed inside one of the pockets of the pair of pockets 962B6 for enabling volumes of salt to pass through the second chute portion 962B towards the third chute portion 962C. In the closed position CP1, the first rotary valve 964A is housed inside both pockets of the pair of pockets 962B6 to prevent salt and/or fluid from passing through the second chute portion 962B and discharged to the third chute portion 962C. Similarly, a second rotary valve 964B operably engages with the fourth chute portion 962D via the pair of pockets 962D6. As illustrated, the second rotary valve 964B is moveable between an open position OP2 and a closed position CP2 (phantom lines in FIG. 19C). In the opened position OP2, the second rotary valve 964B is housed inside one of the pockets of the pair of pockets 962D6 for enabling volumes of salt to pass through the fourth chute portion 962C towards salt processing stages and/or containers. In the closed position CP2, the second rotary valve 964B is housed inside both pockets of the pair of pockets 962D6 to prevent salt and/or fluid from passing through the fourth chute portion 962D and discharged to salt processing stages and/or containers.

During separation operations, the salt discharge assembly 960 is configured to receive volumes of salt collected by the separation assembly 940 and to transport the volumes of salt from the apparatus 903 to at one container 966 of the salt discharge assembly 960 or least one salt tank previously described above (e.g., the at least one salt tank 10). During transporting operations, the salt discharge assembly 960 uses a two-stage seal mechanism that prevents depressurization of the vessel 920 and loss of the heat inside of the vessel 920. In a first stage, the first rotary valve 964A transitions from the closed position CP1 to the opened position OP1 to enable the volumes of salt to pass through the second chute portion 962B towards the third chute portion 962C. During this first stage, the second rotary valve 964B is maintained at the closed position CP2 to maintain the pressurized, heated environment inside of the chamber 920E. As such, the volumes of salt remain inside one or both of the second chute portion 962B and the third chute portion 962C. In a second stage, the first rotary valve 964A transitions from the opened position OP1 to the closed position CP1 to maintain the pressurized, heated environment inside of the chamber 920E. Once the first rotary valve 964A is provided in the closed position CP1, the second rotary valve 964B transitions from the closed position CP2 to the opened position OP2 to enable the volumes of salt to pass through the fourth chute portion 962D. Such use of the first rotary valve 964A and the second rotary valve 864B creates this two-stage seal mechanism to prevent depressurization of the vessel 920 and loss of the heat inside of the vessel 920.

Referring to FIG. 18, the apparatus 903 may include at least one mist eliminator 970. In the illustrated embodiment, the apparatus 903 includes a first mist eliminator 970A and a second mist eliminator 970B. In other exemplary embodiments, any suitable number of mist eliminators may be used in an apparatus based on various considerations, including the size, shape, and configuration of the vessel, the volume of seawater pumped into the vessel, and other various considerations of the like.

As best seen in FIG. 18, each of the first and second mist eliminators 970A, 970B is operably engaged with hood 922 inside of the cavity 922C. Each of the first and second mist eliminators 970A, 970B is also positioned inside of the chamber 920E of the vessel 920 and is positioned vertically above the separation assembly 940 and the seawater bath that is held inside of the vessel 920. In the illustrated embodiment, the first and second mist eliminators first and second mist eliminators 970A, 970B are configured to remove water droplets and precipitated salt from the steam when converted from the seawater. As the steam initially passes through the first mist eliminator 970A, the steam endures a first purification stage where the first mist eliminator 970A removes any water droplets or excess salt precipitate from said steam. For further removal, the steam endures a second purification stage where the second mist eliminator 970B removes any remaining water droplets or excess salt precipitate from said steam. Upon passing through the first and second mist eliminators 970A, 970B, the steam is substantially free of any water droplets or salt. In other words, the first and second mist eliminators 970A, 970B purifies the steam prior to be transported to the at least one condenser (e.g., the at least one condenser).

In the illustrated embodiment, the first mist eliminator 970A is a spiral type mist eliminator and the second mist eliminator 970B is a single vane or chevron (plate) type mist eliminator. In other exemplary embodiment, first and second mist eliminators may be any suitable type of mist eliminator geometry described herein or available based on the application for removing water droplets, precipitate salt, or other solids and fluids. The different geometries between the first and second mist eliminators 970A, 970B are considered advantageous at least because such difference in structural geometries allows for fine-tuning the performances of the mist eliminators for being more versatile or efficient in screening and removing solids and fluids in the steam.

Still referring to FIG. 18, the apparatus 903 may also include a vessel jacket 980 that operably engages with a portion of the vessel 920 exterior to the chamber 920E defined by the vessel 920. The vessel jacket 980 is configured to cover and/or encapsulate a portion of the vessel 920 to provide continuous thermal energy to the vessel 920 for externally heating the seawater bath inside of the vessel 920. As such, the vessel jacket 980 is configured to provide external heat at the bottom end 920B of the vessel 920 to evaporate the seawater inside of the vessel 920 from a liquid state to a vapor state (i.e., steam).

As best seen in FIG. 18, the vessel jacket 980 includes a top end 980A, a bottom end 980B vertically opposite to the top end 980A, and a chamber 980C defined between the top end 980A and the bottom end 980B. As illustrated, the top end 980A is positioned at a location between the top end 920A of the vessel 920 and a bottom end 920B of the vessel 920 proximate to the bottom end 920B. The bottom end 980B is positioned at the bottom end 920B of the vessel 920. The vessel jacket 980 also defines a heated fluid inlet opening 980D at the bottom end 980B of the vessel jacket 980. A heated fluid inlet connection 982 operably engages with the vessel jacket 980 via the heated fluid inlet opening 980D for delivering heated fluid into the vessel jacket 980. The vessel jacket 980 also defines a heated fluid outlet opening 980E defined proximate to the top end 980A of the vessel jacket 980. A heated fluid outlet connection 984 operably engages with the vessel jacket 980 via the heated fluid outlet opening 980E for extracting used heated fluid from the vessel jacket 980. Such inclusion of the heated fluid inlet opening 980D and the heated fluid outlet opening 980E enables the apparatus 903 to continuously pass heated fluid through the vessel jacket 980 to maintain a desired temperature inside of the vessel 920 during separation operations.

The apparatus 903 may be used with any SDS 1, 200, 300 described and illustrated herein. In one instance, the apparatus 903 may be operably engaged with a solar tower (such as solar tower 2) where the vessel jacket 980 may be removed and externally heated by a plurality of heliostats (such as the plurality of heliostats 4) at an elevated level above ground surface. In another instance, the apparatus 403 may also be powered by a plurality of photovoltaic (or PV) cells (such as the plurality of PV cells 5) to operate the drive assembly 944. In another instance, any suitable device described and illustrated in SDS 1, 200, 300 may be operably engaged with the apparatus 903 for removing salt from seawater and providing fresh and/or potable water.

Apparatus 903 may also include a heating tube assembly 990 operably engaged with the vessel 920. As best seen in FIG. 19B, the heating tube assembly 990 is operably engaged with the vessel 920 and is positioned inside of the chamber 920E and inside of the wheel 942. During operation, the heating tube assembly 990 is configured to provide internal heat and/or thermal energy inside of the chamber 920E to internally heat the seawater bath provided inside of the vessel 920. The heating tube assembly 990 is also configured to prevent hindrance to the separation assembly 940 when the separation assembly 940 is rotating inside of the vessel 920. Such components and parts that form the heating tube assembly 990 is described in more detail below.

As best seen in FIG. 19B, the heating tube assembly 990 includes a manifold 991 that operably engages with the vessel 920 inside of the chamber 920E. More particularly, the manifold 991 operably engages with the circumferential wall 920C of the vessel 920 at a position between the top end 920A and the bottom end 920B inside of the chamber 920E. The heating tube assembly 990 also include a set of heating tubes 992 operably engaged with the manifold 991. Each heating tube of the set of heating tubes is interconnected with one another and are in fluid communication with one another. The heating tube assembly 990 also include an inlet heating pipe 993 operably engaged with the set of heating tubes 992. The inlet heating pipe 993 is configured to transport and deliver heated fluid into the set of heating tubes 992 from a container separate from the apparatus 903. The heating tube assembly 990 also include an outlet heating pipe 994 operably engaged with the set of heating tubes 992. The outlet heating pipe 994 is configured to transport and deliver heated fluid from the set of heating tubes 992 to the container separate from the apparatus 903. Such configuration of the inlet heating pipe 993 and the outlet heating pipe 994 enables the heating tube assembly 990 to provide a continuous flow of heating fluid through the set of heating tubes 992, which helps maintain a consistent temperature inside of the vessel 920 to convert the seawater from a liquid state to a vapor state.

The apparatus 903 may be used with any SDS (e.g. SDS 1, 200, 300, 700) described and illustrated herein. In one instance, the apparatus 903 may be operably engaged with a solar tower (such as solar tower 2) where the vessel jacket 980 may be removed and externally heated by a plurality of heliostats (such as the plurality of heliostats 4) at an elevated level above ground surface. In another instance, the apparatus 903 may also be powered by a plurality of photovoltaic (or PV) cells (such as the plurality of PV cells 5) to operate the drive assembly 944. In another instance, any suitable device in any SDS described and illustrated (e.g. SDS 1, 200, 300, 700) may be operably engaged with the apparatus 903 for removing salt from seawater and providing fresh and/or potable water.

It should be understood that FIGS. 18 through 19B are diagrammatic only and do not illustrate exact and precise dimensions of any component, assembly, or apparatus provided herein. Such diagrammatic illustrations of the apparatus 903 and other machines, components, and systems shown in FIGS. 18 through 19B should not limit the exact positioning, orientation, or location of the apparatus 903 and machines, components, and systems operably engaged with apparatus 903 relative to one another.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method comprising steps of:
providing a support structure of a separation assembly of an apparatus inside of a vessel of the apparatus;
providing at least one set of colanders of the separation assembly between a first lateral wall of the support structure and a second lateral wall of the support structure;
introducing a volume of seawater into the vessel;
heating the volume of seawater, via at least one heating tube assembly of the apparatus, inside of the vessel;
evaporating the volume of seawater to a volume of steam inside of the vessel;
separating a volume of salt from the volume of seawater, via the at least one set of colanders of the apparatus, inside of the vessel;
eliminating water droplets and a remaining salt from the volume of steam, via at least one mist evaporator, inside of the vessel; and
converting the volume of steam into a volume of fresh water, via at least one condenser, remote from the apparatus.

2. The method of claim 1, wherein the step of separating the volume of salt from the volume of seawater further comprises:
draining the volume of seawater through a perforated wall of each colander of the at least one set of colanders; and
retaining the volume of salt inside of each colander of the at least one set of colanders.

3. The method of claim 1, further comprising:
engaging a drive shaft to the support structure of the separation assembly;
engaging the drive shaft with a motor; and
rotating the support structure and the at least one set of colanders, by the motor, inside of the vessel.

4. The method of claim 1, further comprising:
dispensing the volume of salt from each colander of the at least one set of colanders onto a conveyor belt of a conveyor assembly of the apparatus;
rotating the conveyor belt by at least one pulley of the conveyor assembly; and
transporting the volume of salt outside of the vessel.

5. The method of claim 1, further comprising:
dispensing the volume of salt onto a conveyor belt of a conveyor assembly of the apparatus;
rotating the conveyor belt at a first end by a first pulley of the conveyor assembly;
rotating the conveyor belt at a second end by a second pulley of the conveyor assembly that is opposite to the first pulley; and
transporting the volume of salt outside of the vessel.

6. The method of claim 4, further comprising:
exerting a pressurized fluid, through at least one pressurized fluid connection, against each colander of the at least one set of colanders; and
removing remaining saltwater and a residual salt of the volume of salt from each colander of the at least one set of colanders.

7. The method of claim 4, further comprising:
draining remaining saltwater through the conveyor belt.

8. The method of claim 4, further comprising:
transporting the volume of salt from the conveyor belt to a discharge chute of a discharge assembly, wherein the discharge chute is aligned with the conveyor belt of the conveyor assembly and is positioned outside of the vessel.

9. The method of claim 8, wherein the step of transporting the volume of salt from the conveyor belt to the discharge chute further includes that a portion of the conveyor belt is disposed inside of the discharge chute.

10. The method of claim 8, further comprising:
actuating a first exit valve of the discharge assembly from a closed position to an open position to pass the volume of salt through the first exit valve and the discharge chute; and
retaining a second exit valve of the discharge assembly at a closed position for maintaining an internal pressure inside of the vessel.

11. The method of claim 10, further comprising:
actuating the first exit valve of the discharge assembly from the open position to the closed position.

12. The method of claim 11, further comprising:
actuating the second exit valve of the discharge assembly from the closed position to the open position to pass the volume of salt through the second exit valve and the discharge chute; and
retaining the first exit valve of the discharge assembly at the closed position for maintaining the internal pressure inside of the vessel.

13. The method of claim 1, wherein the step of eliminating the water droplets and the remaining salt from the volume of steam, via the at least one mist evaporator, inside of the vessel further comprises:
eliminating the water droplets and the remaining salt from the volume of steam, via a first mist eliminator, inside of the vessel at a first stage; and eliminating the water droplets and the remaining salt from the volume of steam, via a second mist eliminator, inside of the vessel at a second stage subsequent to the first stage.

14. The method of claim 13, wherein the step of eliminating the water droplets and the remaining salt from the volume of steam, via the first mist eliminator, inside of the vessel at the first stage further includes that the first mist eliminator is a spiral type mist eliminator; and wherein the step of eliminating the water droplets and the remaining salt from the volume of steam, via the second mist eliminator, inside of the vessel at the second stage subsequent to the first stage further includes that the second mist eliminator is a single vane type mist eliminator.

15. The method of claim 13, further comprising:

connecting a steam outlet connection with the vessel and the at least one condenser, wherein the steam outlet connection is in fluid communication with a chamber defined by the vessel; and exhausting the volume of steam from the second mist eliminator to the at least one condenser by the steam outlet connection.

16. The method of claim 1, further comprising:

guiding the support structure of the separation assembly at a first position, by an outer roller bearing of a bearing assembly, inside of the vessel; and guiding the support structure of the separation assembly at a second position, by at least one inner roller bearing of the bearing assembly, inside of the vessel.

17. The method of claim 1, further comprising:

introducing heated fluid into a manifold and a set of heating tubes of the heating tube assembly; and heating the volume of water inside of the vessel, by the heating tube assembly, to a predetermined temperature to evaporate the volume of seawater to the volume of steam.

18. The method of claim 1, further comprising:

engaging a vessel jacket along an exterior surface of the vessel; and retaining heat inside of the vessel by the vessel jacket.

19. The method of claim 18, further comprising:

circulating heated fluid into the vessel jacket between a heated fluid inlet connection of the vessel jacket and a heated fluid outlet connection of the vessel jacket for maintaining the heated fluid at a desired temperature.

20. A method comprising steps of:

providing a support structure of a separation assembly inside of a vessel of an apparatus;

providing at least one set of colanders of the separation assembly between a first lateral wall of the support structure and a second later wall of the support structure;

introducing a volume of seawater into the vessel;

heating the volume of seawater, via at least one heating tube assembly of the apparatus, inside of the vessel;

evaporating the volume of seawater to a volume of steam inside of the vessel;

separating a volume of salt from the volume of seawater, via the at least one set of colanders, inside of the vessel;

dispensing the volume of salt from each colander of the at least one set of colanders onto a conveyor belt of a conveyor assembly of the apparatus;

rotating the conveyor belt by at least one pulley of the conveyor assembly;

transporting the volume of salt outside of the vessel;

eliminating water droplets and a remaining salt from the volume of steam, via at least one mist evaporator, inside of the vessel; and converting the volume of steam into a volume of fresh water, via at least one condenser, remote from the apparatus.

* * * * *